(12) United States Patent
Farmer

(10) Patent No.: US 9,850,345 B2
(45) Date of Patent: Dec. 26, 2017

(54) POLYCARBONATE POLYOL COMPOSITIONS AND METHODS

(71) Applicant: Saudi Aramco Technologies Company, Dhahran (SA)

(72) Inventor: Jay J. Farmer, Ithaca, NY (US)

(73) Assignee: Saudi Aramco Technologies Company, Dhahran (SA)

( * ) Notice: Subject to any disclaimer, the term of this patent is extended or adjusted under 35 U.S.C. 154(b) by 0 days.

(21) Appl. No.: 15/191,901

(22) Filed: Jun. 24, 2016

(65) Prior Publication Data

US 2017/0051106 A1   Feb. 23, 2017

Related U.S. Application Data

(63) Continuation of application No. 14/402,835, filed as application No. PCT/US2013/042712 on May 24, 2013, now Pat. No. 9,388,277.

(60) Provisional application No. 61/651,254, filed on May 24, 2012.

(51) Int. Cl.
| | |
|---|---|
| C08G 63/02 | (2006.01) |
| C08G 64/34 | (2006.01) |
| C08G 65/26 | (2006.01) |
| C08G 18/44 | (2006.01) |
| C08G 64/02 | (2006.01) |
| C08G 64/00 | (2006.01) |
| B01J 31/02 | (2006.01) |
| B01J 31/18 | (2006.01) |
| B01J 31/22 | (2006.01) |

(52) U.S. Cl.
CPC .......... *C08G 64/34* (2013.01); *B01J 31/0202* (2013.01); *B01J 31/22* (2013.01); *B01J 31/2217* (2013.01); *C08G 18/44* (2013.01); *C08G 64/0208* (2013.01); *C08G 64/0216* (2013.01); *C08G 65/2603* (2013.01); *C08G 65/266* (2013.01); *B01J 31/0201* (2013.01); *B01J 31/183* (2013.01); *B01J 31/184* (2013.01); *B01J 31/2243* (2013.01); *B01J 2231/14* (2013.01); *B01J 2531/025* (2013.01); *B01J 2531/0238* (2013.01); *B01J 2531/0252* (2013.01); *B01J 2531/845* (2013.01); *Y02P 20/52* (2015.11)

(58) Field of Classification Search
CPC .................................................... C08G 64/34
USPC ................................. 525/525, 528
See application file for complete search history.

(56) References Cited

U.S. PATENT DOCUMENTS

| | | |
|---|---|---|
| 5,637,739 A | 6/1997 | Jacobsen et al. |
| 5,663,393 A | 9/1997 | Jacobsen et al. |
| 5,665,890 A | 9/1997 | Jacobsen et al. |
| 5,929,232 A | 7/1999 | Jacobsen et al. |
| 6,130,340 A | 10/2000 | Jacobsen et al. |
| 6,309,997 B1 | 10/2001 | Fujita et al. |
| 6,639,087 B2 | 10/2003 | Larrow et al. |
| 6,844,448 B2 | 1/2005 | Jacobsen et al. |
| 6,870,004 B1 | 3/2005 | Nguyen et al. |
| 6,884,750 B2 | 4/2005 | Kim et al. |
| 6,903,043 B2 | 6/2005 | Kim et al. |
| 7,145,022 B2 | 12/2006 | Luinstra et al. |
| 7,244,805 B2 | 7/2007 | Park et al. |
| 7,304,172 B2 | 12/2007 | Coates et al. |
| 8,163,867 B2 | 4/2012 | Lee et al. |
| 8,207,365 B2 | 6/2012 | Zheng et al. |
| 8,232,267 B2 | 7/2012 | Groves |
| 8,247,520 B2 | 8/2012 | Allen et al. |
| 8,252,955 B2 | 8/2012 | Gao et al. |
| 8,461,290 B2 | 6/2013 | Carpentier et al. |
| 8,470,956 B2 | 6/2013 | Allen et al. |
| 8,507,733 B2 | 8/2013 | Ok et al. |

(Continued)

FOREIGN PATENT DOCUMENTS

| | | |
|---|---|---|
| CN | 101020747 A | 8/2007 |
| CN | 101412809 A | 4/2009 |

(Continued)

OTHER PUBLICATIONS

Bertozzi, C.R. and Bednarski, M.D., The synthesis of heterobifunctional linkers for the conjugation of ligands to molecular probes, Journal of Organic Chemistry, 56(13):4326-4329 (1991).
Bringou, P. et al., Metal- and Organo-Catalyzed Ring-Opening Polymerization of a-Methyl-Trimethylene Carbonate: Insights into the Microstructure of the Polycarbonate, Macromolecules, 44(13): 5127-5135 (2011).
European Search Report for EP13793633.2, 12 pages (Nov. 13, 2015).

(Continued)

*Primary Examiner* — Terressa Boykin
(74) *Attorney, Agent, or Firm* — Choate, Hall & Stewart LLP; Charles E. Lyon; John P. Rearick

(57) ABSTRACT

In one aspect, the present disclosure encompasses polymerization systems for the copolymerization of $CO_2$ and epoxides comprising 1) a catalyst including a metal coordination compound having a permanent ligand set and at least one ligand that is a polymerization initiator, and 2) a chain transfer agent having one or more sites capable of initiating copolymerization of epoxides and $CO_2$, wherein the chain transfer agent contains one or more masked hydroxyl groups. In a second aspect, the present disclosure encompasses methods for the synthesis of polycarbonate polyols using the inventive polymerization systems. In a third aspect, the present disclosure encompasses polycarbonate polyol compositions characterized in that the polymer chains have a high percentage of —OH end groups, a high percentage of carbonate linkages, and substantially all polycarbonate chains having hydroxyl end groups have no embedded chain transfer agent.

29 Claims, 1 Drawing Sheet

(56) References Cited

U.S. PATENT DOCUMENTS

| | | | |
|---|---|---|---|
| 8,530,616 B2 * | 9/2013 | Jeong | C08G 64/0216 528/405 |
| 8,575,245 B2 | 11/2013 | LaPointe et al. | |
| 8,580,911 B2 | 11/2013 | Allen et al. | |
| 8,598,309 B2 | 12/2013 | Jeong et al. | |
| 8,604,155 B2 | 12/2013 | Allen et al. | |
| 8,642,721 B2 | 2/2014 | Ok et al. | |
| 8,748,555 B2 | 6/2014 | Allen | |
| 8,785,591 B2 | 7/2014 | Allen et al. | |
| 8,791,274 B2 | 7/2014 | Ok et al. | |
| 8,921,508 B2 | 12/2014 | Allen et al. | |
| 8,952,104 B2 | 2/2015 | Allen | |
| 9,029,498 B2 | 5/2015 | Allen et al. | |
| 9,102,800 B2 | 8/2015 | Allen et al. | |
| 9,388,277 B2 * | 7/2016 | Farmer | C08G 64/34 |
| 9,422,397 B2 | 8/2016 | Allen et al. | |
| 2010/0256329 A1 | 10/2010 | Nozaki et al. | |
| 2011/0218127 A1 * | 9/2011 | Allen | C08G 64/0208 507/219 |
| 2011/0230580 A1 * | 9/2011 | Allen | C08G 64/0208 521/172 |
| 2011/0245424 A1 | 10/2011 | Jeong et al. | |
| 2011/0257296 A1 | 10/2011 | LaPointe et al. | |
| 2012/0156410 A1 | 6/2012 | Allen | |
| 2013/0066044 A1 | 3/2013 | Allen et al. | |
| 2013/0172482 A1 | 7/2013 | Allen et al. | |
| 2013/0244864 A1 | 9/2013 | Allen et al. | |
| 2013/0281633 A1 | 10/2013 | Allen | |
| 2013/0303724 A1 | 11/2013 | Allen et al. | |
| 2014/0031453 A1 | 1/2014 | Allen et al. | |
| 2014/0046008 A1 | 2/2014 | Allen et al. | |
| 2014/0072806 A1 | 3/2014 | Allen et al. | |
| 2014/0249279 A1 | 9/2014 | Williams et al. | |
| 2015/0166734 A1 | 6/2015 | Allen et al. | |
| 2015/0299386 A1 | 10/2015 | Allen et al. | |
| 2015/0307660 A1 | 10/2015 | Allen et al. | |
| 2016/0264728 A1 | 9/2016 | Allen et al. | |

FOREIGN PATENT DOCUMENTS

| | | | |
|---|---|---|---|
| CN | 102149746 A | 8/2011 | |
| EP | 0141253 A1 | 5/1985 | |
| EP | 2146977 B1 | 11/2012 | |
| EP | 225755 B1 | 10/2014 | |
| JP | 2008-081518 A | 4/2008 | |
| JP | 2012-502143 A | 1/2012 | |
| JP | 2013-523971 A | 6/2013 | |
| WO | WO-98/04538 A1 | 2/1998 | |
| WO | WO-2008/136591 A1 | 11/2008 | |
| WO | WO-2008/150033 A1 | 12/2008 | |
| WO | WO-2009/137540 A1 | 11/2009 | |
| WO | WO-2009/148889 A1 | 12/2009 | |
| WO | WO-2010/022388 A2 | 2/2010 | |
| WO | WO-2010/028362 A1 | 3/2010 | |
| WO | WO-2010/033703 A1 | 3/2010 | |
| WO | WO-2010/033705 A1 | 3/2010 | |
| WO | WO-2010/062703 A1 | 6/2010 | |
| WO | WO-2010/075232 A1 | 7/2010 | |
| WO | WO-2011/005664 A2 | 1/2011 | |
| WO | WO-2011/023450 A1 | 3/2011 | |
| WO | WO 2011023450 * | 3/2011 | ......... C08G 64/0208 |
| WO | WO-2011/126195 A1 | 10/2011 | |
| WO | WO-2011/163133 A1 | 12/2011 | |
| WO | WO-2011/163250 A1 | 12/2011 | |
| WO | WO-2012/027725 A1 | 3/2012 | |
| WO | WO-2012/037282 A2 | 3/2012 | |
| WO | WO-2012/071505 A1 | 5/2012 | |
| WO | WO-2012/094619 A1 | 7/2012 | |
| WO | WO-2012/154849 A1 | 11/2012 | |
| WO | WO-2013/016331 A2 | 1/2013 | |
| WO | WO-2013/034750 A2 | 3/2013 | |
| WO | WO-2013/096602 A1 | 6/2013 | |
| WO | WO-2013/177546 A2 | 11/2013 | |

OTHER PUBLICATIONS

International Preliminary Report on Patentability for PCT/US2013/042712, 26 pages (Aug. 22, 2014).

International Search Report for PCT/US2013/042712, 4 pages (Feb. 6, 2014).

Written Opinion for PCT/US2013/042712, 9 pages (Feb. 6, 2014).

U.S. Appl. No. 15/243,884, dated Aug. 2016, Allen et al.

* cited by examiner

POLYCARBONATE POLYOL COMPOSITIONS AND METHODS

PRIORITY CLAIM

This application is a continuation of U.S. application Ser. No. 14/402,835, filed Nov. 21, 2014, now U.S. Pat. No. 9,388,277, which is a national stage application of International Application No. PCT/US2013/042712, filed May 24, 2013, which claims priority to U.S. Application Ser. No. 61/651,254, filed May 24, 2012, the entirety of each of which is incorporated herein by reference in its entirety.

BACKGROUND

Polycarbonate polyols are known to have utility as building blocks for the construction of co-polymers such as flexible urethane foams, urethane coatings, rigid urethane foams, urethane/urea elastomers and plastics, adhesives, polymeric coatings and surfactants among others. Existing commercial polycarbonate polyols fall into two classes, those with perfectly alternating structure in which each repeating unit in the polymer chain contains a carbonate linkage, and those containing a mixture of carbonate and ether linkages (more properly called polyether polycarbonates). The former are derived from diols such as 1,4 butane diol or 1,6 hexane diol and phosgene (or its equivalent) and have three or more $CH_2$ groups between each carbonate linkage, while the latter have a two carbon chain between each carbonate linkage and are typically made from epoxides and $CO_2$ using double metal cyanide catalysts. Polyols with two carbon atoms separating the carbonate linkages and having a perfectly alternating structure are not available commercially. Polyols derived from epoxides and $CO_2$ and having a perfectly alternating structure have only recently been made and are described in WO 2010/028362. Examples of such polyols include poly(propylene carbonate) (PPC); poly(ethylene carbonate) (PEC); poly(butylene carbonate) (PBC); and poly(cyclohexene carbonate) (PCHC) as well as copolymers of two or more of these.

To have utility in these applications, it is preferable that all polycarbonate polymer chain ends terminate with hydroxyl groups. Such hydroxyl groups serve as reactive moieties for cross-linking reactions or act as sites on which other blocks of a co-polymer can be constructed. It is problematic if a portion of the chain ends on the APC are not hydroxy groups since this results in incomplete cross-linking or termination of the block copolymer. A typical specification for aliphatic polycarbonate polyol resins for use in such applications is that at least 98% or in some cases greater than 99% of chain ends terminate in hydroxyl groups. In addition, these applications typically call for relatively low molecular weight oligomers (e.g. polymers having average molecular weight numbers ($M_n$) between about 500 and about 15,000 g/mol). It is also desirable that the polyols have a narrowly defined molecular weight distribution—for example, a polydispersity index less than about 2 is desirable, but much narrower distributions (i.e. PDI<1.2) can be advantageous. Furthermore, for certain applications, polyol polycarbonates having little or no contamination with ether linkages are desirable. Although progress has been made recently employing particular catalysts along with chain transfer agents, new advances in producing polycarbonate polyols having a high percentage of —OH end groups are needed.

SUMMARY OF THE INVENTION

In one aspect, the present disclosure encompasses polymerization systems for the copolymerization of $CO_2$ and epoxides comprising 1) a metal complex, and 2) a chain transfer agent having one or more sites capable of initiating copolymerization of epoxides and $CO_2$, wherein the chain transfer agent contains one or more masked hydroxyl groups.

In some embodiments, the present disclosure encompasses methods for the synthesis of polycarbonate polyols. In some embodiments, a method includes the steps of:
  a) contacting a reaction mixture comprising one or more epoxides with a polymerization system described herein in the presence of carbon dioxide;
  b) allowing the polymerization reaction to proceed until a desired molecular weight aliphatic polycarbonate polyol has formed,
  c) terminating the polymerization; and
  d) treating the aliphatic polycarbonate polyol under suitable conditions to unmask the one or more masked hydroxyl groups, wherein the one or more masked hydroxyl groups are hydroxyl protecting groups or latent hydroxyl groups.

In some embodiments the method further includes contacting the reaction mixture with a co-catalyst.

In some embodiments, the present disclosure encompasses polycarbonate polyol compositions characterized in that polymer chains have a high percentage of —OH end groups and wherein substantially all polycarbonate chains having hydroxyl end groups have no embedded chain transfer agent.

The present disclosure further provides, among other things, polyurethane compositions formed by reacting one or more isocyanates with a provided polycarbonate polyol. In addition, the present disclosure encompasses articles of manufacture comprising provided polyols or polyurethanes.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5th Edition, John Wiley & Sons, Inc., New York, 2001; Larock, *Comprehensive Organic Transformations*, VCH Publishers, Inc., New York, 1989; Carruthers, *Some Modern Methods of Organic Synthesis,* 3rd Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain other embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. Stereochemistry of Carbon Compounds (McGraw-Hill, N.Y., 1962); Wilen, S. H. *Tables of Resolving Agents and Optical Resolutions* p. 268 (E. L. Eliel, Ed., Univ. of Notre Dame Press, Notre Dame, Ind. 1972).

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-30 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 8-membered carbocycle" refers to a 3- to 8-membered saturated or partially unsaturated monocyclic carbocyclic ring. In certain embodiments, the terms "3- to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring. In certain embodiments, the term "$C_{3-20}$ carbocycle" refers to a 3- to 8-membered saturated or partially unsaturated monocyclic carbocyclic ring, or a 7- to 20-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in yet other embodiments alkyl groups contain 1-3 carbon atoms, and in yet other embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in yet other embodiments alkenyl groups contain 2-3 carbon atoms, and in yet other embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in yet other embodiments alkynyl groups contain 2-3 carbon atoms, and in yet other embodiments alkynyl groups contain 2 carbon atoms. Representative alkynyl groups include, but are not limited to, ethynyl, 2-propynyl (propargyl), 1-propynyl, and the like.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring. In certain embodiments, the term "6- to 12-membered aryl" refers to a phenyl or an 8- to 12-membered polycyclic aryl ring. In certain embodiments, the term "$C_{6-14}$ aryl" refers to a phenyl or an 8- to 14-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or +NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 8-membered heterocycle" refers to a 3- to 8-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur. In some embodiments, the term "3- to 14-membered heterocycle" refers to a 3- to 8-membered saturated or partially unsaturated monocyclic heterocyclic ring having 1 to 2 heteroatoms independently selected from nitrogen, oxygen, or sulfur, or a 7- to 14-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

One of ordinary skill in the art will appreciate that compound and synthetic methods, as described herein, may utilize a variety of protecting groups. By the term "protecting group," as used herein, it is meant that a particular functional moiety, e.g., O, S, or N, is masked or blocked, permitting, if desired, a reaction to be carried out selectively at another reactive site in a multifunctional compound. Suitable protecting groups are well known in the art and include those described in detail in *Protecting Groups in*

*Organic Synthesis*, T. W. Greene and P. G. M. Wuts, 3$^{rd}$ edition, John Wiley & Sons, 1999, the entirety of which is incorporated herein by reference. In certain embodiments, a protecting group reacts selectively in good yield to give a protected substrate that is stable to the projected reactions; the protecting group is preferably selectively removable by readily available, preferably non-toxic reagents that do not attack the other functional groups; the protecting group forms a separable derivative (more preferably without the generation of new stereogenic centers); and the protecting group will preferably have a minimum of additional functionality to avoid further sites of reaction. As detailed herein, oxygen, sulfur, nitrogen, and carbon protecting groups may be utilized. By way of non-limiting example, hydroxyl protecting groups include methyl, methoxylmethyl (MOM), methylthiomethyl (MTM), t-butylthiomethyl, (phenyldimethylsilyl)methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethyl silyl)ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a,4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethyl silylethyl, 2-(phenylselenyl)ethyl, t-butyl, allyl, p-chlorophenyl, p-methoxyphenyl, 2,4-dinitrophenyl, benzyl, p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2-picolyl N-oxide, diphenylmethyl, p,p'-dinitrobenzhydryl, 5-dibenzosuberyl, triphenylmethyl, α-naphthyldiphenylmethyl, p-methoxyphenyldiphenylmethyl, di(p-methoxyphenyl)phenylmethyl, tri(p-methoxyphenyl)methyl, 4-(4'-bromophenacyloxyphenyl)diphenylmethyl, 4,4',4"-tris(4,5-dichlorophthalimidophenyl)methyl, 4,4',4"-tris(levulinoyloxyphenyl)methyl, 4,4',4"-tris(benzoyloxyphenyl)methyl, 3-(imidazol-1-yl)bis(4',4"-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthryl, 1,3-benzodithiolan-2-yl, benzisothiazolyl S,S-dioxido, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBDMS), t-butyldiphenylsilyl (TBDPS), tribenzylsilyl, tri-p-xylylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), alkyl methyl carbonate, 9-fluorenylmethyl carbonate (Fmoc), alkyl ethyl carbonate, alkyl 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), alkyl isobutyl carbonate, alkyl vinyl carbonate alkyl allyl carbonate, alkyl p-nitrophenyl carbonate, alkyl benzyl carbonate, alkyl p-methoxybenzyl carbonate, alkyl 3,4-dimethoxybenzyl carbonate, alkyl o-nitrobenzyl carbonate, alkyl p-nitrobenzyl carbonate, alkyl S-benzyl thiocarbonate, 4-ethoxy-1-napthhyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxycarbonyl)benzoate, α-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts). For protecting 1,2- or 1,3-diols, the protecting groups include methylene acetal, ethylidene acetal, 1-t-butylethylidene ketal, 1-phenylethylidene ketal, (4-methoxyphenyl)ethylidene acetal, 2,2,2-trichloroethylidene acetal, acetonide, cyclopentylidene ketal, cyclohexylidene ketal, cycloheptylidene ketal, benzylidene acetal, p-methoxybenzylidene acetal, 2,4-dimethoxybenzylidene ketal, 3,4-dimethoxybenzylidene acetal, 2-nitrobenzylidene acetal, methoxymethylene acetal, ethoxymethylene acetal, dimethoxymethylene ortho ester, 1-methoxyethylidene ortho ester, 1-ethoxyethylidine ortho ester, 1,2-dimethoxyethylidene ortho ester, α-methoxybenzylidene ortho ester, 1-(N,N-dimethylamino)ethylidene derivative, α-(N,N'-dimethylamino)benzylidene derivative, 2-oxacyclopentylidene ortho ester, di-t-butylsilylene group (DTBS), 1,3-(1,1,3,3-tetraisopropyldisiloxanylidene) derivative (TIPDS), tetra-t-butoxydisiloxane-1,3-diylidene derivative (TBDS), cyclic carbonates, cyclic boronates, ethyl boronate, and phenyl boronate. Amino-protecting groups include methyl carbamate, ethyl carbamante, 9-fluorenylmethyl carbamate (Fmoc), 9-(2-sulfo)fluorenylmethyl carbamate, 9-(2,7-dibromo)fluoroenylmethyl carbamate, 2,7-di-t-butyl-[9-(10,10-dioxo-10,10,10,10-tetrahydrothioxanthyl)]methyl carbamate (DBD-Tmoc), 4-methoxyphenacyl carbamate (Phenoc), 2,2,2-trichloroethyl carbamate (Troc), 2-trimethylsilylethyl carbamate (Teoc), 2-phenylethyl carbamate (hZ), 1-(1-adamantyl)-1-methylethyl carbamate (Adpoc), 1,1-dimethyl-2-haloethyl carbamate, 1,1-dimethyl-2,2-dibromoethyl carbamate (DB-t-BOC), 1,1-dimethyl-2,2,2-trichloroethyl carbamate (TCBOC), 1-methyl-1-(4-biphenylyl)ethyl carbamate (Bpoc), 1-(3,5-di-t-butylphenyl)-1-methylethyl carbamate (t-Bumeoc), 2-(2'- and 4'-pyridyl)ethyl carbamate (Pyoc), 2-(N,N-dicyclohexylcarboxamido)ethyl carbamate, t-butyl carbamate (BOC), 1-adamantyl carbamate (Adoc), vinyl carbamate (Voc), allyl carbamate (Alloc), 1-isopropylallyl carbamate (Ipaoc), cinnamyl carbamate (Coc), 4-nitrocinnamyl carbamate (Noc), 8-quinolyl carbamate, N-hydroxypiperidinyl carbamate, alkyldithio carbamate, benzyl carbamate (Cbz), p-methoxybenzyl carbamate (Moz), p-nitobenzyl carbamate, p-bromobenzyl carbamate, p-chlorobenzyl carbamate, 2,4-dichlorobenzyl carbamate, 4-methylsulfinylbenzyl carbamate (Msz), 9-anthrylmethyl carbamate, diphenylmethyl carbamate, 2-methylthioethyl carbamate, 2-methylsulfonylethyl carbamate, 2-(p-toluenesulfonyl)ethyl carbamate, [2-(1,3-dithianyl)]methyl carbamate (Dmoc), 4-methylthiophenyl carbamate (Mtpc), 2,4-dimethylthiophenyl carbamate (Bmpc), 2-phosphonioethyl carbamate (Peoc), 2-triphenylphosphonioisopropyl carbamate (Ppoc), 1,1-dimethyl-2-cyanoethyl carbamate, m-chloro-p-acyloxybenzyl carbamate, p-(dihydroxyboryl)benzyl carbamate, 5-benzisoxazolylmethyl carbamate, 2-(trifluoromethyl)-6-chromonylmethyl carbamate (Tcroc), m-nitrophenyl carbamate, 3,5-dimethoxybenzyl carbamate, o-nitrobenzyl carbamate, 3,4-dimethoxy-6-nitrobenzyl carbamate, phenyl(o-nitrophenyl)methyl carbamate, phenothiazinyl-(10)-carbonyl derivative, N'-p-toluenesulfonylaminocarbonyl derivative, N'-phenylaminothiocarbonyl derivative, t-amyl carbamate, S-benzyl thiocarbamate, p-cyanobenzyl carbamate, cyclobutyl carbamate, cyclohexyl carbamate, cyclopentyl carbamate, cyclopropylmethyl carbamate, p-decyloxybenzyl carbamate, 2,2-dimethoxycarbonylvinyl carbamate, o-(N,N-dimethylcarboxamido)benzyl carbamate, 1,1-dimethyl-3-(N,N-dimethylcarboxamido) propyl carbamate, 1,1-dimethylpropynyl carbamate, di(2-pyridyl)methyl carbamate, 2-furanylmethyl carbamate, 2-iodoethyl carbamate, isoborynl carbamate, isobutyl carbamate, isonicotinyl carbamate, p-(p'-methoxyphenylazo) benzyl carbamate, 1-methylcyclobutyl carbamate, 1-methylcyclohexyl carbamate, 1-methyl-1-cyclopropylmethyl carbamate, 1-methyl-1-(3,5-dimethoxyphenyl)ethyl carbamate, 1-methyl-1-(p-phenylazophenyl)ethyl carbamate, 1-methyl-1-phenylethyl carbamate, 1-methyl-1-(4-pyridyl) ethyl carbamate, phenyl carbamate, p-(phenylazo)benzyl carbamate, 2,4,6-tri-t-butylphenyl carbamate, 4-(trimethylammonium)benzyl carbamate, 2,4,6-trimethylbenzyl carbamate, formamide, acetamide, chloroacetamide, trichloroacetamide, trifluoroacetamide, phenylacetamide, 3-phenylpropanamide, picolinamide, 3-pyridylcarboxamide, N-benzoylphenylalanyl derivative, benzamide, p-phenylbenzamide, o-nitophenylacetamide, o-nitrophenoxyacetamide, acetoacetamide, (N'-dithiobenzyloxycarbonylamino) acetamide, 3-(p-hydroxyphenyl)propanamide, 3-(o-nitrophenyl)propanamide, 2-methyl-2-(o-nitrophenoxy) propanamide, 2-methyl-2-(o-phenylazophenoxy) propanamide, 4-chlorobutanamide, 3-methyl-3-nitrobutanamide, o-nitrocinnamide, N-acetylmethionine derivative, o-nitrobenzamide, o-(benzoyloxymethyl)benzamide, 4,5-diphenyl-3-oxazolin-2-one, N-phthalimide, N-dithiasuccinimide (Dts), N-2,3-diphenylmaleimide, N-2,5-dimethylpyrrole, N-1,1,4,4-tetramethyldisilylazacyclopentane adduct (STABASE), 5-substituted 1,3-dimethyl-1,3,5-triazacyclohexan-2-one, 5-substituted 1,3-dibenzyl-1,3,5-triazacyclohexan-2-one, 1-substituted 3,5-dinitro-4-pyridone, N-methylamine, N-allylamine, N-[2-(trimethylsilyl)ethoxy]methylamine (SEM), N-3-acetoxypropylamine, N-(1-isopropyl-4-nitro-2-oxo-3-pyroolin-3-yl)amine, quaternary ammonium salts, N-benzylamine, N-di(4-methoxyphenyl)methylamine, N-5-dibenzosuberylamine, N-triphenylmethylamine (Tr), N-[(4-methoxyphenyl)diphenylmethyl]amine (MMTr), N-9-phenylfluorenylamine (PhF), N-2,7-dichloro-9-fluorenylmethyleneamine, N-ferrocenylmethylamino (Fcm), N-2-picolylamino N'-oxide, N-1,1-dimethylthiomethyleneamine, N-benzylideneamine, N-p-methoxybenzylideneamine, N-diphenylmethyleneamine, N-[(2-pyridyl)mesityl]methyleneamine, N—(N',N'-dimethylaminomethylene) amine, N,N'-isopropylidenediamine, N-p-nitrobenzylideneamine, N-salicylideneamine, N-5-chlorosalicylideneamine, N-(5-chloro-2-hydroxyphenyl) phenylmethyleneamine, N-cyclohexylideneamine, N-(5,5-dimethyl-3-oxo-1-cyclohexenyl)amine, N-borane derivative, N-diphenylborinic acid derivative, N-[phenyl (pentacarbonylchromium- or tungsten)carbonyl]amine, N-copper chelate, N-zinc chelate, N-nitroamine, N-nitrosoamine, amine N-oxide, diphenylphosphinamide (Dpp), dimethylthiophosphinamide (Mpt), diphenylthiophosphinamide (Ppt), dialkyl phosphoramidates, dibenzyl phosphoramidate, diphenyl phosphoramidate, benzenesulfenamide, o-nitrobenzenesulfenamide (Nps), 2,4-dinitrobenzenesulfenamide, pentachlorobenzenesulfenamide, 2-nitro-4-methoxybenzenesulfenamide, triphenylmethylsulfenamide, 3-nitropyridinesulfenamide (Npys), p-toluenesulfonamide (Ts), benzenesulfonamide, 2,3,6-trimethyl-4-methoxybenzenesulfonamide (Mtr), 2,4,6-trimethoxybenzenesulfonamide (Mtb), 2,6-dimethyl-4-methoxybenzenesulfonamide (Pme), 2,3,5,6-tetramethyl-4-methoxybenzenesulfonamide (Mte), 4-methoxybenzenesulfonamide (Mbs), 2,4,6-trimethylbenzenesulfonamide (Mts), 2,6-dimethoxy-4-methylbenzenesulfonamide (iMds), 2,2,5,7,8-pentamethylchroman-6-sulfonamide (Pmc), methanesulfonamide (Ms), (3-trimethyl silylethanesulfonamide (SES), 9-anthracenesulfonamide, 4-(4',8'-dimethoxynaphthylmethyl)benzenesulfonamide (DNMBS), benzylsulfonamide, trifluoromethylsulfonamide, and phenacylsulfonamide. Exemplary protecting groups are detailed herein, however, it will be appreciated that the present invention is not intended to be limited to these protecting groups; rather, a variety of additional equivalent protecting groups can be readily identified using the above criteria and utilized in the method of the present invention. Additionally, a variety of protecting groups are described by Greene and Wuts (supra).

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R^{\circ}$; —$(CH_2)_{0-4}OR^{\circ}$; —O—$(CH_2)_{0-4}C(O)OR^{\circ}$; —$(CH_2)_{0-4}CH(OR^{\circ})_2$; —$(CH_2)_{0-4}SR^{\circ}$; —$(CH_2)_{0-4}Ph$, which may be substituted with $R^{\circ}$; —$(CH_2)_{0-4}O(CH_2)_{0-1}Ph$ which may be substituted with $R^{\circ}$; —CH=CHPh, which may be substituted with $R^{\circ}$; —$NO_2$; —CN; —$N_3$; —$(CH_2)_{0-4}N(R^{\circ})_2$; —$(CH_2)_{0-4}N(R^{\circ})C(O)R^{\circ}$; —$N(R^{\circ})C(S)R^{\circ}$; —$(CH_2)_{0-4}N(R^{\circ})C(O)NR^{\circ}_2$; —$N(R^{\circ})C(S)NR^{\circ}_2$; —$(CH_2)_{0-4}N(R^{\circ})C(O)OR^{\circ}$; —$N(R^{\circ})N(R^{\circ})C(O)R^{\circ}$; —$N(R^{\circ})N(R^{\circ})C(O)NR^{\circ}_2$; —$N(R^{\circ})N(R^{\circ})C(O)OR^{\circ}$; —$(CH_2)_{0-4}C(O)R$; —$C(S)R^{\circ}$; —$(CH_2)_{0-4}C(O)OR^{\circ}$; —$(CH_2)_{0-4}C(O)N(R^{\circ})_2$; —$(CH_2)_{0-4}C(O)SR^{\circ}$; —$(CH_2)_{0-4}C(O)OSiR^{\circ}_3$; —$(CH_2)_{0-4}OC(O)R^{\circ}$; —$OC(O)(CH_2)_{0-4}SR$—, $SC(S)SR^{\circ}$; —$(CH_2)_{0-4}SC(O)R$; —$(CH_2)_{0-4}C(O)NR^{\circ}_2$; —$C(S)NR^{\circ}_2$; —$C(S)SR^{\circ}$; —$SC(S)SRO$, —$(CH_2)_{0-4}OC(O)NR^{\circ}_2$; —$C(O)N(OR^{\circ})R^{\circ}$; —$C(O)C(O)R^{\circ}$; —$C(O)CH_2C(O)R^{\circ}$; —$C(NOR^{\circ})R^{\circ}$; —$(CH_2)_{0-4}SSR^{\circ}$; —$(CH_2)_{0-4}S(O)_2R^{\circ}$; —$(CH_2)_{0-4}S(O)_2OR^{\circ}$; —$(CH_2)_{0-4}OS(O)_2R^{\circ}$; —$S(O)_2NR^{\circ}_2$; —$(CH_2)_{0-4}S(O)R^{\circ}$; —$N(R^{\circ})S(O)_2NR^{\circ}_2$; —$N(R^{\circ})S(O)_2R^{\circ}$; —$N(OR^{\circ})R^{\circ}$; —$C(NH)NR^{\circ}_2$; —$P(O)_2R^{\circ}$; —$P(O)R^{\circ}_2$; —$OP(O)R^{\circ}_2$; —$OP(O)(OR^{\circ})_2$; $SiR^{\circ}_3$;

—($C_{1-4}$ straight or branched alkylene)O—N(R$^\circ$)$_2$; or —($C_{1-4}$ straight or branched alkylene)C(O)O—N(R$^\circ$)$_2$, wherein each R$^\circ$ may be substituted as defined below and is independently hydrogen, $C_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R$^\circ$, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R$^\circ$ (or the ring formed by taking two independent occurrences of R$^\circ$ together with their intervening atoms), are independently halogen, —(CH$_2$)$_{0-2}$R$^\bullet$, -(haloR$^\bullet$), —(CH$_2$)$_{0-2}$OH, —(CH$_2$)$_{0-2}$OR$^\bullet$, —(CH$_2$)$_{0-2}$CH(OR$^\bullet$)$_2$; —O(haloR$^\bullet$), —CN, —N$_3$, —(CH$_2$)$_{0-2}$C(O)R$^\bullet$, —(CH$_2$)$_{0-2}$C(O)OH, —(CH$_2$)$_{0-2}$C(O)OR$^\bullet$, —(CH$_2$)$_{0-4}$C(O)N(R$^\circ$)$_2$; —(CH$_2$)$_{0-2}$SR$^\bullet$, —(CH$_2$)$_{0-2}$SH, —(CH$_2$)$_{0-2}$NH$_2$, —(CH$_2$)$_{0-2}$NHR$^\bullet$, —(CH$_2$)$_{0-2}$NR$^\bullet$$_2$, —NO$_2$, —SiR$^\bullet$$_3$, —OSiR$^\bullet$$_3$, —C(O)SR$^\bullet$, —($C_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from $C_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R$^\circ$ include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR*$_2$, or —NO$_2$, wherein each R$^\bullet$ is unsubstituted or where preceded by "halo" is substituted only with one or more halogens, and is independently $C_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^\dagger$, —NR$^\dagger$$_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger$$_2$, —C(S)NR$^\dagger$$_2$, —C(NH)NR$^\dagger$$_2$, or —N(R$^\dagger$)S(O)$_2$R$^\dagger$; wherein each R$^\dagger$ is independently hydrogen, $C_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^\dagger$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^\dagger$ are independently halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet$$_2$, or —NO$_2$, wherein each R$^\bullet$ is unsubstituted or where preceded by "halo" is substituted only with one or more halogens, and is independently $C_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

As used herein, the term "tautomer" includes two or more interconvertible compounds resulting from at least one formal migration of a hydrogen atom and at least one change in valency (e.g., a single bond to a double bond, a triple bond to a single bond, or vice versa). The exact ratio of the tautomers depends on several factors, including temperature, solvent, and pH. Tautomerizations (i.e., the reaction providing a tautomeric pair) may be catalyzed by acid or base. Exemplary tautomerizations include keto-to-enol; amide-to-imide; lactam-to-lactim; enamine-to-imine; and enamine-to-(a different) enamine tautomerizations.

As used herein, the term "catalyst" refers to a substance the presence of which increases the rate and/or extent of a chemical reaction, while not being consumed or undergoing a permanent chemical change itself.

DETAILED DESCRIPTION OF CERTAIN EMBODIMENTS

I. Polymerization Systems of the Invention

In one aspect, the present invention provides polymerization systems for the copolymerization of $CO_2$ and epoxides to produce polycarbonate polyol resins with a high proportion of —OH end-groups. In certain embodiments, a polymerization system includes 1) a metal complex including a permanent ligand set and at least one ligand that is a polymerization initiator, and 2) a chain transfer agent having one or more sites capable of initiating copolymerization of epoxides and $CO_2$, wherein the chain transfer agent contains one or more masked hydroxyl groups. In some embodiments, a polymerization system further includes a co-catalyst. In certain embodiments, a ligand that is a polymerization initiator has a plurality of polymer initiation sites.

I.a. Chain Transfer Agents

Chain transfer agents suitable for the present invention include any compound having one or more sites capable of initiating chain growth in the co-polymerization of an epoxide and carbon dioxide, wherein the chain transfer agent contains one or more masked hydroxyl groups. Preferably such compounds do not have other functional groups that interfere with the polymerization.

As used herein, the term "masked hydroxyl group" refers to a chemical moiety which, upon exposure to suitable conditions, is converted to, or "unmasks", a hydroxyl group.

In some embodiments, a masked hydroxyl group is hydroxyl group bearing a protecting group. In certain embodiments, such masked hydroxyl groups are unmasked under suitable deprotection conditions to provide a free hydroxyl group.

Figure 1A:
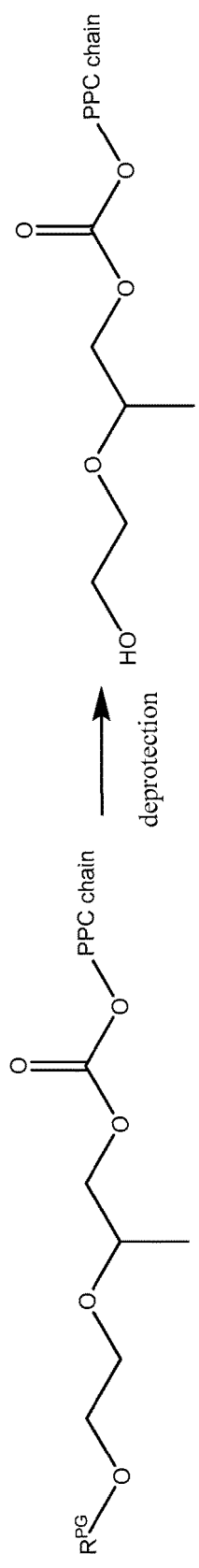
FIG. 1A & FIG. 1B depict examples of masked hydroxyl groups undergoing deprotection to yield polypropylene carbonate having hydroxyl end groups. Polymer products have either a remnant of a chain transfer agent (FIG. 1A) or are pure polycarbonate (FIG. IB).

The present invention encompasses the recognition that a chain transfer agent bearing one or more protected hydroxyl groups may, following polymerization and incorporation of the chain transfer agent into the polymer, be deprotected to reveal free hydroxyl groups. In some embodiments, the free hydroxyl groups are located at the polymer chain ends. For one such example, the use of ethylene glycol bearing a protecting group on one hydroxyl group, $HO(CH_2)_2OR^{PG}$, as a chain transfer agent in a polymerization with propylene oxide and $CO_2$ provides polypropylene carbonate (PPC) bearing the protected ethylene glycol group on one end. Removal of the protecting group provides PPC having a free hydroxyl group on this terminus. (It will be understood that upon completion of polymerization the other terminus also bears a free hydroxyl group as well.) See FIG. 1A.

Figure 1B:
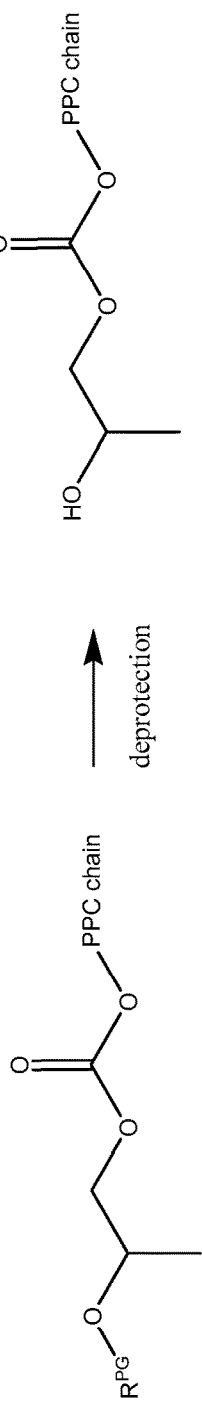

In other embodiments, a masked hydroxyl group is more easily recognized subsequent to incorporation of a chain transfer agent into a polymer. Such masked hydroxyl groups may be referred to as "latent" hydroxyl groups. For example, using a reagent "HO—$R^{PG}$" as a chain transfer agent in a polymerization with propylene oxide and $CO_2$ provides polypropylene carbonate (PPC) bearing an "—$OR^{PG}$" group on one end. The oxygen atom is now a "latent" hydroxyl group, as deprotection will result in a free hydroxyl group. (It will be understood that upon completion of polymerization the other terminus also bears a free hydroxyl group as well.) See FIG. 1B. Removal of the protecting group provides PPC having a free hydroxyl group on this terminus. In addition, the resulting polycarbonate polymer is "pure polycarbonate," having all hydroxyl end groups and no embedded chain transfer agent or other fragments derived from monomers other than the epoxide(s) and $CO_2$. Such pure polycarbonate is a novel composition.

In some embodiments, a latent hydroxyl group is formed by using a chain transfer agent selected from the group consisting of benzyl alcohol, methanol, t-butanol, and allyl alcohol. In some embodiments, a latent hydroxyl group is formed by using a chain transfer agent having a carboxylic acid functionality, wherein the resulting ester is hydrolyzed to leave a free hydroxyl group on the polymer terminus.

It will be appreciated that the distinction between protected vs. latent hydroxyl groups is mainly in whether the hydroxyl group being unmasked has itself participated in the polymerization reaction. Otherwise, the concepts are nearly identical, as illustrated in FIG. 1.

In general, for all chain transfer agents described herein for use in the provided polymerization systems, all chain transfer agents have one or more masked hydroxyl groups, whether stated explicitly or not.

Suitable chain transfer agents may have a broad array of chemical structures. In general, the only requirement is that each molecule of the chain transfer agent be capable of initiating one or more polycarbonate chains, this can occur by several mechanisms including: by ring-opening an epoxide monomer, by reacting with carbon dioxide molecules to yield a moiety capable of sustaining polymer chain growth, or by a combination of these. In some embodiments, a chain transfer agent may have two or more functional groups independently capable of reacting with carbon dioxide or an epoxide; examples of these include, but are not limited to molecules such as diacids, glycols, diols, triols, hydroxyacids, amino acids, amino alcohols, dithiols, mercapto alcohols, saccharides, catechols, polyethers, etc. In some embodiments, the chain transfer agent may include a multiply active functional group that is itself able to react multiple times to initiate more than one polymer chain. Examples of the latter include, but are not limited to functional groups having a single atom capable of reacting multiple times such as, ammonia, primary amines and water, as well as functional groups having more than one nucleophilic atom such as carbonate, amindines, guanidines, phosphates, urea, boronic acids, etc.

In certain embodiments, chain transfer agents of the present disclosure have a structure Y-A-(Y)$_{n'}$, where:
each —Y group is independently a functional group capable of initiating chain growth of epoxide $CO_2$ copolymers or a protected hydroxyl group, wherein at least one Y group is a protected hydroxyl group and the number of Y groups comprising protected hydroxyl groups is less than the total number of Y groups;
-A- is a covalent bond or a multivalent compound; and
n' is an integer between 1 and 10 inclusive.

In some embodiments each Y group is independently selected from the group consisting of: —$OR^{PG}$, —OH, —C(O)OH, —C(OR$^y$)OH, —OC(R$^y$)OH, —NHR$^y$, —NHC(O)R$^y$, —NHC=NR$^y$; —NR$^y$C=NH; —NR$^y$C(NR$^y{}_2$) =NH; —NHC(NR$_2$)=NR$^y$; —NHC(O)OR$^y$, —NHC(O)NR$^y{}_2$; —C(O)NHR$^y$, —C(S)NHR$^y$, —OC(O)NHR$^y$, —OC(S)NHR$^y$, —SH, —C(O)SH, —B(OR$^y$)OH, —P(O)$_a$(R$^y$)$_b$(OR$^y$)$_c$(O)$_d$H, —OP(O)$_a$(R$^y$)$_b$(OR$^y$)$_c$(OH)$_d$, —N(R$^y$)OH, —ON(R$^y$)H; =NOH, =NN(R$^y$)H, where
each occurrence of R$^y$ is independently —H, or an optionally substituted radical selected from the group consisting of $C_{1-20}$ aliphatic, $C_{1-20}$ heteroaliphatic, 3- to 12-membered heterocyclic, and 6- to 12-membered aryl,
each occurrence of R$^{PG}$ is independently a hydroxyl protecting group, wherein a single R$^{PG}$ moiety may protect multiple hydroxyl groups;
a and b are each independently 0 or 1,
c is 0, 1 or 2,
d is 0 or 1, and
the sum of a, b, and c is 1 or 2.

In certain embodiments, -A- is a covalent bond. For example, when Y-A-(Y)$_{n'}$ is oxalic acid, -A- is a covalent bond.

In some embodiments, -A- is an optionally substituted radical selected from the group consisting of: straight or branched $C_{2-30}$ aliphatic, straight or branched $C_{2-30}$ heteroaliphatic, 6- to 12-membered aryl, 3- to 12-membered heterocyclic, 5- to 12-membered heteroaryl, polyolefins, polyesters, polyethers, polycarbonates, polyoxymethylene and mixtures of two or more of these.

A hydroxyl protecting group is any suitable protecting group as defined above and as described in classes and subclasses herein. In some embodiments, a hydroxyl protecting group is an ether. In some embodiments, a hydroxyl protecting group is an ester. In some embodiments, a protected hydroxyl group is attached to an aliphatic carbon. In some embodiments, a protected hydroxyl group is attached to an aryl carbon. In some embodiments, a protecting group protects more than one hydroxyl group of a chain transfer agent, for example, 1,2- or 1,3-diols.

In some embodiments, each —$OR^{PG}$ is selected from the group consisting of an aliphatic ether, a substituted methyl ether, a cycloaliphatic ether, an arylalkyl ether, a silyl ether, a formate ester, an aliphatic ester, an aryl ester, a carbonate, a carbamate, an acetal, a ketal, a cyclic carbonate, and a cyclic boronate.

In certain embodiments, each —OR$^{PG}$ is selected from the group consisting of methyl ether, methoxymethyl ether (MOM), methylthiomethyl ether (MTM), 2-methoxyethoxymethyl ether (MEM), bis(2-chloroethyoxy)methyl ether, tetrahydropyranyl ether (THP), tetrahydrothiopyranyl ether, 4-methoxytetrahydropyranyl ether, 4-methoxytetrahydrothiopyranyl ether, tetrahydrofuranyl ether, tetrahydrothiofuranyl ether, 1-ethoxyethyl ether, 1-methyl-1-methoxyether ether, 2-(phenylselenyl)ethyl ether, t-butyl ether, allyl ether, benzyl ether, o-nitrobenzyl ether, triphenylmethyl ether, alpha-naphthyldiphenylmethyl ether, p-methoxyphenyldiphenylmethyl ether, 9-(9-phenyl-10-oxo)anthryl ether (tritylone), trimethylsilyl ether (TMS), isopropyldimethylsilyl ether, t-butyldimethylsilyl ether (TBDMS), t-butyldiphenylsilyl ether, tribenzylsilyl ether, and triisopropylsilyl ether.

In some embodiments, each —OR$^{PG}$ is selected from the group consisting of formate ester, acetate ester, trichloroacetate ester, phenoxyacetate ester, isobutyrate ester, pivaloate ester, adamantoate ester, benzoate ester, 2,4,6-trimethylbenzoate (mesitoate) ester, methyl carbonate, 2,2,2-trichloroethyl carbonate, allyl carbonate, p-nitrophenyl carbonate, benzyl carbonate, p-nitrobenzyl carbonate, benzyl carbonate, N-phenylcarbamate, nitrate ester, and 2,4-dinitrophenylsulfenate ester.

In some embodiments, each —OR$^{PG}$ is selected from the group consisting of a methylenedioxy derivative, ethylidene acetal, an acetonide, benzylidene acetal, p-methoxybenzylidene acetal, methoxymethylene acetal, a dimethoxymethylenedioxy derivative, a cyclic carbonate, and a cyclic boronate.

In some embodiments, an acidic hydrogen atom bound in any of the above functional groups may be replaced by a metal atom or an organic cation without departing from the present invention (e.g. —C(O)OH may instead be —C(O)O$^-$Na$^+$, —C(O)O$^-$N$^+$(R)$_4$, —C(O)O$^-$(Ca$^{2+}$)$_{0.5}$, —C(O)O$^-$PPN$^+$ or —SH, may be —S$^-$Na$^+$ etc.) such alternatives are specifically included herein and alternate embodiments employing such salts are implicitly encompassed by the disclosure and examples herein.

In certain embodiments, each Y group is independently selected from the group consisting of —OR$^{PG}$, —OH, and —C(O)OH. In some embodiments, one or more Y groups are hydroxyl or a hydroxyl salt. In certain embodiments, each hydroxyl group is a primary or secondary alcohol. In other embodiments, a hydroxyl group is bonded to an aromatic or heteroaromatic ring. In certain embodiments, a hydroxyl group is a phenol. In some embodiments, a hydroxyl group is benzylic, allylic or propargylic. In other embodiments, hydroxyl groups are part of a carbohydrate. In other embodiments, a hydroxyl group is part of a polymer or oligomer such as a polyether, a polyester, a polyvinyl alcohol or a hydroxy-functionalized or hydroxy-terminated polyolefin.

In some embodiments, a chain transfer agent is a polyhydric alcohol, wherein one or more hydroxyl groups are protected. In certain embodiments, the polyhydric alcohol is a diol, while in other embodiments the polyhydric alcohol is a triol, a tetraol or a higher polyol. In certain embodiments, n' is 1, (i.e. two Y groups are present) and one Y group is a protected hydroxyl group. In some embodiments, two hydroxyl groups are on adjacent carbons (i.e. the chain transfer agent is a glycol), wherein one or both hydroxyls are protected.

In some embodiments, a chain transfer agent is selected from the group consisting of 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, and 1,4-cyclohexanediethanol.

In certain embodiments, a chain transfer agent is selected from diethylene glycol, triethylene glycol, tetraethylene glycol, higher poly(ethylene glycol), preferably those having number average molecular weights of from 220 to about 2000 g/mol, dipropylene glycol, tripropylene glycol, and higher poly(propylene glycols) preferably those having number average molecular weights of from 234 to about 2000 g/mol.

In some embodiments, two hydroxyl groups are on non-adjacent carbons, wherein one or both hydroxyls are protected. In certain embodiments, two hydroxyl groups are on the opposite ends of a chain (i.e. the chain transfer agent is an α-ω diol), wherein one or both hydroxyls are protected. In certain embodiments, such α-ω diols include C$_3$ to C$_{20}$ aliphatic chains (i.e. -A- is an optionally substituted C$_{3-20}$ aliphatic chain). In certain embodiments, such α-ω diols comprise a polyether (i.e. -A- is a polyether chain). In certain embodiments, such α-ω diols comprise a hydroxy-terminated polyolefin (i.e. -A- is a polyolefin chain). In certain embodiments, such α-ω diols comprise paraformaldehyde (i.e. -A- is a polyoxymethylene chain).

In certain embodiments, diol chain transfer agents include hydroxyl-terminated polyolefins. Such materials include polymers sold by Sartomer Inc. under the trade name Krasol®. In other embodiments, diol chain transfer agents can include hydroxyl-terminated polyisobutylenes (PIB-diols and -triols) such as Polytail® H or Polytail®HA from Mitsubish Chemical Co. Other examples include hydroxyl-terminated polybutadienelstyrene (HTBS).

Yet other examples of suitable diols include 4,4'-(1-methylethylidene) bis[cyclohexanol], 2,2'-methylenebis[phenol], 4,4'-methylenebis[phenol], 4,4'-(phenylmethylene)bis[phenol], 4,4'-(diphenylmethylene)bis[phenol], 4,4'-(1,2-ethanediyl)bis[phenol], 4,4'-(1,2-cyclohexanediyl)bis[phenol], 4,4'-(1,3-cyclohexanediyl)bis[phenol], 4,4'-(1,4-cyclohexanediyl)bis[phenol], 4,4'-ethylidenebis[phenol], 4,4'-(1-phenylethylidene)bis[phenol], 4,4'-propylidenebis[phenol], 4,4'-cyclohexylidenebis[phenol], 4,4'-(1-methylethylidene)bis[phenol], 4,4'-(1-methylpropylidene)bis[phenol], 4,4'-(1-ethylpropylidene)bis[phenol], 4,4'-cyclohexylidenebis[phenol], 4,4'-(2,4,8,10-tetraoxaspiro[5.5]undecane-3,9-diyldi-2, 1-ethanediyl)bis[phenol], 1,2-benzenedimethanol, 1,3-benzenedimethanol, 1,4-benzenedimethanol, 4,4'-[1,3-phenylenebis(1-methylethylidene)]bis[phenol], 4,4'-[1,4-phenylenebis(1-methylethylidene)]bis[phenol], phenolphthalein, 4,4'-(1-methylidene)bis[2-methylphenol], 4,4'-(1-methylethylidene)bis[2-(1-methylethyl)phenol], 2,2'-methylenebis[4-methyl-6-(1-methylethyl)phenol].

In certain embodiments, a chain transfer agent is selected from monoprotected 1,3 propane diol, 1,4 butane diol, dipropylene glycol, diethylene glycol, and isosorbide In certain embodiments, a chain transfer agent is a polyhydric phenol derivative.

In some embodiments, a polyhydric alcohol provided as a chain transfer agent is a triol, a tetraol or a higher polyol. Suitable triols may include, but are not limited to: aliphatic triols having a molecular weight less than 500 such as trimethylolethane; trimethylolpropane; glycerol; 1,2,4-butanetriol; 1,2,6-hexanetriol; tris(2-hydroxyethyl)isocyanurate;

hexahydro-1,3,5-tris(hydroxyethyl)-s-triazine; 6-methylheptane-1,3,5-triol; polypropylene oxide triol; and polyester triols.

In certain other embodiments, a polyol is a tetraol. Examples of suitable tetraols include, but are not limited to: erythritol, pentaerythritol; 2,2'-dihydroxymethyl-1,3-propanediol; and 2,2'-(oxydimethylene) bis-(2-ethyl-1,3-propanediol).

In still other embodiments, a polyol is a carbohydrate. Examples of suitable carbohydrates include sugar alcohols, monosaccharides, disaccharides, oligosaccharides and polysaccharides and higher oligomers such as starch and starch derivatives.

In some embodiments, one —OH group of a diol is phenolic and the other is aliphatic, wherein one of the —OH groups is protected. In other embodiments, each hydroxy group is phenolic. In certain embodiments, a chain transfer agent is an optionally substituted catechol, resorcinol or hydroquinone derivative.

In some embodiments where a Y-group is —OH, the —OH group is an enol tautomer of a carbonyl group. In some embodiments where a Y group is —OH, the —OH group is a carbonyl hydrate or a hemiacetal.

In some embodiments, n' is 1 to 4. In some embodiments, n' is 1. In some embodiments, n' is 2. In some embodiments, n' is 3. In some embodiments, n' is 4. In some embodiments, n' is 5.

In other embodiments where n' is 1, only one Y group is —OR$^{PG}$, and the other Y group is selected from the group consisting of: —OH, —C(O)OH, —C(OR$^y$)OH, —OC(R$^y$)OH, —NHR$^y$, —NHC(O)R$^y$, —NHC(O)OR$^y$, —C(O)NHR$^y$, —C(S)NHR$^y$, —OC(O)NHR$^y$, —OC(S)NHR$^y$, —SH, —C(O)SH, —B(OR$^y$)OH, —P(O)$_a$(R$^y$)$_b$(OR$^y$)$_c$OH, —OP(O)$_a$(R$^y$)$_b$(OR$^y$)$_c$OH, —N(R$^y$)OH, —ON(R$^y$)H; =NOH, =NN(R$^y$)H. In particular embodiments, n' is 1, one Y group is —OR$^{PG}$, and the other Y group is selected from the group consisting of —OH, —SH, —C(O)OH, —NHR$^y$, and —C(O)NHR$^y$. In certain embodiments, n' is 1, one Y group is —OR$^{PG}$, and the other Y group is —OH. In certain embodiments, n' is 1, one Y group is —OR$^{PG}$, and the other Y group is —C(O)OH. In other embodiments where n' is 1, one Y group is —OR$^{PG}$ and the other Y group is —SH. In other embodiments where n' is 1, one Y group is —OR$^{PG}$ and one Y group is —NHR$^y$. In certain embodiments, n' is 2, and one or two Y groups is —OR$^{PG}$ (i.e. the chain transfer agent is a triol). In some embodiments where n' is 2, two Y groups are —OR$^{PG}$, and the third Y group is selected from the group consisting of —OH, —SH, —C(O)OH, —NHR$^y$, and —C(O)NHR$^y$. In other embodiments where n' is 2, only one Y group is —OR$^{PG}$, while the other two Y groups are independently selected from the group consisting of —OH, —SH, —C(O)OH, —NHR$^y$, and —C(O)NHR$^y$.

In some embodiments, polyalcohol chain transfer agents encompass naturally occurring materials such as sugar alcohols, carbohydrates, saccharides, polysaccharides, starch, starch derivatives, lignins, lignans, partially hydrolyzed triglycerides, and the like, as well as known derivatives of any of these materials. In certain embodiments, a chain transfer agent comprises starch. In certain embodiments, a chain transfer agent comprises isosorbide.

In other embodiments, at least one Y group of a chain transfer agent is an amine. In some embodiments, at least one Y group is a primary amine. In other embodiments, at least one Y group is a secondary amine. In certain embodiments, at least one Y group is an aniline or aniline derivative. In some embodiments, at least one Y group is an N—H group that is part of a heterocycle.

In certain embodiments, a chain transfer agent comprises a polyamine. In some embodiments, a chain transfer agent comprises a diamine. In other embodiments, a chain transfer agent comprises a triamine, tetraamine or a higher amine oligomer.

In certain embodiments, at least one Y group is an amine and one or more additional Y groups are independently selected from the group consisting of —OR$^{PG}$, —OH, —C(O)OH, —C(OR$^y$)OH, —OC(R$^y$)OH, —NHC(O)R$^y$, —NHC(O)OR$^y$, —C(O)NHR$^y$, —C(S)NHR$^y$, —OC(O)NHR$^y$, —OC(S)NHR$^y$, —SH, —C(O)SH, —B(OR$^y$)OH, —P(O)$_a$(R$^y$)$_b$(OR$^y$)$_c$OH, —OP(O)$_a$(R$^y$)$_b$(OR$^y$)$_c$OH, —N(R$^y$)OH, —ON(R$^y$)H; =NOH, =NN(R$^y$)H. In certain embodiments, at least one Y group is an amine and one or more additional Y groups are independently selected from the group consisting of, —OR$^{PG}$, —OH, —SH, —C(O)OH, and —C(O)NHR$^y$.

In some embodiments, at least one Y group is a carboxylic acid or a salt thereof. In some embodiments, all Y groups present are carboxylic acid salts thereof, while in other embodiments, one or more carboxylic acid Y groups are present along with one or more other functional groups that can initiate the copolymerization. In certain embodiments, at least one Y group is a benzoic acid derivative.

In certain embodiments, a chain transfer agent is a diacid, a triacid or a higher polyacid. In some embodiments, a chain transfer agent is a diacid. In certain embodiments, n' is 1, and both Y groups present are carboxylic acids. In certain embodiments, a diacid is phthalic acid, isophthalic acid, terephthalic acid. In certain embodiments, a diacid is maleic acid, succinic acid, malonic acid, glutaric acid, adipic acid, pimelic acid, suberic acid, or azelaic acid. In some embodiments, a chain transfer agent is a triacid. In certain embodiments, a triacid is citric acid, isocitric acid, cis- or trans-aconitic acid, propane-1,2,3-tricarboxylic acid or trimesic acid.

In certain embodiments, at least one Y group is a carboxylic acid or carboxylate and one or more additional Y groups are independently selected from the group consisting of —OH, —OR$^{PG}$, —C(OR$^y$)OH, —OC(R$^y$)OH, —NHR$^y$, —NHC(O)R$^y$, —NHC(O)OR$^y$, —C(O)NHR$^y$, —C(S)NHR$^y$, —OC(O)NHR$^y$, —OC(S)NHR$^y$, —SH, —C(O)SH, —B(OR$^y$)OH, —P(O)$_a$(R$^y$)$_b$(OR$^y$)$_c$OH, —OP(O)$_a$(R$^y$)$_b$(OR$^y$)$_c$OH, —N(R$^y$)OH, —ON(R$^y$)H; =NOH, =NN(R$^y$)H. In certain embodiments, at least one Y group is a carboxylic acid and one or more additional Y groups are independently selected from the group consisting of —OR$^{PG}$, —OH, —SH, —NHR$^y$, and —C(O)NHR$^y$.

In some embodiments, a chain transfer agent is an amino acid containing a masked hydroxyl group. In certain embodiments, such amino acid chain transfer agents include the naturally occurring amino acids. In certain embodiments, amino acid chain transfer acids include peptides. In some embodiments, the peptides contain between 2 and about 20 amino acid residues. In other embodiments, the chain transfer agent is a thiol acid.

In some embodiments, the chain transfer agent is a hydroxy acid, wherein at least one hydroxyl group of the hydroxyl acid is protected. In some embodiments, hydroxy acids are alpha-hydroxy acids. In certain embodiments an alpha hydroxy acid is selected from the group consisting of: glycolic acid, DL-lactic acid, D-lactic acid, L-lactic, citric acid and mandelic acid. In some embodiments, a hydroxy acid is a beta-hydroxy acid. In certain embodiments, a beta hydroxy acid is selected from the group consisting of: 3-hydroxypropionic acid, DL 3-hydroxybutryic acid, D-3 hydroxybutryic acid, L 3-hydroxybutyric acid, DL-3-hydroxy valeric acid, D-3-hydroxy valeric acid, L-3-hydroxy valeric acid, salicylic acid, and derivatives of salicylic acid. In some embodiments, a hydroxy acid is an α-ω hydroxy acid. In certain embodiments, α-ω hydroxy acids are selected from the group consisting of optionally substituted $C_{3-20}$ aliphatic α-ω hydroxy acids. In certain embodiments, an α-ω hydroxy acid is a polyester oligomeric ester.

In some embodiments, a chain transfer agent comprises one or more carboxylic acid groups that initiate chain growth in the co-polymerization of an epoxide and carbon dioxide, and the resulting ester groups can be hydrolyzed following polymerization to provide polymer chain ends with free hydroxyl groups. In some embodiments, a polycarboxylic acid is used as a chain transfer agent, and following hydrolysis, the molecular weight of the resulting polymer chains is correspondingly lower, as dependent upon the ratio of polymer chains after and before hydrolysis.

In some embodiments, a chain transfer agent is a polycarboxylic acid. In certain embodiments, a chain transfer agent includes a diacid. In certain embodiments, a chain transfer agent includes a compound selected from the group consisting of:

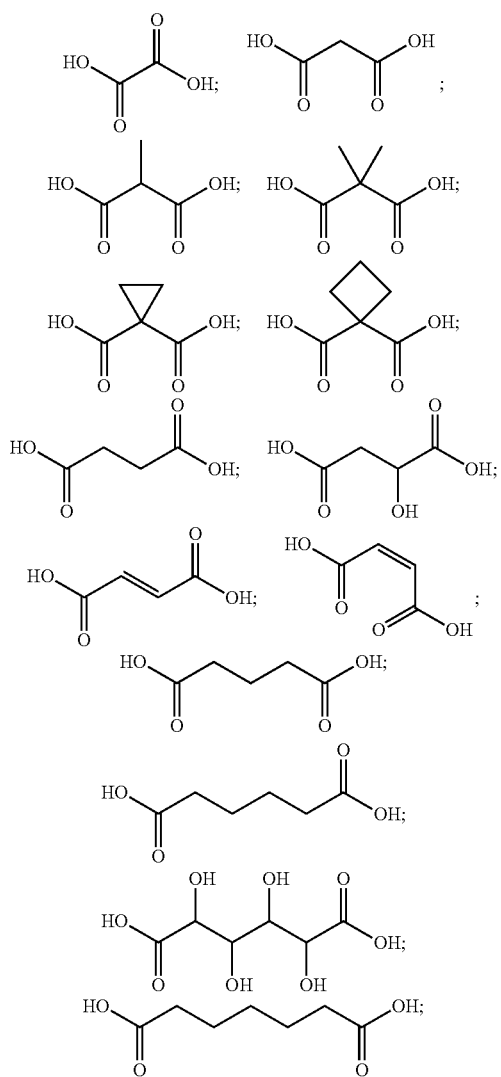

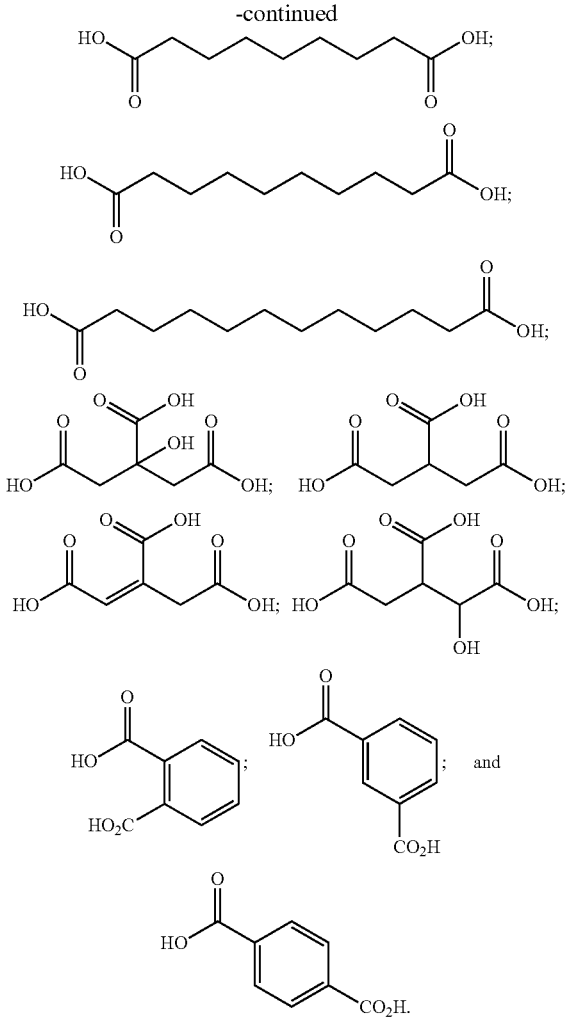

In certain embodiments, diacid chain transfer agents include carboxy terminated polyolefin polymers. In certain embodiments, carboxy terminated polyolefins include materials such as NISSO-PB C-series resins produced by Nippon Soda Co. Ltd.

In some embodiments, the chain transfer agent is selected from the group consisting of: phthalic acid, isophthalic acid, terephthalic acid, maleic acid, succinic acid, malonic acid, glutaric acid, adipic acid, pimelic acid, suberic acid, and azelaic acid.

In certain embodiments, a chain transfer agent is a hydroxy acid. In certain embodiments, a hydroxy acid is selected from the group consisting of:

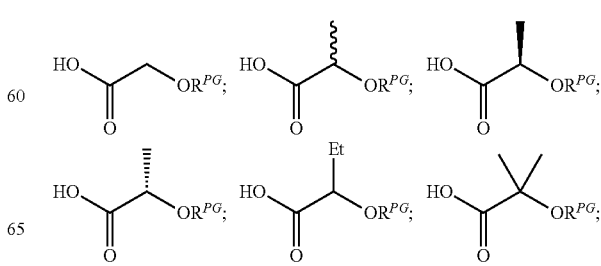

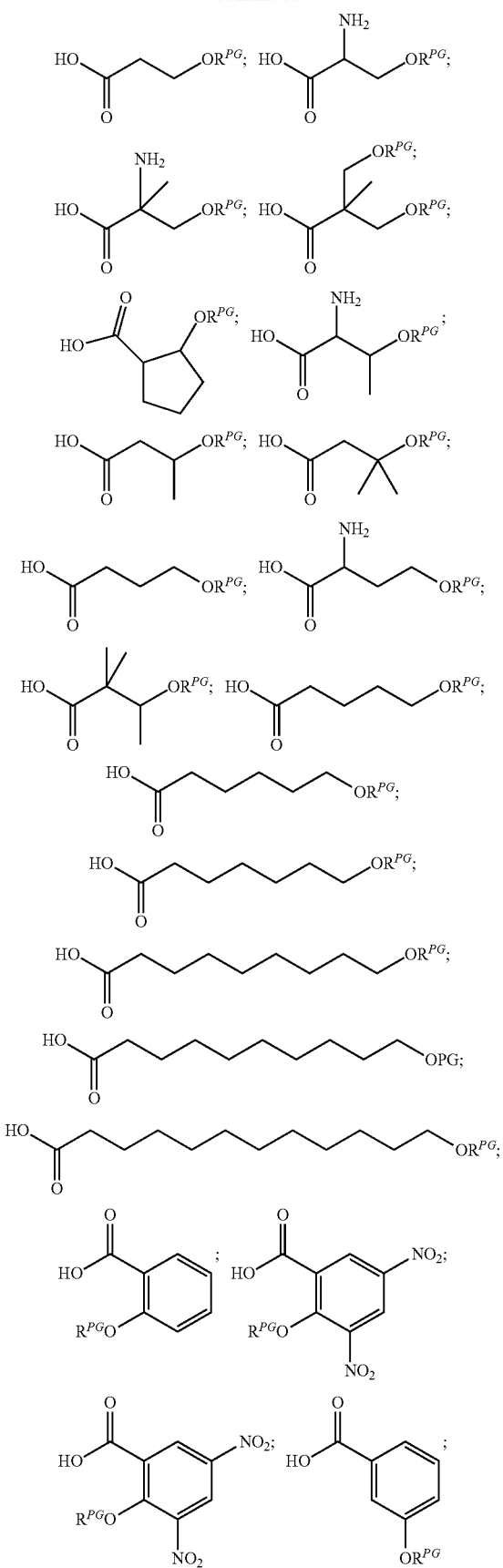

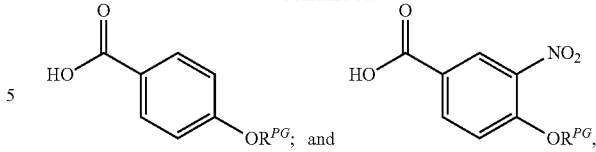

wherein each $R^{PG}$ is independently a hydroxyl protecting group.

In certain embodiments where the provided chain transfer agent includes an acidic functional group, the compound is provided as a salt. In certain embodiments a carboxylic chain transfer agent is provided as an ammonium salt.

In some embodiments, where one or more Y groups is a carboxyl group, a chain transfer agent is provided as a carboxylate salt. In certain embodiments, a carboxylate salt is a group I or II metal salt. In some embodiments, a carboxylate salt is an ammonium salt. In certain embodiments, an ammonium cation is $NH_4^+$. In some embodiments, an ammonium cation is a protonated primary, secondary, or tertiary amine. In some embodiments, a salt is a quaternary ammonium salt. In some embodiments, a quaternary ammonium cation of a salt is tetramethyl, tetrabutyl, or trihexylammonium ammonium. In certain embodiments, a carboxylate salt is a phosphonium carboxylate.

In other embodiments, at least one Y group of a chain transfer agent is a thiol. In some embodiments, at least one Y group is a primary thiol. In other embodiments, at least one Y group is a secondary or tertiary thiol. In certain embodiments, at least one Y group is a thiophenol or thiophenol derivative.

In certain embodiments, a chain transfer agent is a polythiol having at least one masked hydroxyl group. In some embodiments, a chain transfer agent is a dithiol. In some embodiments, a chain transfer agent is a trithiol or higher thiol oligomer.

In certain embodiments, at least one Y group is a thiol and one or more additional Y groups are independently selected from the group consisting of —$OR^{PG}$, —OH, —C(O)OH, —C($OR^y$)OH, —OC($R^y$)OH, —$NHR^y$, —NHC(O)$R^y$, —NHC(O)$OR^y$, —C(O)$NHR^y$, —C(S)$NHR^y$, —OC(O)$NHR^y$, —OC(S)$NHR^y$, —C(O)SH, —B($OR^y$)OH, —P(O)$_a$($R^y$)$_b$($OR^y$)$_c$OH, —OP(O)$_a$($R^y$)$_b$($OR^y$)$_c$OH, —N($R^y$)OH, —ON($R^y$)H; =NOH, =NN($R^y$)H. In certain embodiments, at least one Y group is a thiol and one or more additional Y groups are independently selected from the group consisting of —$OR^{PG}$, —OH, —$NHR^y$, —C(O)OH, and —C(O)$NHR^y$. In some embodiments, a chain transfer agent is a thio alcohol having a protected hydroxyl group.

In certain embodiments, a Y group of a chain transfer agent is an active NH-containing functional group. In certain embodiments, a nitrogen atom of the NH-containing functional group is nucleophilic. In certain embodiments, a active NH-containing functional group is selected from the group consisting of C-linked amides, N-linked amides, O-linked carbamates N-linked carbamates, ureas, guanidines, amidines, hydrazones, and N- or C-linked thioamides. In certain embodiments, one or more Y groups is a primary amide.

In certain embodiments, polymerization systems of the present invention include only one chain transfer agent, while in other embodiments, mixtures of two or more chain transfer agents are used.

In certain embodiments, polymerization systems of the present invention include a solvent in which a chain transfer agent dissolves. In certain embodiments, a chain transfer agent is poorly soluble in the epoxide, but is soluble in a mixture of epoxide and another solvent added to the reaction mixture. In certain embodiments, the solvent added to the polymerizations system is chosen from the group consisting of esters, nitriles, ketones, aromatic hydrocarbons, ethers, amines and combinations of two or more of these.

In some embodiments, a chain transfer agent may contain a single multiply active functional group. In some embodiments, the chain transfer agent may contain a single multiply active functional group in addition to one or more of the Y-groups described above. In certain embodiments, a chain transfer agent may contain two or more multiply active functional groups. In certain embodiments, a chain transfer agent may contain two or more multiply active functional groups in combination with one or more of the Y groups described hereinabove.

I.b Metal Centered Catalysts

In some embodiments, polymerization systems of the present invention incorporate any transition metal complex capable of catalyzing the copolymerization of carbon dioxide and epoxides. In certain embodiments, the polymerization systems include any of the catalysts disclosed in U.S. Pat. Nos. 7,304,172, and 6,870,004; in PCT Publication Numbers WO2008136591A1, WO2008150033A1, WO2009137540, WO2010028362, WO2010022388, and WO2012037282, and in Chinese Patent Application Numbers CN200710010706, and CN200810229276, the entirety of each of which is hereby incorporated herein by reference.

In certain embodiments, polymerization systems of the present invention include metal complexes denoted $L_p$-M-$(L_I)_n$, where $L_p$ is a permanent ligand set, M is a metal atom, and $L_I$ is a ligand that is a polymerization initiator, and n is an integer between 0 and 2 inclusive representing the number of initiating ligands present.

I.b.1 Metal Atoms

As described above, metal complexes catalyzing the copolymerization of carbon dioxide and epoxides may be used in accordance with the present invention. In some embodiments, a metal atom, M, is selected from periodic table groups 3-13, inclusive. In certain embodiments, M is a transition metal selected from periodic table groups 5-12, inclusive. In some embodiments, M is a transition metal selected from periodic table groups 4-11, inclusive. In certain embodiments, M is a transition metal selected from periodic table groups 5-10, inclusive. In certain embodiments, M is a transition metal selected from periodic table groups 7-9, inclusive. In some embodiments, M is selected from the group consisting of Cr, Mn, V, Fe, Co, Mo, W, Ru, Al, and Ni. In some embodiments, M is a metal atom selected from the group consisting of: cobalt; chromium; aluminum; titanium; ruthenium; and manganese. In some embodiments, M is cobalt. In some embodiments, M is chromium. In some embodiments, M is aluminum.

In certain embodiments, a metal complex is a zinc, cobalt, chromium, aluminum, titanium, ruthenium, or manganese complex. In certain embodiments, a metal complex is an aluminum complex. In other embodiments, a metal complex is a chromium complex. In yet other embodiments, a metal complex is a zinc complex. In certain other embodiments, a metal complex is a titanium complex. In still other embodiments, a metal complex is a ruthenium complex. In certain embodiments, a metal complex is a manganese complex. In certain embodiments, a metal complex is cobalt complex. In certain embodiments where a metal complex is a cobalt complex, the cobalt metal has an oxidation state of +3 (i.e., Co(III)). In other embodiments, the cobalt metal has an oxidation state of +2 (i.e., Co(II)).

I.b.2 Permanent Ligand Sets

A permanent ligand set '$L_p$' comprises one or more ligands that remain coordinated with a metal center throughout the catalytic cycle. This is in contrast to other ligands such as polymerization initiators, monomer molecules, polymer chains, and solvent molecules that may participate in the catalytic cycle or may be exchanged under the polymerization conditions.

In certain embodiments, a permanent ligand set comprises a single multidentate ligand that remains associated with the metal center during catalysis. In some embodiments, the permanent ligand set includes two or more ligands that remain associated with the metal center during catalysis. In some embodiments, a metal complex comprises a metal atom coordinated to a single tetradentate ligand while in other embodiments, a metal complex comprises a chelate containing a plurality of individual permanent ligands. In certain embodiments, a metal complex contains two bidentate ligands. In some embodiments, a metal complex contains a tridentate ligand.

In various embodiments, tetradentate ligands suitable for metal complexes of the present invention may include, but are not limited to: salen derivatives 1, derivatives of salan ligands 2, bis-2-hydroxybenzamido derivatives 3, derivatives of the Trost ligand 4, porphyrin derivatives 5, derivatives of tetrabenzoporphyrin ligands 6, derivatives of corrole ligands 7, phthalocyaninate derivatives 8, and dibenzotetramethyltetraaza[14]annulene (tmtaa) derivatives 9 or 9'.

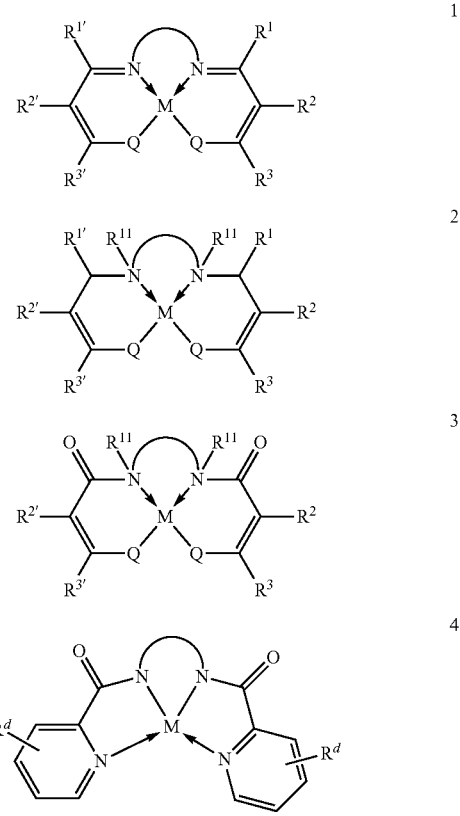

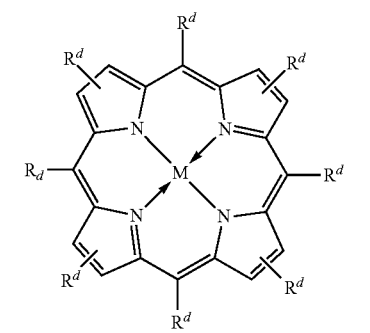

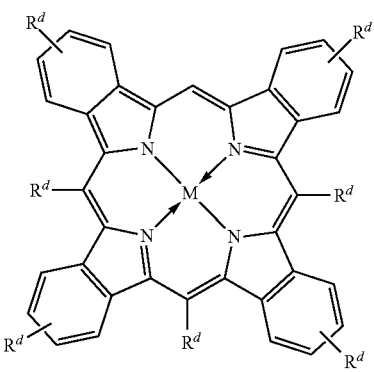

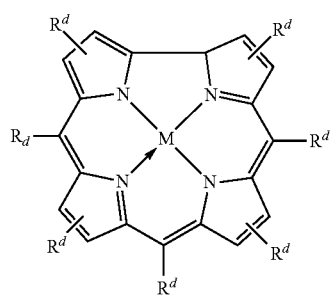

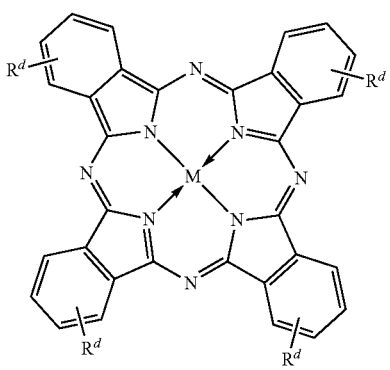

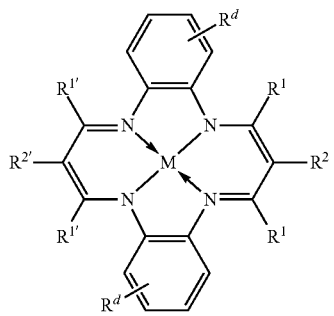

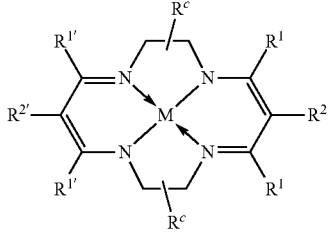

wherein,

Q, at each occurrence is independently O or S;

$R^1$ and $R^{1'}$ are independently selected from the group consisting of: —H, optionally substituted $C_1$ to $C_{12}$ aliphatic; optionally substituted 3- to 14-membered carbocycle; optionally substituted 3- to 14-membered heterocycle; and $R^{21}$;

$R^2$ and $R^{2'}$ are independently selected from the group consisting of: —H; optionally substituted $C_1$ to $C_{12}$ aliphatic; optionally substituted 3- to 14-membered carbocycle; optionally substituted 3- to 14-membered heterocycle; $R^{14}$; $R^{20}$; and $R^{21}$;

$R^3$ and $R^{3'}$ are independently selected from the group consisting of:
—H; optionally substituted $C_1$ to $C_{12}$ aliphatic; optionally substituted 3- to 14-membered carbocycle; optionally substituted 3- to 14-membered heterocycle, and $R^{21}$;

$R^c$ at each occurrence is independently selected from the group consisting of: —H; optionally substituted $C_1$ to $C_{12}$ aliphatic; an optionally substituted 3- to 14-membered carbocycle; an optionally substituted 3- to 14 membered heterocycle; $R^{20}$; and $R^{21}$, where two or more $R^c$ groups may be taken together with intervening atoms to form one or more optionally substituted rings and, when two $R^c$ groups are attached to the same carbon atom, they may be taken together along with the carbon atom to which they are attached to form a moiety selected from the group consisting of: an optionally substituted 3- to 8-membered spirocyclic ring, a carbonyl, an oxime, a hydrazone, and an imine;

$R^d$ at each occurrence is independently selected from the group consisting of: optionally substituted $C_1$ to $C_{12}$ aliphatic; optionally substituted 3- to 14-membered carbocycle; optionally substituted 3- to 14-membered heterocycle; $R^{20}$; and $R^{21}$, where two or more $R^d$ groups may be taken together with intervening atoms to form one or more optionally substituted rings; and ⌒ represents an optionally substituted moiety covalently linking two nitrogen atoms, where any of [$R^{2'}$ and $R^3$], [$R^2$ and $R^3$], [$R^1$ and $R^2$], and [$R^{1'}$ and $R^{2'}$] may optionally be taken together with intervening atoms to form one or more rings which may in turn be substituted with one or more groups selected from $R^{14}$; $R^{20}$; and $R^{21}$; and where $R^{14}$ at each occurrence is independently selected from the group consisting of: a —〰—$(Z)_p$ group; halogen; optionally substituted $C_1$ to $C_{12}$ aliphatic; optionally —〰—substituted 3- to 14-membered carbocycle; optionally substituted 3- to 14-membered heterocycle; —$OR^{10}$; —$OC(O)R^{13}$; —$OC(O)OR^{13}$; —$OC(O)NR^{11}R^{12}$; —CN; —CNO; —$C(R^{13})_zH_{(3-z)}$; —$C(O)R^{13}$; —$C(O)OR^{13}$; —$C(O)NR^{11}R^{12}$; —$NR^{11}R^{12}$; —$NR^{11}C(O)R^{13}$; —$NR^{11}C(O)OR^{13}$; —$NR^{11}SO_2R^{13}$; —$N^+R^{11}R^{12}R^{13}X^-$; —$P^+(R^{11})_3X^-$; —$P(R^{11})_3$=N+=$P(R^{11})_3X^-$; —$As^+R^{11}R^{12}R^{13}X^-$; —NCO; —$N_3$; —$NO_2$; —$S(O)_xR^{13}$; and —$SO_2NR^{11}R^{12}$, $R^{20}$ at each occurrence is independently selected from the group consisting of: a —〰—$(Z)_p$ group; halogen; —$OR^{10}$; —$OC(O)R^{13}$; —$OC(O)OR^{13}$; —$N^+(R^{11})_3X^-$; —$P^+(R^{11})_3X^-$; —$P(R^{11})_3$=$N^+$=$P(R^{11})_3X^-$; —$As^+R^{11}R^{12}R^{13}X^-$; —$OC(O)NR^{11}R^{12}$; —CN; —CNO; —$C(O)R^{13}$; —$C(O)OR^{13}$; —$C(O)NR^{11}R^{12}$; —$C(R^{13})_zH_{(3-z)}$; —$NR^{11}R^{12}$; —$NR^{11}C(O)R^{13}$; —$NR^{11}C(O)OR^{13}$; —NCO; —$NR^{11}SO_2R^{13}$; —$S(O)_xR^{13}$; —$S(O)_2NR^{11}R^{12}$; —$NO_2$; —$N_3$; and —$Si(R^{13})_{(3-z)}[(CH_2)_kR^{14}]_z$, $R^{21}$ at each occurrence is independently selected from the group consisting of: a —〰—$(Z)_p$ group; —$(CH_2)_kR^{20}$; —$(CH_2)_k$—Z"—$(CH_2)_kR^{20}$; —$C(R^{17})_zH_{(3-z)}$; —$(CH_2)_kC(R^{17})_zH_{(3-z)}$; —$(CH_2)_m$—Z"—$(CH_2)_mC(R^{17})_zH_{(3-z)}$; —$(CH_2)_k$—Z"—$R^{16}$;

$X^-$ is any anion,

Z" is a divalent linker selected from the group consisting of —(CH=CH)$_a$—; —(CH≡CH)$_a$—; —C(O)—; —C(=$NOR^{11}$)—; —C(=$NNR^{11}R^{12}$)—; —O—; —OC(O)—; —C(O)O—; —OC(O)O—; —N($R^{11}$)—; —N(C(O)$R^{13}$)—; —C(O)$NR^{13}$—; —N(C(O)$R^{13}$)O—; —$NR^{13}$C(O)$R^{13}$N—; —S(O)$_x$—; a polyether; and a polyamine, $R^{10}$ at each occurrence is independently selected from the group consisting of: —H; optionally substituted $C_{1-12}$ aliphatic; an optionally substituted 3- to 14-membered carbocycle; an optionally substituted 3- to 14-membered heterocycle —$S(O)_2R^{13}$; —$Si(R^{15})_3$; —C(O)$R^{13}$; and a hydroxyl protecting group, $R^{11}$ and $R^{12}$ at each occurrence are independently selected from the group consisting of: —H; optionally substituted $C_1$ to $C_{12}$ aliphatic; an optionally substituted 3- to 14-membered carbocycle; an optionally substituted 3- to 14-membered heterocycle; where two or more $R^{11}$ or $R^{12}$ groups can optionally be taken together with intervening atoms to form an optionally substituted 3- to 10-membered ring, $R^{13}$ at each occurrence is independently selected from the group consisting of:

—H; optionally substituted $C_1$ to $C_{12}$ aliphatic; an optionally substituted 3- to 14-membered carbocycle; and optionally substituted 3- to 14-membered heterocycle, where two or more $R^{13}$ groups on the same molecule may optionally be taken together to form ring.

$R^{15}$ at each occurrence is independently selected from the group consisting of: optionally substituted $C_{1-12}$ aliphatic, an optionally substituted 3- to 14-membered carbocycle; and an optionally substituted 3- to 14-membered heterocycle, $R^{16}$ at each occurrence is independently selected from the group consisting of:
optionally substituted $C_1$-$C_{12}$ aliphatic, an optionally substituted 3- to 14-membered carbocycle; an optionally substituted 3- to 14-membered heterocycle; and —$C(R^{17})_zH_{(3-z)}$, $R^{17}$ at each occurrence is independently selected from the group consisting of: —H; optionally substituted $C_1$ to $C_{12}$ aliphatic; an optionally substituted 3- to 14-membered carbocycle; and optionally substituted 3- to 14-membered heterocycle, each —〰—$(Z)_p$ group comprises a covalent linker "—〰—" containing one or more atoms selected from the group consisting of C, O, N, S, and Si; "Z" is an activating functional group having co-catalytic activity in epoxide $CO_2$ copolymerization, and p is an integer from 1 to 4 indicating the number of individual activating functional groups Z present on a given —〰—$(Z)_p$ group, a is 1, 2, 3, or 4, k is independently at each occurrence an integer from 1 to 8, inclusive, m is 0 or an integer from 1 to 8, inclusive, q is 0 or an integer from 1 to 5, inclusive, x is 0, 1, or 2, and z is 1, 2, or 3.

In certain embodiments, of complexes 1 through 4, ⌒ is selected from the group consisting of a $C_{3-14}$ carbocycle, a $C_{6-10}$ aryl group, a 3- to 14-membered heterocycle, and a 5- to 10-membered heteroaryl group; a polyether group, or an optionally substituted $C_{2-20}$ aliphatic group, wherein one or more methylene units are optionally and independently replaced by —$NR^y$—, —$N(R^y)C(O)$—, —$C(O)N(R^y)$—, —$OC(O)N(R^y)$—, —$N(R^y)C(O)O$—, —OC(O)O—, —O—, —C(O)—, —OC(O)—, —C(O)O—, —S—, —SO—, —$SO_2$—, —C(=S)—, —C(=$NR^y$)—, —C(=$NOR^y$)— or —N=N—.

In some embodiments, one or more of the substituents on metal complexes 1 through 9' is an activating moiety —〰—$(Z)_p$, where "—〰—" represents a covalent linker containing —〰— one or more atoms selected from the group consisting of C, O, N, S, and Si; "Z" is an activating functional group having co-catalytic activity in epoxide $CO_2$ copolymerization, and p is an integer from 1 to 4 indicating the number of individual activating functional groups present on a given activating moiety.

In some embodiments, the one or more Z group(s) present on the activating moiety is independently selected from the group consisting of PPN$^+$ derivatives (—$PR_2$=$N^+$=$PR_3$); ammonium salts; phosphonium salts; or an optionally substituted N-linked imidazolium, thiazolium, or oxazolium group. In certain embodiments, a Z group is an optionally substituted N-linked piperidine or N-linked pyrrolidine.

In some embodiments, a Z group is an optionally substituted guanidine. In other embodiments, a Z group is any of those described in WO2010022388. In certain embodiments, a Z-group is an amidine, and amidinium, a guanidine, a guanidinium, an optionally substituted pyridinium, or an arsonium group.

In certain embodiments, a linker —〰— may comprise a bond. In this case, the cationic functional group Z is bonded directly to the ligand. To avoid the need to arbitrarily define where a ligand ends and a tether begins, it is to be understood that if a Z group is bonded directly to an atom that is typically regarded as part of the parent structure of the ligand, then the linker —ᵚ— is to be regarded as comprising a bond. In certain embodiments, when —ᵚ— comprises a bond, b is 1.

In certain embodiments, each linker —ᵚ— contains 1-30 atoms including at least one carbon atom, and optionally one or more atoms selected from the group consisting of N, O, S, Si, B, and P.

In certain embodiments, a linker is an optionally substituted $C_{2-30}$ aliphatic group wherein one or more methylene units are optionally and independently replaced by -Cy-, —NR$^y$—, —N(R$^y$)C(O)—, —C(O)N(R$^y$)—, —O—, —C(O)—, —OC(O)—, —C(O)O—, —S—, —SO—, —SO$_2$—, —C(=S)—, —C(=NR$^y$)—, or —N=N—, wherein:

each -Cy- is independently an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and each R$^y$ is independently —H, or an optionally substituted radical selected from the group consisting of $C_{1-6}$ aliphatic, phenyl, a 3-7 membered saturated or partially unsaturated carbocyclic ring, a 3-7 membered saturated or partially unsaturated monocyclic heterocyclic ring having 1-2 heteroatoms independently selected from nitrogen, oxygen, or sulfur, a 5-6 membered heteroaryl ring having 1-3 heteroatoms independently selected from nitrogen, oxygen, or sulfur, and 8- to 10-membered aryl.

In certain embodiments, a linker —ᵚ— is a $C_4$-$C_{12}$ aliphatic group substituted with one or more moieties selected from the group consisting of halogen, —NO$_2$, —CN, —SR$^y$, —S(O)R$^y$, —S(O)$_2$R$^y$, —NR$^y$C(O)R$^y$, —OC(O)R$^y$, —CO$_2$R$^y$, —NCO, —N$_3$, —OR$^4$, —OC(O)N(R$^y$)$_2$, —N(R$^y$)$_2$, —NR$^y$C(O)R$^y$, and —NR$^y$C(O)OR$^y$, where each R$^y$ and R$^4$ is independently as defined above and described in classes and subclasses herein.

In certain embodiments, a linker —ᵚ— is an optionally substituted $C_3$-$C_{30}$ aliphatic group. In certain embodiments, a linker is an optionally substituted $C_{4-24}$ aliphatic group. In certain embodiments, a linker moiety is an optionally substituted $C_4$-$C_{20}$ aliphatic group. In certain embodiments, a linker moiety is an optionally substituted $C_4$-$C_{12}$ aliphatic group. In certain embodiments, a linker is an optionally substituted $C_{4-10}$ aliphatic group. In certain embodiments, a linker is an optionally substituted $C_{4-8}$ aliphatic group. In certain embodiments, a linker moiety is an optionally substituted $C_4$-$C_6$ aliphatic group. In certain embodiments, a linker moiety is an optionally substituted $C_6$-$C_{12}$ aliphatic group. In certain embodiments, a linker moiety is an optionally substituted $C_8$ aliphatic group. In certain embodiments, a linker moiety is an optionally substituted $C_7$ aliphatic group. In certain embodiments, a linker moiety is an optionally substituted $C_6$ aliphatic group. In certain embodiments, a linker moiety is an optionally substituted $C_5$ aliphatic group. In certain embodiments, a linker moiety is an optionally substituted $C_4$ aliphatic group. In certain embodiments, a linker moiety is an optionally substituted $C_3$ aliphatic group. In certain embodiments, a aliphatic group in the linker moiety is an optionally substituted straight alkyl chain. In certain embodiments, the aliphatic group is an optionally substituted branched alkyl chain. In some embodiments, a linker moiety is a $C_4$ to $C_{20}$ alkyl group having one or more methylene groups replaced by —C(R$^○$)$_2$— wherein R$^○$ is as defined above. In certain embodiments, a linker —ᵚ— consists of a bivalent aliphatic group having 4 to 30 carbons including one or more $C_{1-4}$ alkyl substituted carbon atoms. In certain embodiments, a linker moiety consists of a bivalent aliphatic group having 4 to 30 carbons including one or more gem-dimethyl substituted carbon atoms.

In certain embodiments, a linker —ᵚ— includes one or more optionally substituted cyclic elements selected from the group consisting of saturated or partially unsaturated carbocyclic, aryl, heterocyclic, or heteroaryl. In certain embodiments, a linker moiety consists of the substituted cyclic element, in some embodiments the cyclic element is part of a linker with one or more non-ring heteroatoms or optionally substituted aliphatic groups comprising other parts of the linker moiety.

In some embodiments, a linker moiety is of sufficient length to allow an atom bearing a positive (either wholly or through a resonance structure) within a cationic functional group to be positioned near a metal atom of a metal complex. In certain embodiments, a linker moiety is of sufficient length to allow an atom bearing a positive within a cationic functional group to be positioned within about 6 Å, within about 5 Å, within about 4 Å, within about 3.5 Å, or within about 3 Å. In certain embodiments, structural constraints are built into a linker moiety to control the disposition and orientation of one or more cationic functional groups near a metal center of a metal complex. In certain embodiments, such structural constraints are selected from the group consisting of cyclic moieties, bicyclic moieties, bridged cyclic moieties and tricyclic moieties. In some embodiments, such structural constraints are the result of acyclic steric interactions. In certain embodiments, steric interactions due to syn-pentane, gauche-butane, and/or allylic strain in a linker moiety, bring about structural constraints that affect the orientation of a linker and one or more cationic groups. In certain embodiments, structural constraints are selected from the group consisting of cis double bonds, trans double bonds, cis allenes, trans allenes, and triple bonds. In some embodiments, structural constraints are selected from the group consisting of substituted carbons including geminally disubstituted groups such as sprirocyclic rings, gem dimethyl groups, gem diethyl groups and gem diphenyl groups. In certain embodiments, structural constraints are selected from the group consisting of heteratom-containing functional groups such as sulfoxides, amides, and oximes.

In certain embodiments, linker moieties are selected from the group consisting of:

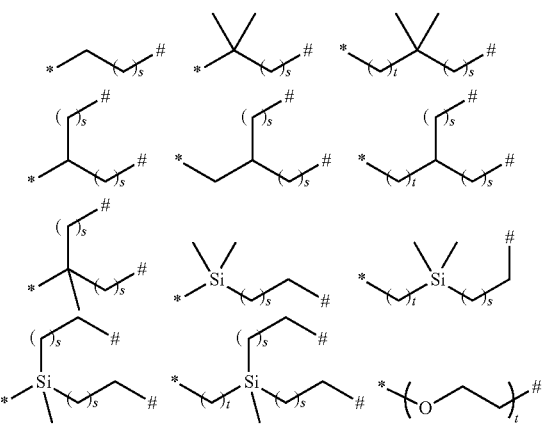

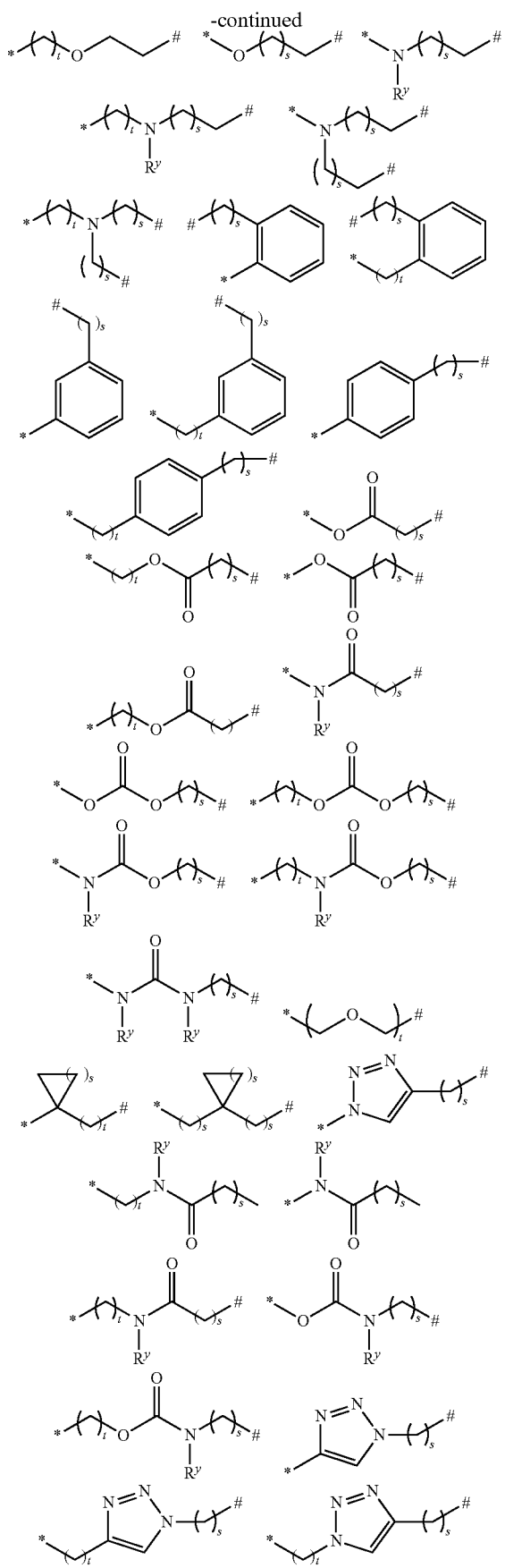

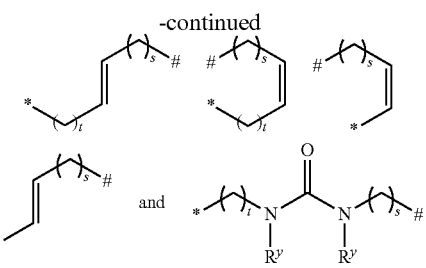

wherein each s is independently 0-6, t is 0-4, $R^y$ as defined above and described in classes and subclasses herein, * represents the site of attachment to a ligand, and each # represents a site of attachment of a Z group.

In some embodiments, s is 0. In some embodiments, s is 1. In some embodiments, s is 2. In some embodiments, s is 3. In some embodiments, s is 4. In some embodiments, s is 5. In some embodiments, s is 6.

In some embodiments, t is 1. In some embodiments, t is 2. In some embodiments, t is 3. In some embodiments, t is 4.

In some embodiments, provided metal complexes have a structure selected from the group consisting of:

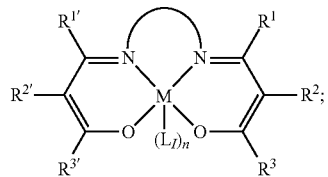

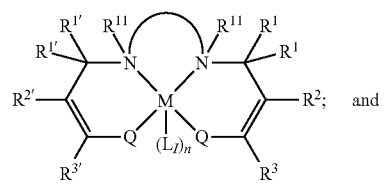

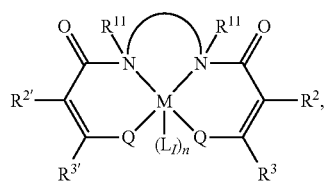

wherein:
M, $L_I$, n, $R^1$, $R^{1'}$, $R^2$, $R^{2'}$, $R^3$, $R^{3'}$ and $R^{11}$ are as defined above.

In some embodiments, a permanent ligand set is a salen ligand. In certain embodiments, a metal complex is a metallosalenate. In certain embodiments, a metal complex is a cobalt salen complex. In certain embodiments, a metal complex is a chromium salen complex. In other embodiments, a metal complex is an aluminum salen complex.

In certain embodiments, metal complexes of the present invention have the formula:

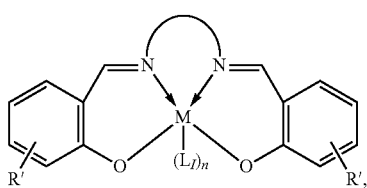

wherein:

M is the metal atom;

$L_I$ is a nucleophile capable of ring opening an epoxide;

n is an integer from 0-2 inclusive; and

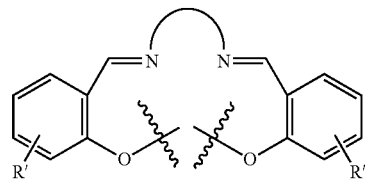

is the permanent ligand set;

wherein ⌒ is as defined previously and each R' independently represents one or more substituents optionally present on the phenyl rings.

In certain embodiments, each R' is independently an $R^d$ group or a ⋯(Z)$_p$ group, where two or more adjacent R' groups can be taken together to form an optionally substituted saturated, partially unsaturated, or aromatic 3- to 12-membered ring containing 0 to 4 heteroatoms, In certain embodiments, the ⌒ moiety is selected from the group consisting of:

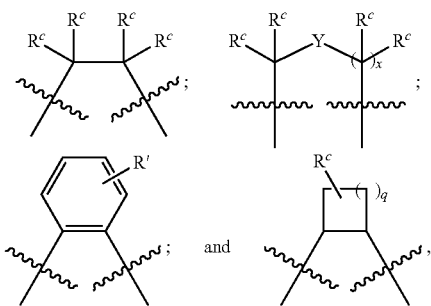

where $R^c$ and R' are as previously defined,

Y is a divalent linker selected from the group consisting of: —N(R$^{11}$)—; —O—; —S(O)$_x$—; —(CH$_2$)$_k$—; —C(O)—; —C(=NOR$^{10}$)—; —C(R$^c$)$_x$H$_{2-x}$—; a polyether; an optionally substituted 3- to 8-membered carbocycle; and an optionally substituted 3- to 8-membered heterocycle, q is 0 or an integer from 1 to 5 inclusive, and x is 0, 1, or 2, In certain embodiments provided metal complexes have a structure selected from the group consisting of:

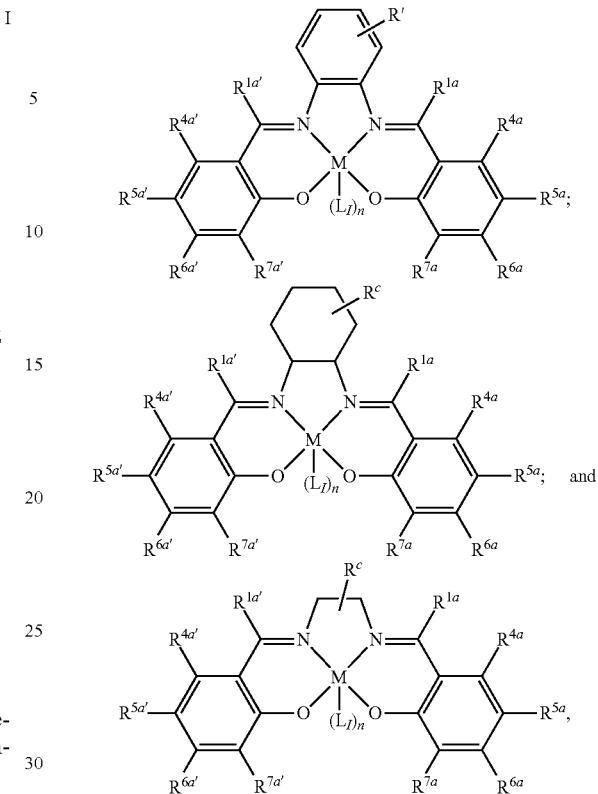

wherein:

M, $R^c$, R', $L_I$, and n are as defined above;

$R^{4a}$, $R^{4a'}$, $R^{5a}$, $R^{5a'}$, $R^{6a}$, $R^{6a'}$, $R^{7a}$, and $R^{7a'}$ are each independently hydrogen, a ⋯(Z)$_p$ group, halogen, —NO$_2$, —CN, —SR$^{13}$, —S(O)R$^{13}$, —S(O)$_2$R$^{13}$, —NR$^{11}$C(O)R$^{13}$, —OC(O)R$^{13}$, —CO$_2$R$^{13}$, —NCO, —N$_3$, —OR$^{10}$, —OC(O)NR$^{11}$R$^{12}$, —Si(R$^{13}$)$_3$, —NR$^{11}$R$^{12}$, —NR$^{11}$C(O)R$^{13}$, and —NR$^{11}$C(O)OR$^{13}$; or an optionally substituted radical selected from the group consisting of C$_{1-20}$ aliphatic; C$_{1-20}$ heteroaliphatic; 6- to 10-membered aryl; 5- to 10-membered heteroaryl; and 3- to 7-membered heterocyclic, where [R$^{1a}$ and R$^{4a}$], [R$^{1a'}$ and R$^{4a'}$] and any two adjacent R$^{4a}$, R$^{4a'}$, R$^{5a}$, R$^{5a'}$, R$^{6a}$, R$^{6a'}$, R$^{7a}$, and R$^{7a'}$ groups can be taken together with intervening atoms to form one or more optionally substituted rings optionally containing one or more heteroatoms;

n is 0 or an integer from 1 to 8, inclusive; and p is 0 or an integer from 1 to 4, inclusive.

In some embodiments, R$^{1a}$, R$^{1a'}$, R$^{4a}$, R$^{4a'}$, R$^{6a}$, and R$^{6a'}$ are each —H. In some embodiments, R$^{5a}$, R$^{5a'}$, R$^{7a}$ and R$^{7a'}$ are each optionally substituted C$_1$-C$_{12}$ aliphatic. In some embodiments, R$^{4a}$, R$^{4a'}$, R$^{5a}$, R$^{5a'}$, R$^{6a}$, R$^{6a'}$, R$^{7a}$, and R$^{7a'}$ are each independently selected from the group consisting of: —H, —SiR$_3$; methyl, ethyl, n-propyl, i-propyl, n-butyl, sec-butyl, t-butyl, isoamyl, t-amyl, thexyl, and trityl. In some embodiments, R$^{1a}$, R$^{1a'}$, R$^{4a}$, R$^{4a'}$, R$^{6a}$, and R$^{6a'}$ are each —H. In some embodiments, R$^{7a}$ is selected from the group consisting of —H; methyl; ethyl; n-propyl; i-propyl; n-butyl; sec-butyl; t-butyl; isoamyl; t-amyl; thexyl; and trityl. In some embodiments, R$^{5a}$ and R$^{7a}$ are independently selected from the group consisting of —H; methyl; ethyl; n-propyl; i-propyl; n-butyl; sec-butyl; t-butyl; isoamyl; t-amyl; thexyl; and trityl. In certain embodiments, one or more of $R^{5a}$, $R^{5a'}$, $R^{7a}$ and $R^{7a'}$ is a —⌇—$(Z)_p$ group. In some embodiments, $R^{5a}$ and $R^{5a'}$ are each a —⌇—$(Z)_p$ group. In some embodiments, $R^{5a}$ is a —⌇—$(Z)_p$ group and $R^{5a'}$ is $C_{1-8}$ aliphatic. In some embodiments, $R^{7a}$ and $R^{7a'}$ are each a —⌇—$(Z)_p$ group. In some embodiments, $R^{7a}$ is a —⌇—$(Z)_p$ group and $R^{7a'}$ is $C_{1-8}$ aliphatic.

In certain embodiments, provided metal complexes have a structure selected from the group consisting of:

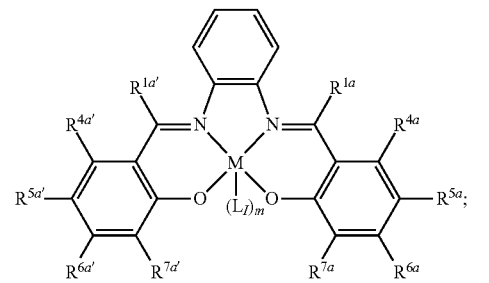

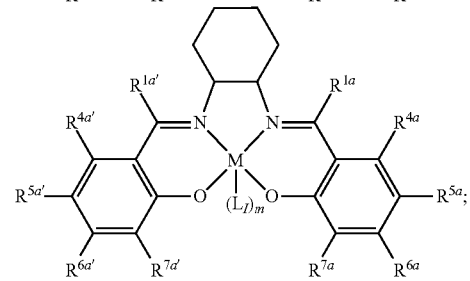

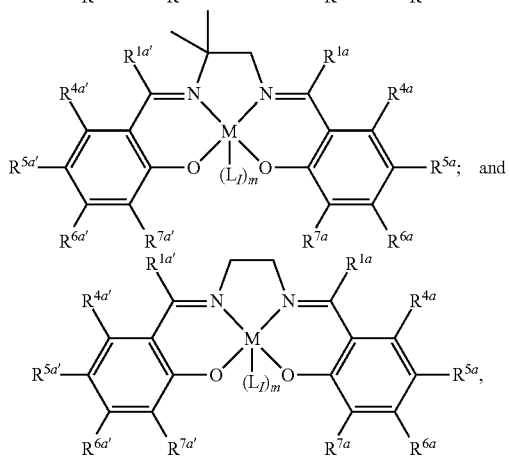

where $R^{1a}$ through $R^{7a'}$ are as defined above.

In certain embodiments, provided metal complexes have a structure selected from the group consisting of:

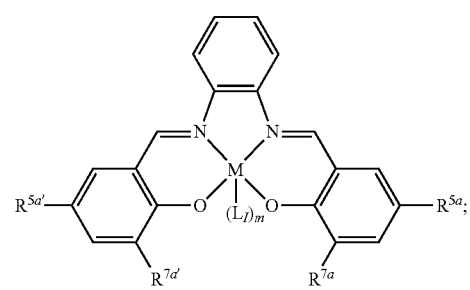

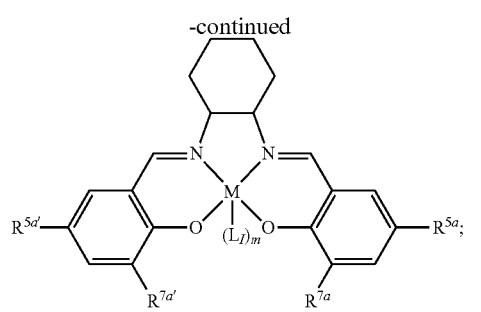

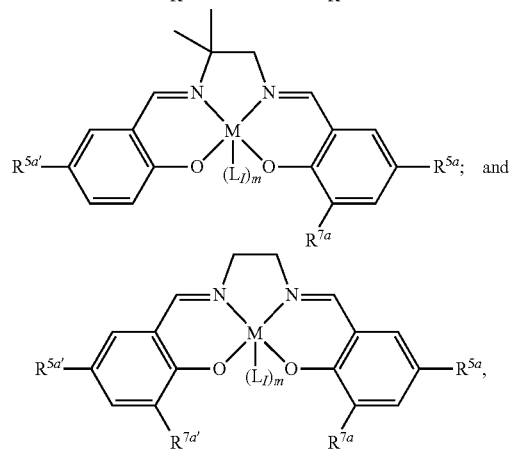

where $R^{5a}$, $R^{5a'}$, $R^{7a}$, and $R^{7a'}$ are as defined above. In certain embodiments, each pair of substituents on the salicaldehyde portions of the complexes above are the same (i.e. $R^{5a}$ & $R^{5a'}$ are the same and $R^{7a}$ & $R^{7a'}$ are the same). In other embodiments, at least one of $R^{5a}$ & $R^{5a'}$ or $R^{7a}$ & $R^{7a}$ are different from one another.

In certain embodiments, a metal complex has formula III:

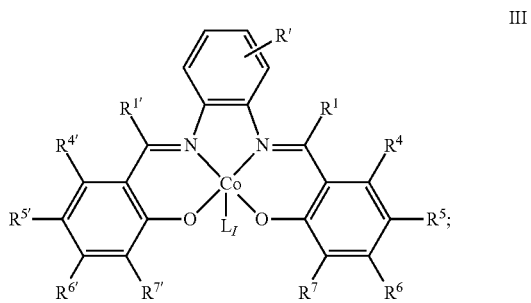

In certain embodiments, a metal complex has formula IV:

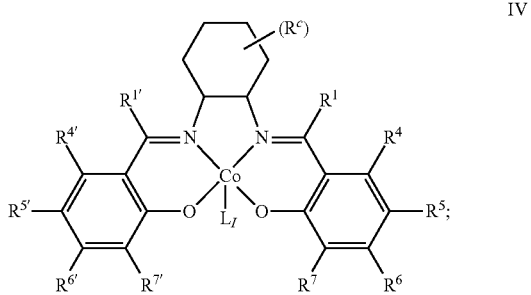

In certain embodiments, wherein a metal complex has formula V:

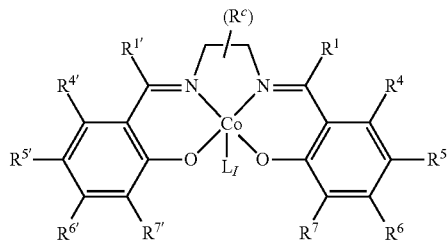

wherein:

$R^c$, $R^d$, $L_I$, and q are as described above, and $R^4$, $R^{4'}$, $R^5$, $R^{5'}$, $R^6$, $R^{6'}$, $R^7$, and $R^{7'}$ are each independently selected from the group consisting of: —H; —$R^{20}$; —$R^{21}$; optionally substituted $C_1$-$C_{12}$ aliphatic; optionally substituted 3- to 14-membered carbocycle; and optionally substituted 3- to 14-membered heterocycle;

where [$R^1$ and $R^4$], [$R^{1'}$ and $R^{4'}$] and any two adjacent $R^4$, $R^{4'}$, $R^5$, $R^{5'}$, $R^6$, $R^{6'}$, $R^7$, and $R^{7'}$ groups can optionally be taken together with intervening atoms to form one or more rings optionally substituted with one or more $R^{20}$ groups.

In certain embodiments, wherein a metal complex has formula III, $R^1$, $R^{1'}$, $R^4$, $R^{4'}$, $R^6$, and $R^{6'}$ are each —H. In certain embodiments, wherein a metal complex has formula III, $R^5$, $R^{5'}$, $R^7$ and $R^{7'}$ are each optionally substituted $C_1$-$C_{12}$ aliphatic.

In certain embodiments, wherein a metal complex has formula III, $R^4$, $R^{4'}$, $R^5$, $R^{5'}$, $R^6$, $R^{6'}$, $R^7$, and $R^{7'}$ are each independently selected from the group consisting of: —H, —Si($R^{13}$)$_3$; —Si[($CH_2$)$_k$$R^{22}$]$_z$($R^{13}$)$_{(3-z)}$; methyl, ethyl, n-propyl, i-propyl, n-butyl, sec-butyl, t-butyl, isoamyl, t-amyl, thexyl, trityl, —C($CH_3$)$Ph_2$, —($CH_2$)$_p$C[($CH_2$)$_p$$R^{22}$]$_z$$H_{(3-z)}$, and —Si($R^{13}$)$_{(3-z)}$[($CH_2$)$_k$$R^{22}$]$_z$, where p is an integer from 0 to 12 inclusive and $R^{22}$ is selected from the group consisting of: a heterocycle; an amine; a guanidine; —$N^+$($R^{11}$)$_3$$X^-$; —$P^+$($R^{11}$)$_3$$X^-$; —P($R^{11}$)$_2$=$N^+$=P($R^{11}$)$_3$$X^-$; —$As^+$($R^{11}$)$_3$$X^-$, and optionally substituted pyridinium.

In certain embodiments, wherein a metal complex has formula III, $R^7$ is selected from the group consisting of —H; methyl; ethyl; n-propyl; i-propyl; n-butyl; sec-butyl; t-butyl; isoamyl; t-amyl; thexyl; and trityl; and $R^5$ is selected from the group consisting of —($CH_2$)$_p$$CH_{(3-z)}$[($CH_2$)$_p$$R^{22}$]$_z$ and —Si($R^{13}$)$_{(3-z)}$[($CH_2$)$_k$$R^{22}$]$_z$.

In certain embodiments, a metal complex has formula IV, $R^1$, $R^{1'}$, $R^4$, $R^{4'}$, $R^6$, and $R^{6'}$ are each —H. In certain embodiments, wherein the complex is a metallosalenate complex of formula IV, $R^5$, $R^{5'}$, $R^7$ and $R^{7'}$ are each optionally substituted $C_1$-$C_{12}$ aliphatic.

In certain embodiments, wherein a metal complex has formula IV, $R^4$, $R^{4'}$, $R^5$, $R^{5'}$, $R^6$, $R^{6'}$, $R^7$, and $R^{7'}$ are each independently selected from the group consisting of: —H, —Si($R^{13}$)$_3$; —Si($R^{13}$)$_{(3-z)}$[($CH_2$)$_k$$R^{22}$]$_z$; methyl, ethyl, n-propyl, i-propyl, n-butyl, sec-butyl, t-butyl, isoamyl, t-amyl, thexyl, trityl, —($CH_2$)$_p$C[($CH_2$)$_p$$R^{22}$]$_z$$H_{(3-z)}$.

In certain embodiments, wherein a metal complex has formula IV, $R^7$ is selected from the group consisting of —H; methyl; ethyl; n-propyl; i-propyl; n-butyl; sec-butyl; t-butyl; isoamyl; t-amyl; thexyl; and trityl; and $R^5$ is selected from the group consisting of —($CH_2$)$_p$$CH_{(3-z)}$[($CH_2$)$_p$$R^{22}$]$_z$ and —Si($R^{13}$)$_{(3-z)}$[($CH_2$)$_k$$R^{22}$]$_z$.

In certain embodiments, wherein a metal complex has formula V, $R^1$, $R^{1'}$, $R^4$, $R^{4'}$, $R^6$, and $R^{6'}$ are each —H. In certain embodiments, wherein a complex is a metallosalenate complex of formula V, $R^5$, $R^{5'}$, $R^7$ and $R^{7'}$ are each optionally substituted $C_1$-$C_{12}$ aliphatic.

In certain embodiments, wherein a metal complex has formula V, $R^4$, $R^{4'}$, $R^5$, $R^{5'}$, $R^6$, $R^{6'}$, $R^7$, and $R^{7'}$ are each independently selected from the group consisting of: —H, —Si($R^{13}$)$_3$; —Si[($CH_2$)$_k$$R^{21}$]$_z$($R^{13}$)$_{(3-z)}$; methyl, ethyl, n-propyl, i-propyl, n-butyl, sec-butyl, t-butyl, isoamyl, t-amyl, thexyl, trityl, —($CH_2$)$_p$$CH_{(3-z)}$[($CH_2$)$_p$$R^{22}$]$_z$ and —Si($R^{13}$)$_{(3-z)}$[($CH_2$)$_k$$R^{22}$]$_z$.

In certain embodiments, wherein a metal complex has formula V, $R^7$ is selected from the group consisting of —H; methyl; ethyl; n-propyl; i-propyl; n-butyl; sec-butyl; t-butyl; isoamyl; t-amyl; thexyl; and trityl; and $R^5$ is selected from the group consisting of —($CH_2$)$_p$$CH_{(3-z)}$[($CH_2$)$_p$$R^{22}$]$_z$ and —Si($R^{13}$)$_{(3-z)}$[($CH_2$)$_k$$R^{22}$]$_z$.

In some embodiments, a metal complex has a structure $L_p$-M-($L_I$)$_n$, where $L_p$-M is selected from the group consisting of:

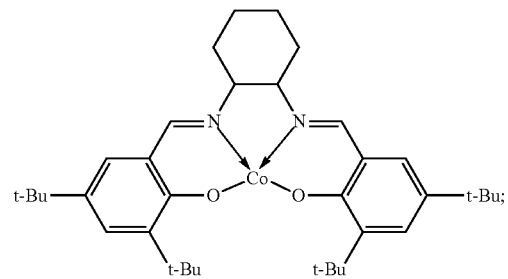

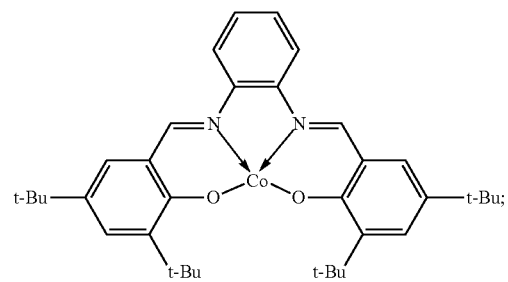

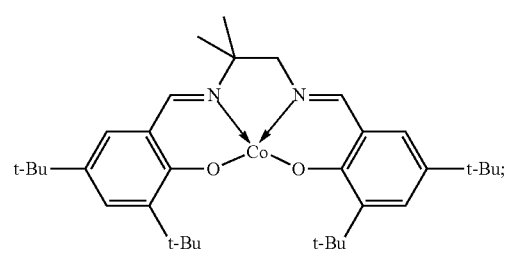

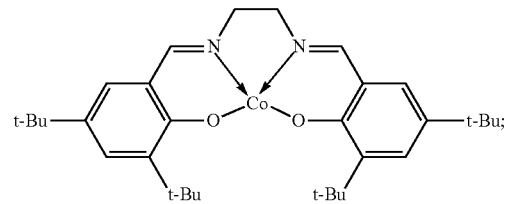

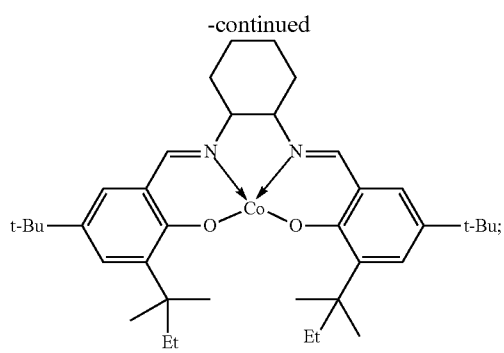
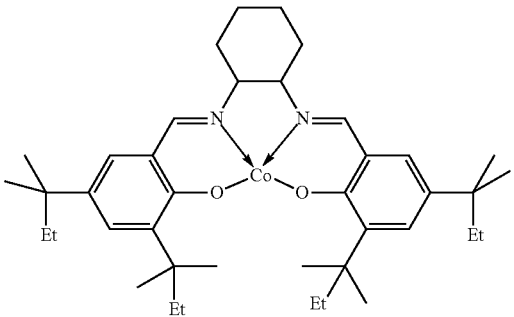
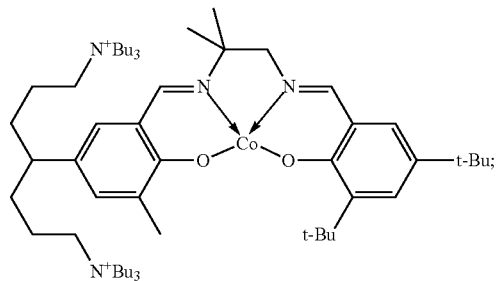
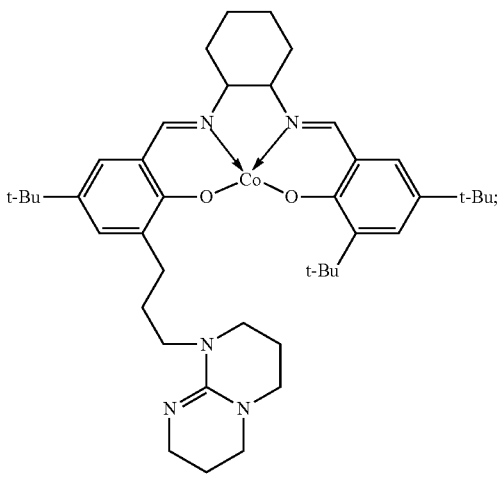
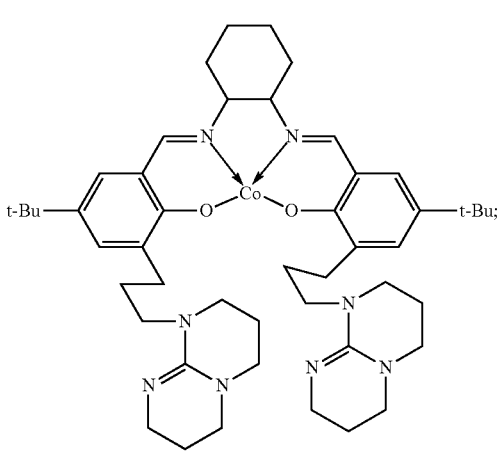
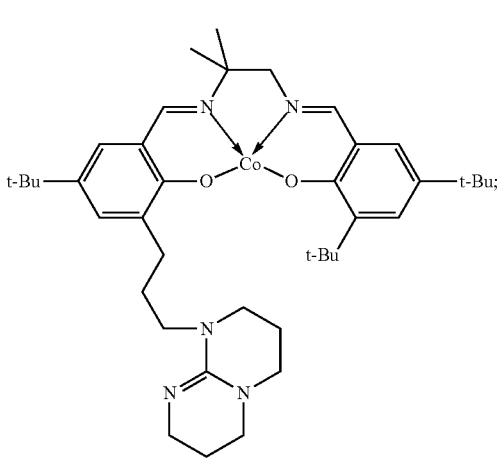

-continued

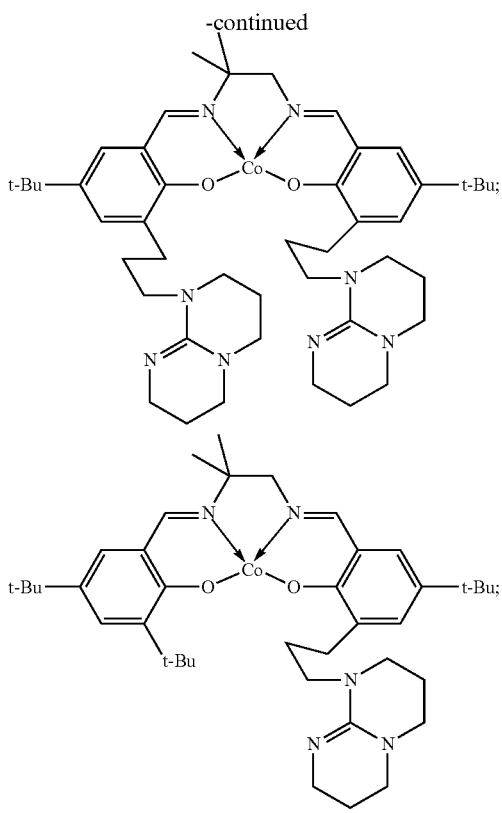

In other embodiments, the permanent ligand set comprises a porphyrin ring and $L_p$-M has the structure:

XLVIII

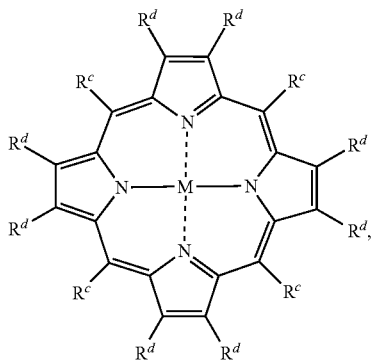

wherein:

M, $L_I$, $R^c$, and $R^d$ are as defined above and any two adjacent $R^c$ or $R^d$ groups can be taken together to form one or more rings optionally substituted with one or more $R^{20}$ groups In certain embodiments where the permanent ligand set comprises a porphyrin ring, M is a metal atom selected from the group consisting of: cobalt; chromium; aluminum; titanium; ruthenium, and manganese.

As noted above, in some embodiments herein, the permanent ligand set may comprise a plurality of discrete ligands. In certain embodiments the permanent ligand set includes two bidentate ligands. In certain embodiments, such bidentate ligands may have the structure

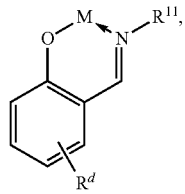

where $R^d$ and $R^{11}$ are as defined hereinabove. Metal complexes having two such ligands may adopt one of several geometries, and the present disclosure encompasses complex having any of the possible geometries, as well as mixtures of two or more geometrical isomers.

In certain embodiments, metal complexes including two bidentate ligands may have structures selected from the group consisting of:

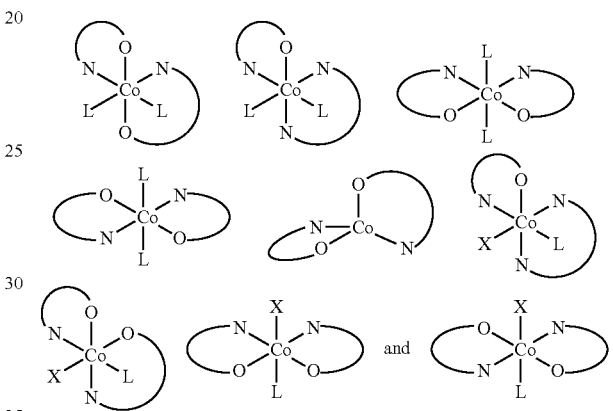

where each ⌒O represents a ligand:

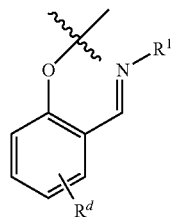

I.a.3 Initiating Ligands

In addition to a metal atom and a permanent ligand set described hereinabove, metal complexes suitable for polymerization systems of the present invention optionally include one or more initiating ligands -$L_I$. In some embodiments, these ligands act as polymerization initiators and become a part of a growing polymer chain. In certain embodiments, there is one initiating ligand present (i.e. n=1). In other embodiments, there are two initiating ligands present (i.e. n=2). In certain embodiments, an initiating ligand may be absent (i.e. n=0). In certain embodiments, a metal complex may be added to a reaction mixture without an initiating ligand, but may form a species in situ that includes one or two initiating ligands. In certain embodiments, an initiating ligand contains a masked hydroxyl group.

In certain embodiments, -$L_I$ is any anion. In certain embodiments, -$L_I$ is a nucleophile. In some embodiments, initiating ligands -$L_I$ are nucleophiles capable of ring-opening an epoxide. In some embodiments, a polymerization initiator $L_I$ is selected from the group consisting of: azide, halides, alkyl sulfonates, carboxylates, alkoxides, and phenolates.

In some embodiments, initiating ligands include, but are not limited to, —$OR^x$, —$SR^x$, —$OC(O)R^x$, —$OC(O)OR^x$, —$OC(O)N(R^x)_2$, —$NR^xC(O)R^x$, —CN, halo (e.g., —Br, —I, —Cl), —$N_3$, and —$OSO_2R^x$ wherein each $R^x$ is, independently, selected from hydrogen, optionally substituted aliphatic, optionally substituted heteroaliphatic, optionally substituted aryl and optionally substituted heteroaryl and where two $R^x$ groups can be taken together to form an optionally substituted ring optionally containing one or more additional heteroatoms.

In some embodiments, metal complexes $L_p$-M-$(L_I)_n$, include one or more initiating ligands -$L_I$ characterized in that each ligand is capable of initiating two or more polymer chains. In some embodiments, the initiating ligand is any of the molecules described above as being suitable as chain transfer agents. In certain embodiments, an initiating ligand is an anion derived from any of the chain transfer agents described hereinabove.

In some embodiments, polymerization systems of the present invention further include at least one co-catalyst. In some embodiments, a co-catalyst is selected from the group consisting of: amines, guanidines, amidines, phosphines, nitrogen-containing heterocycles, ammonium salts, phosphonium salts, arsonium salts, bisphosphine ammonium salts, and a combination of any two or more of the above. In certain embodiments, a co-catalyst is covalently linked to the permanent ligand set of the metal complex.

In certain embodiments, polymerization systems comprise a catalyst and co-catalyst such that the initiating ligand on the metal complex and an anion present to balance the charge of a cationic co-catalyst are the same molecule.

In embodiments where the co-catalyst is an 'onium' salt, there is necessarily an anion present to balance the charge of the salt. In certain embodiments, this is any anion. In certain embodiments, the anion is a nucleophile. In some embodiments, the anion is a nucleophile capable of ring-opening an epoxide. In some embodiments, the anion is selected from the group consisting of: azide, halides, alkyl sulfonates, carboxylates, alkoxides, and phenolates. In certain embodiments, a co-catalyst anion contains a masked hydroxyl group.

In some embodiments, ionic co-catalyst include anions selected from the group consisting of: —$OR^x$, —$SR^x$, —$OC(O)R^x$, —$OC(O)OR^x$, —$OC(O)N(R^x)_2$, —$NR^xC(O)R^x$, —CN, halo (e.g., —Br, —I, —Cl), —$N_3$, and —$OSO_2R^x$ wherein each $R^x$ is, independently, selected from hydrogen, optionally substituted aliphatic, optionally substituted heteroaliphatic, optionally substituted aryl and optionally substituted heteroaryl and where two $R^x$ groups can be taken together to form an optionally substituted ring optionally containing one or more additional heteroatoms.

In certain embodiments, a co-catalyst anion is —$OC(O)R^x$, wherein $R^x$ is selected from optionally substituted aliphatic, fluorinated aliphatic, optionally substituted heteroaliphatic, optionally substituted aryl, fluorinated aryl, and optionally substituted heteroaryl.

In certain embodiments, a co-catalyst anion is —$OC(O)R^x$, wherein $R^x$ is optionally substituted aliphatic. In certain embodiments, a co-catalyst anion is —$OC(O)R^x$, wherein $R^x$ is optionally substituted alkyl and fluoroalkyl. In certain embodiments, a co-catalyst anion is —$OC(O)CH_3$ or —$OC(O)CF_3$.

Furthermore, in certain embodiments, a co-catalyst anion is —$OC(O)R^x$, wherein $R^x$ is optionally substituted aryl, fluoroaryl, or heteroaryl. In certain embodiments, a co-catalyst anion is —$OC(O)R^x$, wherein $R^x$ is optionally substituted aryl. In certain embodiments, a co-catalyst anion is —$OC(O)R^x$, wherein $R^x$ is optionally substituted phenyl. In certain embodiments, a co-catalyst anion is —$OC(O)C_6H_5$ or —$OC(O)C_6F_5$.

In certain embodiments, a co-catalyst anion is —$OR^x$, wherein $R^x$ is selected from optionally substituted aliphatic, optionally substituted heteroaliphatic, optionally substituted aryl, and optionally substituted heteroaryl.

For example, in certain embodiments, a co-catalyst anion is —$OR^x$, wherein $R^x$ is optionally substituted aryl. In certain embodiments, a co-catalyst anion is —$OR^x$, wherein $R^x$ is optionally substituted phenyl. In certain embodiments, a co-catalyst anion is —$OC_6H_5$ or —$OC_6H_2(2,4-NO_2)$.

In certain embodiments, a co-catalyst anion is halo. In certain embodiments, a co-catalyst anion is —Br. In certain embodiments, a co-catalyst anion is —Cl. In certain embodiments, a co-catalyst anion is —I.

In certain embodiments, a co-catalyst anion is —$O(SO_2)R^x$. In certain embodiments a co-catalyst anion is —OTs. In certain embodiments a co-catalyst anion is —$OSO_2Me$. In certain embodiments a co-catalyst anion is —$OSO_2CF_3$. In some embodiments, a co-catalyst anion is a 2,4-dinitrophenolate anion.

In certain embodiments, polymerization systems of the present invention include a cationic co-catalyst having a counterion characterized in that the counterion is capable of initiating polymerization at two or more sites. In some embodiments, a counterion is any of the molecules described above as being suitable as initiating ligands ($L_I$). In certain embodiments, an anion is derived from any of the chain transfer agents described hereinabove.

Ic. Stoichiometry of the Polymerization Systems

Having described in detail each of the components of the polymerization system, we turn now to the relative ratios of those components. In certain embodiments, a metal complex $L_p$-M-$(L_I)_n$ and a chain transfer agent Y-A-$(Y)_{n'}$ are present in a defined ratio selected to maximize conversion of the epoxide monomers while achieving the desired molecular weight polycarbonate polyol. In embodiments, where a co-catalyst is present, the ratios between a metal complex, a co-catalyst and a chain transfer agent are selected to maximize conversion of the epoxide monomers while achieving the desired molecular weight polycarbonate polyol.

In some embodiments, a metal complex and a chain transfer agent are present in a molar ratio greater than 1:10. In some embodiments, a metal complex and a chain transfer agent are present in a molar ratio greater than 1:100. In some embodiments, a metal complex and a chain transfer agent are present in a molar ratio greater than 1:1000. In some embodiments, a metal complex and a chain transfer agent are present in a molar ratio ranging from about 1:10 to about 1:1000. In some embodiments, a metal complex and a chain transfer agent are present in a molar ratio ranging from about 1:10 to about 1:10000. In certain embodiments, the ratio is between about 1:1000 and about 1:5000. In certain embodiments, the ratio is between about 1:1000 and about 1:3000. In certain embodiments, the ratio is between about 1:1000 and about 1:2000. In certain embodiments, the ratio is between about 1:2000 and about 1:4000. In certain embodiments, the ratio is between about 1:50 and about 1:5000. In certain embodiments, the ratio is between about 1:50 and about 1:1000. In certain embodiments, the ratio is between about 1:250 and about 1:1000. In certain embodiments, the ratio is between about 1:50 and about 1:500. In certain embodiments, the ratio is between about 1:20 and about 1:500. In certain embodiments, the ratio is between about 1:50 and about 1:250. In certain embodiments, the ratio is between about 1:20 and about 1:100. In certain embodiments, the ratio is between about 1:100 and about 1:250. In some embodiments, a metal complex and a chain transfer agent are present in a molar ratio less than 1:1000.

In some embodiments, a metal complex and a co-catalyst are present in a molar ratio ranging from about 0.1:1 to about 1:10. In certain embodiments, the ratio is from about 0.5:1 to about 5:1. In other embodiments, the ratio is from about 1:1 to about 4:1. In certain embodiments the ratio between the metal complex and the co-catalyst is about 1:1. In other embodiments, the molar ratio between a metal complex and a co-catalyst is about 1:2.

It is generally desirable to maintain the concentration of a metal complex in a polymerization at a low level relative to the epoxide. In certain embodiments, the molar ratio of metal complex to epoxide ranges from about 1:100 to about 1:1,000,000. In certain embodiments, the ratio ranges from about 1:5,000 to about 1:500,000. In some embodiments, the ratio ranges from about 1:10,000 to about 1:200,000. In other embodiments, the ratio ranges from about 1:20,000 to about 1:100,000.

II. Polycarbonate Polyol Compositions

As described above, there have not been methods heretofore available to produce aliphatic polycarbonate polyol resins combining the features of high carbonate linkage content, a high percentage of hydroxyl end groups and low molecular weight (e.g. less than about 20 kg/mol), and wherein substantially all polycarbonate chains having hydroxyl end groups have no embedded chain transfer agent. In one aspect, the present invention encompasses these novel materials.

In certain embodiments, such materials conform to a structure:

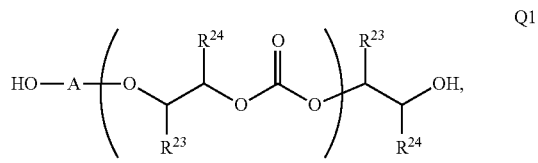

where each of $R^{23}$, and $R^{24}$ is independently selected from the group consisting of: —H; and an optionally substituted group selected from $C_{1-30}$ aliphatic; $C_{6-14}$ aryl; 3- to 12-membered heterocycle, and 5- to 12-membered heteroaryl, where any two or more of $R^{23}$ and $R^{24}$ can be taken together with intervening atoms to form one or more optionally substituted 3- to 12-membered rings, optionally containing one or more heteroatoms.

As used herein, the term "substantially all" means nearly all, or all to a measurable extent. In some embodiments, "substantially all" refers to at least 95%, at least 96%, at least 97%, at least 98%, at least 99%, or at least 99.9%.

In some embodiments, the present invention encompasses epoxide $CO_2$ copolymers with a molecular weight number between about 400 and about 20,000 characterized in that the polymer chains have a carbonate content of >90%, and at least 90% of the end groups are hydroxyl groups, and wherein substantially all polycarbonate chains having hydroxyl end groups have no embedded chain transfer agent. In some embodiments, at least 95% of the end groups of the polycarbonate polyol are OH groups. In some embodiments, at least 97% of the end groups of the polycarbonate polyol are OH groups. In some embodiments, at least 98% of the end groups of the polycarbonate polyol are OH groups. In some embodiments, at least 99% of the end groups of the polycarbonate polyol are OH groups.

In certain embodiments, the present invention comprises novel compositions of matter comprising hydroxyl-terminated aliphatic polycarbonate chains with a fragment attached to one end of the carbonate where the fragment also comprises a hydroxyl group.

In certain embodiments, such materials conform to a structure Q1:

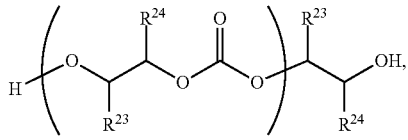

where each of -A-, $R^{23}$, and $R^{24}$ is as defined above and in the classes and subclasses herein.

For example, if a polymer of the present invention were made by copolymerization of propylene oxide and $CO_2$ with mono-OH-protected 1,4-butanediol as the chain transfer agent, then, for the resulting polymer of formula Q1, $R^{23}$ would be —H, $R^{24}$ would be —$CH_3$, (or vice versa), -A- would be —$(CH_2)_4$—, and the polymer would have the structure:

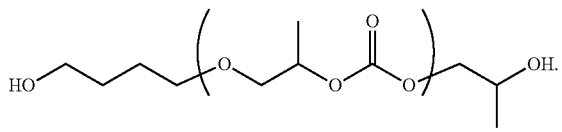

The other polymers encompasses by the present invention can be apprehended by considering the analogous materials resulting from the copolymerization of any one or more of the epoxides described herein with $CO_2$ in the presence of the chain transfer agents Y-A-$(Y)_n$, described above. The present invention contemplates all of these combinations and variations individually and in combination.

In certain embodiments, the carbonate linkage content of the polycarbonate chains of epoxide $CO_2$ copolymers of the present invention is at least 90%. In some embodiments greater than 92% of linkages are carbonate linkages. In certain embodiments, at least 95% of linkages are carbonate linkages. In certain embodiments, at least 97% of linkages are carbonate linkages. In some embodiments, greater than 98% of linkages are carbonate linkages in some embodiments at least 99% of linkages are carbonate linkages. In some embodiments essentially all of the linkages are carbonate linkages (i.e. there are essentially only carbonate linkages detectable by typical methods such as $^1H$ or $^{13}C$ NMR spectroscopy).

In certain embodiments, the ether linkage content of the polycarbonate chains of epoxide $CO_2$ copolymers of the present invention is less than 10%. In some embodiments, less than 8% of linkages are ether linkages. In certain embodiments, less than 5% of linkages are ether linkages. In certain embodiments, no more than 3% of linkages are ether linkages. In some embodiments, fewer than 2% of linkages are ether linkages in some embodiments less than 1% of linkages are ether linkages. In some embodiments essentially none of the linkages are ether linkages (i.e. there are essentially no ether bonds detectable by typical methods such as $^1$H or $^{13}$C NMR spectroscopoy).

In some embodiments, the epoxide $CO_2$ copolymers of the present invention have average molecular weight numbers ranging from about 400 to about 400,000 g/mol. In some embodiments, the epoxide $CO_2$ copolymers of the present invention have average molecular weight numbers ranging from about 300 to about 20,000 g/mol. In some embodiments, the epoxide $CO_2$ copolymers of the present invention have average molecular weight numbers ranging from about 400 to about 20,000 g/mol. In some embodiments, the copolymers have an Mn between about 500 and about 15,000 g/mol. In some embodiments, the copolymers have an Mn between about 500 and about 5,000 g/mol. In some embodiments, the copolymers have an Mn between about 500 and about 1,500 g/mol. In other embodiments, the copolymers have an Mn between about 800 and about 4,000 g/mol. In other embodiments, the copolymers have an Mn between about 800 and about 5,000 g/mol. In some embodiments, the copolymers have an Mn between about 1,000 and about 3,000 g/mol. In some embodiments, the copolymers have an Mn of about 700 g/mol. In some embodiments, the copolymers have an Mn of about 1,000 g/mol. In some embodiments, the copolymers have an Mn of about 2,000 g/mol. In some embodiments, the copolymers have an Mn of about 3,000 g/mol. In some embodiments, the copolymers have an Mn of about 4,000 g/mol. In some embodiments, the copolymers have an Mn of about 5,000 g/mol. In some embodiments, the copolymers have an Mn of about 6,000 g/mol. In some embodiments, the copolymers have an Mn of about 7,000 g/mol. In some embodiments, the copolymers have an Mn of about 8,000 g/mol. In certain embodiments, epoxide $CO_2$ copolymers of the invention have about 10 to about 200 repeat units. In other embodiments, the copolymers have about 20 to about 100 repeat units.

In some embodiments, the $CO_2$ epoxide copolymers of the present invention are formed from $CO_2$ and one type of epoxide. In other embodiments, the copolymers incorporate two or more types of epoxide. In some embodiments, the copolymers predominantly incorporate one epoxide with lesser amounts of one or more additional epoxides. In certain embodiments where two or more epoxides are present, the copolymer is random with respect to the position of the epoxide moieties within the chain. In other embodiments where two or more epoxides are present, the copolymer is a tapered copolymer with respect to the incorporation of different epoxides. In some embodiments where two or more epoxides are present, the copolymer is a block copolymer with respect to the incorporation of different epoxides.

In certain embodiments, polycarbonate polyols of the present invention are further characterized in that they have narrow polydispersity. In certain embodiments, the PDI of the provided polymer compositions is less than 2. In some embodiments, the PDI is less than 1.6. In some embodiments, the PDI is less than 1.5. In other embodiments, the PDI is less than about 1.4. In certain embodiments, the PDI is less than about 1.2. In other embodiments, the PDI is less than about 1.1. In certain embodiments, the polycarbonate polyol compositions are further characterized in that they have a unimoldal molecular weight distribution.

In certain embodiments, the polycarbonate polyols of the present invention contain repeat units derived from epoxides that are not C2 symmetric. In these cases, the epoxide can be incorporated into the growing polymer chain in one of several orientations. The regiochemistry of the enchainment of adjacent monomers in such cases is characterized by the head-to-tail ratio of the composition. As used herein the term "head-to-tail" refers to the regiochemistry of the enchainment of a substituted epoxide in the polymer chain as shown in the figure below for propylene oxide:

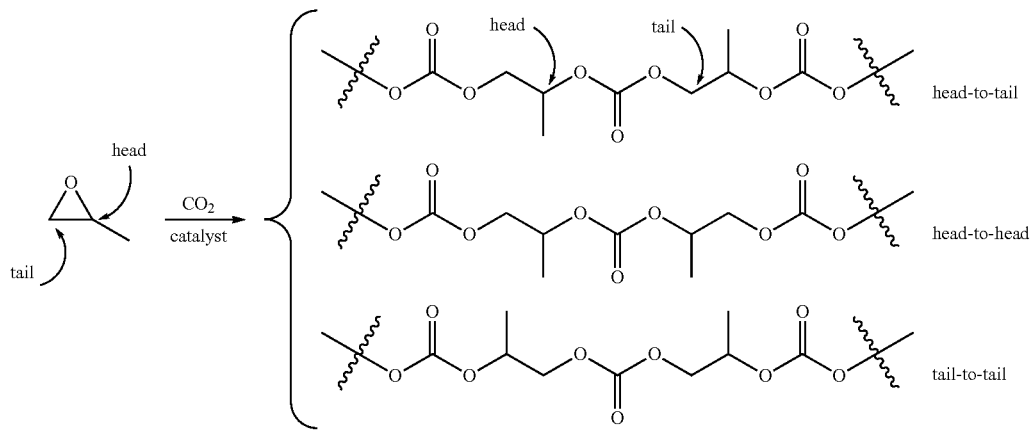

In certain embodiments the disclosure encompasses polycarbonate polyol compositions characterized in that, on average, more than about 80% of linkages between adjacent epoxide monomer units are head-to-tail linkages. In certain embodiments, on average, more than 85% of linkages between adjacent epoxide monomer units are head-to-tail linkages. In certain embodiments, on average, more than 90% of linkages between adjacent epoxide monomer units are head-to-tail linkages. In certain embodiments, more than 95% of linkages between adjacent epoxide monomer units are head-to-tail linkages. In certain embodiments, more than 99% of linkages between adjacent epoxide monomer units are head-to-tail linkages.

In certain embodiments, the polycarbonate polyols of the present invention contain repeat units derived from epoxides that contain a chiral center. In these cases, the epoxide can be incorporated into the growing polymer chain in defined orientations relative to adjacent monomer units. In certain embodiments, the adjacent stereocenters are arranged randomly within the polymer chains. In certain embodiments, the polycarbonate polyols of the present invention are atactic. In other embodiments, more than about 60% of adjacent monomer units have the same stereochemistry. In certain embodiments, more than about 75% of adjacent monomer units have the same stereochemistry. In certain embodiments, more than about 85% of adjacent monomer units have the same stereochemistry. In certain embodiments, more than about 95% of adjacent monomer units have the same stereochemistry. In certain embodiments the polycarbonate polyols of the present invention are isotactic. In other embodiments, more than about 60% of adjacent monomer units have the opposite stereochemistry. In certain embodiments, more than about 75% of adjacent monomer units have the opposite stereochemistry. In certain embodiments, more than about 85% of adjacent monomer units have the opposite stereochemistry. In certain embodiments, more than about 95% of adjacent monomer units have the opposite stereochemistry. In certain embodiments the polycarbonate polyols of the present invention are syndiotactic.

In certain embodiments, where a chiral epoxide is incorporated into the polycarbonate polyol compositions of the present invention, the polymers are enantio-enriched. In other embodiments, where a chiral epoxide is incorporated into the polycarbonate polyol compositions of the present invention, the polymers are not enantio-enriched.

In certain embodiments, the epoxide monomers incorporated into polycarbonate polyols of the present invention have a structure:

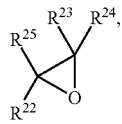

where, $R^{22}$, $R^{23}$, $R^{24}$, and $R^{25}$ are each independently selected from the group consisting of: —H; and an optionally substituted group selected from $C_{1-30}$ aliphatic; $C_{6-14}$ aryl; 3- to 12-membered heterocycle, and 5- to 12-membered heteroaryl, where any two or more of $R^{22}$, $R^{23}$, $R^{24}$, and $R^{25}$ can be taken together with intervening atoms to form one or more optionally substituted 3- to 12-membered rings, optionally containing one or more heteroatoms.

In certain embodiments, the polycarbonate polyols of the present invention incorporate one or more epoxides selected from the group consisting of:

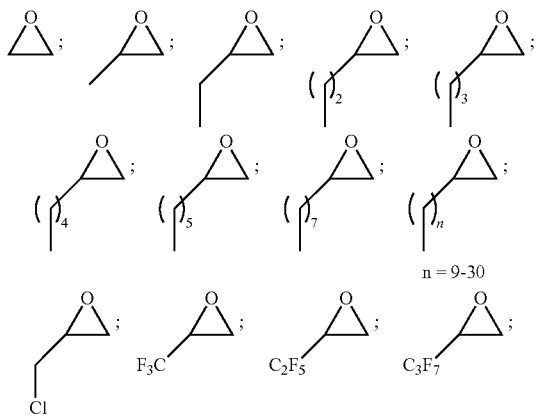

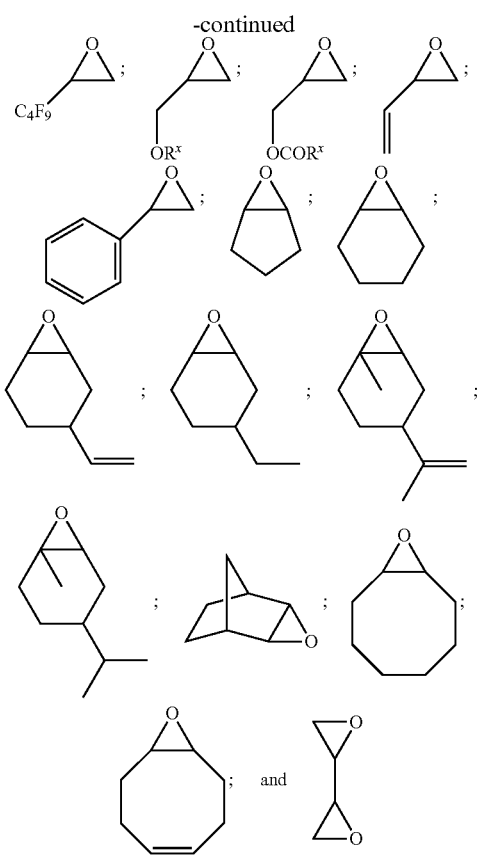

wherein each $R^x$ is, independently, selected from optionally substituted aliphatic, optionally substituted heteroaliphatic, optionally substituted aryl fluoroalkyl, and optionally substituted heteroaryl.

In certain embodiments, an epoxide is ethylene oxide. In other embodiments, an epoxide is propylene oxide. In other embodiments, an epoxide is cyclohexene oxide. In other embodiments, an epoxide is epichlorohydrin. In certain embodiments, epoxide monomers selected include glycidyl ether or glycidyl ester. In certain embodiments, epoxide monomers selected include phenyl glycidyl ether. In certain embodiments, epoxide monomers selected include t-butyl glycidyl ether. In certain embodiments, epoxide monomers selected include ethylene oxide and propylene oxide.

In certain embodiments, polycarbonate polyols of the present invention comprise poly(ethylene carbonate). In other embodiments, polycarbonate polyols of the present invention comprise poly(propylene carbonate). In other embodiments, polycarbonate polyols of the present invention comprise poly(cyclohexene carbonate). In other embodiments, polycarbonate polyols of the present invention comprise poly(epichlorohydrin carbonate). In certain embodiments, polycarbonate polyols of the present invention incorporate a glycidyl ether or glycidyl ester. In certain embodiments, polycarbonate polyols of the present invention incorporate phenyl glycidyl ether. In certain embodiments, polycarbonate polyols of the present invention incorporate t-butyl glycidyl ether.

In certain embodiments, epoxides are derived from naturally occurring materials such as epoxidized resins or oils. Examples of such epoxides include, but are not limited to: Epoxidized Soybean Oil; Epoxidized Linseed Oil; Epoxidized Octyl Soyate; Epoxidized PGDO; Methyl Epoxy Soyate; Butyl Epoxy Soyate; Epoxidized Octyl Soyate; Methyl Epoxy Linseedate; Butyl Epoxy Linseedate; and Octyl Epoxy Linseedate. These and similar materials are available commercially from Arkema Inc. under the trade name Vikoflex®. Examples of such commerically available Vikoflex® materials include Vikoflex 7170 Epoxidized Soybean Oil, Vikoflex 7190 Epoxidized Linseed, Vikoflex 4050 Epoxidized Octyl Soyate, Vikoflex 5075 Epoxidized PGDO, Vikoflex 7010 Methyl Epoxy Soyate, Vikoflex 7040 Butyl Epoxy Soyate, Vikoflex 7080 Epoxidized Octyl Soyate, Vikoflex 9010 Methyl Epoxy Linseedate, Vikoflex 9040 Butyl Epoxy Linseedate, and Vikoflex 9080 Octyl Epoxy Linseedate. In certain embodiments, the polycarbonate polyols of the present invention incorporate epoxidized fatty acids.

In certain embodiments, epoxides are derived from alpha olefins. Examples of such epoxides include, but are not limited to those derived from $C_{10}$ alpha olefin, $C_{12}$ alpha olefin, $C_{14}$ alpha olefin, $C_{16}$ alpha olefin, $C_{18}$ alpha olefin, $C_{20}$-$C_{24}$ alpha olefin, $C_{24}$-$C_{28}$ alpha olefin and $C_{30+}$ alpha olefins. These and similar materials are commercially available from Arkema Inc. under the trade name Vikolox®. In certain embodiments, epoxide mixtures including alpha olefins also include other simpler epoxide monomers including, but not limited to: ethylene oxide, propylene oxide, butylene oxide, hexene oxide, cyclopentene oxide and cyclohexene oxide.

In some embodiments, polycarbonate polyols of the present invention comprise poly(propylene-co-ethylene carbonate). In certain embodiments, polycarbonate polyols of the present invention comprise poly(propylene carbonate) incorporating from about 0.1 to about 10% of a $C_4$-$C_{30}$ epoxide. In certain embodiments, polycarbonate polyols of the present invention comprise poly(propylene carbonate) incorporating from about 0.1 to about 10% of a glycidyl ether. In certain embodiments, polycarbonate polyols of the present invention comprise poly(propylene carbonate) incorporating from about 0.1 to about 10% of a glycidyl ester. In certain embodiments, polycarbonate polyols of the present invention comprise poly(ethylene carbonate) incorporating from about 0.1 to about 10% of a glycidyl ether. In certain embodiments, polycarbonate polyols of the present invention comprise poly(ethylene carbonate) incorporating from about 0.1 to about 10% of a glycidyl ester. In certain embodiments, polycarbonate polyols of the present invention comprise poly(ethylene carbonate) incorporating from about 0.1 to about 10% of a $C_4$-$C_{30}$ epoxide.

In certain embodiments, epoxide monomers incorporated into polycarbonate polyols of the present invention include epoxides derived from naturally occurring materials such as epoxidized resins or oils. In certain embodiments of the present invention, polycarbonate polyols of the present invention incorporate epoxides derived from alpha olefins.

In another aspect, the present invention encompasses materials made by cross-linking any of the above polycarbonate polyol polymers. In certain embodiments, such cross-linked materials comprise polyurethanes. In certain embodiments such polyurethanes encompass thermoplastics, foams, coatings and adhesives.

III. Methods of Making Polycarbonate Polyols

In a third aspect, the present invention encompasses methods for producing polycarbonate polyols.
In some embodiments, the method includes the steps of:
a) contacting a reaction mixture comprising one or more epoxides with a polymerization system as described herein in the presence of carbon dioxide;
b) allowing the polymerization reaction to proceed until a desired molecular weight aliphatic polycarbonate polyol has formed,
c) terminating the polymerization; and
d) treating the aliphatic polycarbonate polyol under suitable conditions to unmask the one or more masked hydroxyl groups, wherein the one or more masked hydroxyl groups are hydroxyl protecting groups or latent hydroxyl groups.

III.a. Epoxides

In some embodiments, epoxide monomers provided at step (a) include any of the epoxides described hereinabove with regard to the polymer compositions of matter.

III.b. Chain Transfer Agents

In certain embodiments, a chain transfer agent provided in the polymerization system of step (a) of the above method is any of the chain transfer agents described hereinabove or mixtures of two or more of these.

III.b.1. Removal of Masked Hydroxyl Groups

As described above, in certain embodiments masked hydroxyl groups are protected hydroxyl groups. Deprotection chemistries for protecting groups are known in the art and are familiar to the skilled artisan. Without wishing to be bound by any particular theory, it is believed that particular deprotection conditions are advantageous in the context of polycarbonates, for example thermal, hydrogenating, acidic conditions, or a combination thereof. In some embodiments, the skilled artisan will select an appropriate protecting group such that deprotection may be achieved while maintaining the integrity of the polycarbonate polymer.

In some embodiments, a protecting group is removed under acidic conditions. In some embodiments, acidic conditions are aqueous. In some embodiments, acidic conditions are non-aqueous. In some embodiments, acidic conditions comprise an inorganic acid, an organic acid, and/or a Lewis acid. In some embodiments, acidic conditions comprise heat.

In some embodiments, a protecting group is removed under thermal conditions. In some embodiments, thermal conditions comprise heating to solvent reflux temperature. In some embodiments, thermal conditions comprise heating to 50° C. or above. In some embodiments, thermal conditions comprise heating to 75° C. or above. In some embodiments, thermal conditions comprise heating to 100° C. or above. In some embodiments, thermal conditions comprise heating to 150° C. or above.

In some embodiments, a protecting group is removed under hydrogenating conditions. in some embodiments, hydrogenating conditions comprise hydrogen gas and Raney nickel. In some embodiments, hydrogenating conditions comprise hydrogen gas and platinum. In some embodiments, hydrogenating conditions comprise hydrogen gas and palladium. In some embodiments, hydrogenating conditions comprise hydrogen gas and Lindlar catalyst. In some embodiments, hydrogenating conditions comprise hydrogen gas and rhodium. In some embodiments, hydrogenating conditions comprise heat. In some embodiments, hydrogenating conditions comprise acidic pH. In some embodiments, hydrogenating conditions comprise hydrazine.

In some embodiments, the conditions described above for removing a protecting group are useful for exposing a latent hydroxyl group. In other embodiments, a latent hydroxyl group is exposed not by removing what would be consider a traditional protecting group, but rather by converting a functional group to a hydroxyl group. Such conversions to hydroxyl groups are known in the art, and any available technique known in the art can be applied to latent hydroxyl groups. See, for example, March, supra.

In certain embodiments, a latent hydroxyl group is created by hydrolysis of an alkyl halide, a carboxylic ester, an inorganic ester, an ortho ester, or a sulfonic ester. In certain embodiments, a latent hydroxyl group is created by reduction of a carboxylic ester group, using lithium aluminum hydride or another suitable reducing agent (see March, supra). In some embodiments, a latent hydroxyl group is created by oxidation of an alkene or borane (see March, supra).

III.c. Polymerization Catalysts

In some embodiments, a provided metal complex is a polymerization catalyst. In certain embodiments, a polymerization catalyst with which the reaction mixture is contacted in the polymerization system of step (a) of the above-described method include any one or more of the catalysts previously described herein.

III.d. Co-Catalysts

In some embodiments, methods of the present invention include the use of at least one co-catalyst. In some embodiments, a co-catalyst is present at step (b). In certain embodiments, a co-catalyst is any one or more of the co-catalytic species described above in the description of the polymerization systems of the present invention.

III.e. Reaction Conditions

In certain embodiments, the steps of any of the above methods further comprise one or more solvents. In certain other embodiments, the polymerization steps are performed in neat epoxide without the addition of solvent.

In certain methods, where a polymerization solvent is present, the solvent is an organic solvent. In certain embodiments, the solvent is a hydrocarbon. In certain embodiments, the solvent is an aromatic hydrocarbon. In certain embodiments, the solvent is an aliphatic hydrocarbon. In certain embodiments, the solvent is a halogenated hydrocarbon.

In certain embodiments, the solvent is an ether. In certain embodiments, the solvent is an ester. In certain embodiments the solvent is a ketone.

In certain embodiments suitable solvents include, but are not limited to: Methylene Chloride, Chloroform, 1,2-Dichloroethane, Propylene Carbonate, Acetonitrile, Dimethylformamide, N-Methyl-2-pyrrolidone, Dimethyl Sulfoxide, Nitromethane, Caprolactone, 1,4-Dioxane, and 1,3-Dioxane.

In certain other embodiments, suitable solvents include, but are not limited to: Methyl Acetate, Ethyl Acetate, Acetone, Methyl Ethyl Ketone, Propylene Oxide, Tretrahydrofuran, Monoglyme Triglyme, Propionitrile, 1-Nitropropane, Cyclohexanone.

In certain embodiments, any of the above methods comprise aliphatic oxide present in amounts concentrations between about 0.5 M to about 20 M or the neat concentration of the aliphatic oxide. In certain embodiments, aliphatic oxide is present in amounts between about 0.5 M to about 2 M. In certain embodiments, aliphatic oxide is present in amounts between about 2 M to about 5 M. In certain embodiments, aliphatic oxide is present in amounts between about 5 M to about 20 M. In certain embodiments, aliphatic oxide is present in an amount of about 20 M. In certain embodiments, liquid aliphatic oxide comprises the reaction solvent.

In certain embodiments, $CO_2$ is present at a pressure of between about 30 psi to about 800 psi. In certain embodiments, $CO_2$ is present at a pressure of between about 30 psi to about 500 psi. In certain embodiments, $CO_2$ is present at a pressure of between about 30 psi to about 400 psi. In certain embodiments, $CO_2$ is present at a pressure of between about 30 psi to about 300 psi. In certain embodiments, $CO_2$ is present at a pressure of between about 30 psi to about 200 psi. In certain embodiments, $CO_2$ is present at a pressure of between about 30 psi to about 100 psi. In certain embodiments, $CO_2$ is present at a pressure of between about 30 psi to about 80 psi. In certain embodiments, $CO_2$ is present at a pressure of about 30 psi. In certain embodiments, $CO_2$ is present at a pressure of about 50 psi. In certain embodiments, $CO_2$ is present at a pressure of about 100 psi. In certain embodiments, the $CO_2$ is supercritical.

In certain embodiments of the above methods the reaction is conducted at a temperature of between about 0° C. to about 150° C. In certain embodiments, the reaction is conducted at a temperature of between about 23° C. to about 100° C. In certain embodiments, the reaction is conducted at a temperature of between about 23° C. and about 80° C. In certain embodiments, the reaction to be conducted at a temperature of between about 23° C. to about 50° C.

In certain embodiments, a polymerization step of any of the above methods produces cyclic carbonate as a by-product in amounts of less than about 20%. In certain embodiments, cyclic carbonate is produced as a by-product in amounts of less than about 15%. In certain embodiments, cyclic carbonate is produced as a by-product in amounts of less than about 10%. In certain embodiments, cyclic carbonate is produced as a by-product in amounts of less than about 5%. In certain embodiments, cyclic carbonate is produced as a by-product in amounts of less than about 1%. In certain embodiments, the reaction does not produce any detectable by-products (e.g., as detectable by $^1$H-NMR and/or liquid chromatography (LC)).

In certain embodiments, a polymerization time is between about 30 minutes and about 48 hours. In some embodiments, the reaction is allowed to process for less than 24 hours. In some embodiments, the reaction is allowed to progress for less than 12 hours. In some embodiments, the reaction is allowed to process for between about 4 and about 12 hours.

In certain embodiments, a polymerization reaction is allowed to proceed until the number average molecular weight of the polymers formed is that of the average molecular weights described herein for polycarbonate polyol compositions.

In certain embodiments, provided methods further include the step of sampling the reaction and determining the molecular weight of the polymer at a given time. In certain embodiments, this sampling and molecular weight determination are performed at two or more time intervals. In certain embodiments a plot of molecular weight gain over time is constructed and the method further includes the step of determining from this plot the time at which a desired molecular weight polymer will be present. In certain embodiments, the time at which the polymerization is ended is determined by this method.

In certain embodiments, a polymerization reaction proceeds until between about 20% and about 100% of the provided epoxide is consumed. In certain embodiments, the conversion is between about 40% and about 90%. In certain embodiments, the conversion is at least 50%. In other embodiments, the conversion is at least 60%, at least 80% or at least 85%. In certain embodiments, at least 80% of the provided epoxide is converted to polymer.

IV. Higher Polymers

The present disclosure encompasses higher polymers derived from the polycarbonate polyols described hereinabove. In certain embodiments, such higher polymers are formed by reacting the polyols with suitable cross-linking agents. Examples of higher polymers that may be made using the polyols of the present invention as well as suitable reagents, conditions, processing methods and formulations are disclosed in WO 2011/163250.

In certain embodiments, cross linkers including functional groups reactive toward hydroxyl groups are selected, for example, from epoxy and isocyanate groups. In certain embodiments, such cross linking agents are polyisocyanates.

In some embodiments, a difunctional or higher-functionality isocyanate is selected from di-isocyanates, the biurets and cyanurates of diisocyanates, and the adducts of diisocyanates to polyols. Suitable diisocyanates have generally from 4 to 22 carbon atoms. The diisocyanates are typically selected from aliphatic, cycloaliphatic and aromatic diisocyanates, for example 1,4-diisocyanatobutane, 1,6-diisocyanatohexane, 1,6-diisocyanato-2,2,4-trimethylhexane, 1,6-diisocyanato-2,4,4-trimethylhexane, 1,2-, 1,3- and 1,4-diisocyanatocyclohexane, 2,4- and 2,6-diisocyanato-1-methylcyclohexane, 4,4'-bis(isocyanatocyclohexyl) methane, isophorone diisocyanate (=1-isocyanato-3,3,5-trimethyl-5-isocyanatomethylcyclohexane), 2,4- and 2,6-tolylene diisocyanate, tetramethylene-p-xylylene diisocyanate (=1,4-bis(2-isocyanatoprop-2-yl)benzene), 4,4'-diisocyanatodiphenylmethane, preferably 1,6-diisocyanatohexane diisocyanatohexane and isophorone diisocyanate, and mixtures thereof.

In certain embodiments, crosslinking compounds comprise the cyanurates and biurets of aliphatic diisocyanates. In certain embodiments, crosslinking compounds are the di-isocyanurate and the biuret of isophorone diisocyanate, and the isocyanate and the biuret of 1,6-diisocyanatohexane. Examples of adducts of diisocyanates to polyols are the adducts of the abovementioned diisocyanates to glycerol, trimethylolethane and trimethylolpropane, for example the adduct of tolylene diisocyanates to trimethylolpropane, or the adducts of 1,6-diisocyanatohexane or isophorone diisocyanate to trimethylpropane and/or glycerol.

In some embodiments, a polyisocyanate used, may, for example, be an aromatic polyisocyanate such as tolylene diisocyanate, diphenylmethane diisocyanate or polymethylene polyphenyl isocyanate, an aliphatic polyisocyanate such as hexamethylene diisocyanate, xylylene diisocyanate, dicyclohexylmethane diisocyanate, lysine diisocyanate or tetramethylxylylene diisocyanate, an alicyclic polyisocyanate such as isophorone diisocyanate, or a modified product thereof.

In some embodiments, a modified product of a polyisocyanate is a prepolymer modified product which is a reaction product of a low molecular weight diol with a low molecular weight triol, a buret product which is a reaction product with water, or a trimer having an isocyanurate skeleton.

The isocyanate group-terminated prepolymer can be produced by reacting a stoichiometrically excess amount of a polyisocyanate to the polyol composition. It can be produced by thermally reacting the polyol composition with the polyisocyanate at a temperature of from 60 to 100° C. for from 1 to 30 hours in a dry nitrogen stream in the presence or absence of a solvent and optionally in the presence of a urethane-forming catalyst.

In some embodiments, a urethane-forming catalyst is an organometallic compound of tin, lead or titanium. In some embodiments a urethane-forming catalyst is an organic tin compound, such as dibutyltin dilaurate, dibutyltin dioctoate or stannous octoate.

An isocyanate group-terminated prepolymer of the present invention can be used for uses known in the art and familiar to the skilled artisan. In some embodiments, it can be used for a humidity curable composition which is cured by a reaction with moisture in air, a two-part curable composition to be reacted with a curing agent such as a polyamine, a polyol or a low molecular weight polyol, a casting polyurethane elastomer, or other applications.

The present invention also provides a polyurethane resin obtained by reacting the above polyol composition with a polyisocyanate. Such a polyurethane resin can be produced by a known method, and a curing agent such as a polyamine or a low molecular polyol, or the above mentioned urethane-forming catalyst may optionally be used.

In the production of polyurethanes, polyols of the invention may be reacted with the polyisocyanates using conventional techniques that have been fully described in the prior art. Depending upon whether the product is to be a homogeneous or microcellular elastomer, a flexible or rigid foam, an adhesive, coating or other form, the reaction mixture may contain other conventional additives, such as chain-extenders, for example 1,4-butanediol or hydrazine, catalysts, for example tertiary amines or tin compounds, surfactants, for example siloxane-oxyalkylene copolymers, blowing agents, for example water and trichlorofluoromethane, cross-linking agents, for example triethanolamine, fillers, pigments, fire-retardants and the like.

To accelerate the reaction between the isocyanate-reactive groups of the polyol resin and the isocyanate groups of the crosslinker, it is possible to use known catalysts, for example, dibutyltin dilaurate, tin(II) octoate, 1,4-diazabicyclo[2.2.2]-octane, or amines such as triethylamine. These are typically used in an amount of from $10^{-5}$ to $10^{-2}$ g, based on the weight of the crosslinker.

The crosslinking density can be controlled by varying the functionality of the polyisocyanate, the molar ratio of the polyisocyanate to the polyol resin, or by additional use of monofunctional compounds reactive toward isocyanate groups, such as monohydric alcohols, e.g. ethylhexanol or propylheptanol.

A crosslinker is generally used in an amount which corresponds to an NCO:OH equivalents ratio of from 0.5 to 2, preferably from 0.75 to 1.5 and most preferably from 0.8 to 1.2.

Suitable crosslinking agents are also epoxy compounds having at least two epoxide groups in the molecule, and their extension products formed by preliminary extension (prepolymers for epoxy resins, as described, for example in Ullmann's Encyclopedia of Industrial Chemistry, 6th edition, 2000, Electronic Release, in the chapter "Epoxy Resins"). Epoxy compounds having at least two epoxide groups in the molecule include, in particular:

(i) Polyglycidyl and poly(β-methylglycidyl) esters which are obtainable by reacting a compound having at least two carboxyl groups, such as an aliphatic or aromatic polycarboxylic acid, with epichlorohydrin or beta-methylepichlorohydrin. The reaction is effected, preferably, in the presence of a base. Suitable aliphatic polycarboxylic acids are oxalic acid, succinic acid, glutaric acid, adipic acid, pimelic acid, azelaic acid, dimerized or trimerized linolenic acid, tetrahydrophthalic acid, hexahydrophthalic acid or 4-methylhexahydrophthalic acid. Suitable aromatic polycarboxylic acids are, for example, phthalic acid, isophthalic acid or terephthalic acid.

(ii) Polyglycidyl or poly(β-methylglycidyl) ethers which derive, for example, from acyclic alcohols, such as ethylene glycol, diethylene glycol, poly(oxyethylene) glycols, propane-1,2-diol, poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol; or cyclic alcohols such as 1,4-cyclohexanedimethanol, bis(4-hydroxycyclohexyl)methane or 2,2-bis(4-hydroxycyclohexyl)propane; or comprise aromatic rings, such as N,N-bis(2-hydroxyethyl)aniline or p,p-bis(2-hydroxyethylamino)diphenylmethane. The glycidyl ethers may also derive from monocyclic phenols such as resorcinol or hydroquinone, or polycyclic phenols, such as bis(4-hydroxyphenyl)methane, 4,4'-dihydroxybiphenyl, bis(4-hydroxyphenyl) sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, or from novolaks which are obtainable by condensing aldehydes, such as formaldehyde, acetaldehyde, chloral or furfural, with phenols, such as phenol, 4-chlorophenol, 2-methylphenol, 4-tert-butylphenol or bisphenols.

(iii) Poly(N-glycidyl) compounds which are obtainable by dehydrochlorinating the reaction products of epichlorohydrin with amines which have at least two amine hydrogen atoms, such as aniline, n-butylamine, bis(4-aminophenyl)methane, m-xylylenediamine or bis(4-methylaminophenyl)methane. The poly(N-glycidyl) compounds also include triglycidyl isocyanurates, N,N'-diglycidyl derivatives of alkyleneureas such as ethyleneurea or 1,3-propyleneurea, and the diglycidyl derivatives or hydantoins such as 5,5-dimethylhydantoin.

(iv) Poly(S-glycidyl) compounds such as di-S-glycidyl derivatives which derive from dithiols, such as ethane-1,2-dithiol or bis(4-mercaptomethylphenyl) ether.

(v) Cycloaliphatic epoxy compounds such as bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl 3',4'-epoxycyclohexanecarboxylate; or mixed cycloaliphatic-aliphatic epoxy compounds such as limonene diepoxide.

In some embodiments, the present disclosure encompasses higher polymers formed with polyol resins of the present invention that additionally comprise a stiffening polymer which comprises (meth)acryloyl and/or vinylaromatic units. The stiffening is obtainable by free-radically polymerizing (meth)acrylic monomers or vinylaromatic monomers. Examples of suitable monomers are styrene, ring-alkylated styrenes with preferably $C_{1-4}$ alkyl radicals such as α-methylstyrene, p-methylstyrene, acrylonitrile, methacrylonitrile, acrylamide or methacrylamide, alkyl acrylates and methacrylates having from 1 to 4 carbon atoms in the alkyl radical, in particular methyl methacrylate. Preference is given to using monomers and monomer mixtures which give rise to a polymer or copolymer having a glass transition temperature of more than +20° C. and preferably more than +50° C.

The stiffening polymer may, aside from (meth)acrylic monomers or vinylaromatic monomers, comprise various monomers. The (meth)acrylic monomers or vinylaromatic monomers make up generally at least 20% by weight, preferably at least 50% by weight, in particular at least 70% by weight, of the constituent monomers.

The encompassed higher polymer compositions may additionally comprise customary assistants such as fillers, diluents or stabilizers.

Suitable fillers are, for example, silica, colloidal silica, calcium carbonate, carbon black, titanium dioxide, mica and the like.

Suitable diluents are, for example, polybutene, liquid polybutadiene, hydrogenated polybutadiene, paraffin oil, naphthenenates, atactic polypropylene, dialkyl phthalates, reactive diluents, for example, alcohols and oligoisobutenes.

Suitable stabilizers are, for example, 2-benzothiazolyl sulfide, benzothiazole, thiazole, dimethyl acetylenedicarboxylate, diethyl acetylenedicarboxylate, BHT, butylhydroxyanisole, vitamin E.

Further higher polymeric materials which may be obtained from the polyols of the invention include vinyl type polymers made by polymerising ethylenically unsaturated derivatives of the polyols. Such derivatives may be obtained, for example, by reacting the polyols with ethylenically unsaturated carboxylic acids, for example acrylic, methacrylic and itaconic acids or ester-forming derivatives thereof.

Another useful method of forming ethylenically unsaturated derivatives of the polyols is to react said polyols with organic polyisocyanates, for example those mentioned above, and then to react the isocyanate group terminated products obtained with hydroxyalkyl acrylates or methacrylates, for example the 2-hydroxyethyl or 2-hydroxypropyl compounds. Alternatively, the polyols may be reacted with isocyanato-acrylates obtained by reacting a diisocyanate with a hydroxalkyl acrylate or methacrylate.

The ethylenically unsaturated derivatives of the fluorinated polyols may be polymerized, preferably in the presence of co-monomers such as acrylonitrile, styrene, ethyl acrylate, butyl acrylate or methyl methacrylate, using conditions that have been fully described in the prior art for vinyl polymerisations. Useful molded plastics articles may be made in this way.

Further higher polymeric materials which may be obtained from the polyols of the invention include epoxy resins prepared in conventional manner from epoxy derivatives of the polyols. Such derivatives may be obtained, for example, by reacting the polyols with epichlorohydrin in the presence of bases.

Articles of manufacture comprising provided polycarbonate polyol and/or polyurethane compositions can be made using known methods and procedures described in the art. The skilled artisan, after reading the present disclosure, will be able to manufacture such articles using well known protocols and techniques.

Other Embodiments

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A polymerization system for the copolymerization of $CO_2$ and epoxides, the system comprising:
a metal complex including a permanent ligand set and at least one ligand that is a polymerization initiator, and a chain transfer agent having one or more sites capable of initiating copolymerization of epoxides and $CO_2$, wherein the chain transfer agent contains one or more masked hydroxyl groups,
wherein the chain transfer agent is selected from the group consisting of methanol, t-butanol, allyl alcohol, and benzyl alcohol.

2. A polymerization system for the copolymerization of $CO_2$ and epoxides, the system comprising:
a metal complex including a permanent ligand set and at least one ligand that is a polymerization initiator, and
a chain transfer agent having one or more sites capable of initiating copolymerization of epoxides $CO_2$, wherein the chain transfer agent contains a masked hydroxyl group, wherein the chain transfer agent is a hydroxy acid, wherein any hydroxyl group of the hydroxy acid capable of initiating copolymerization of epoxides and $CO_2$ is protected.

3. The polymerization system of claim 2,
wherein the hydroxy acid is selected from the group consisting of:

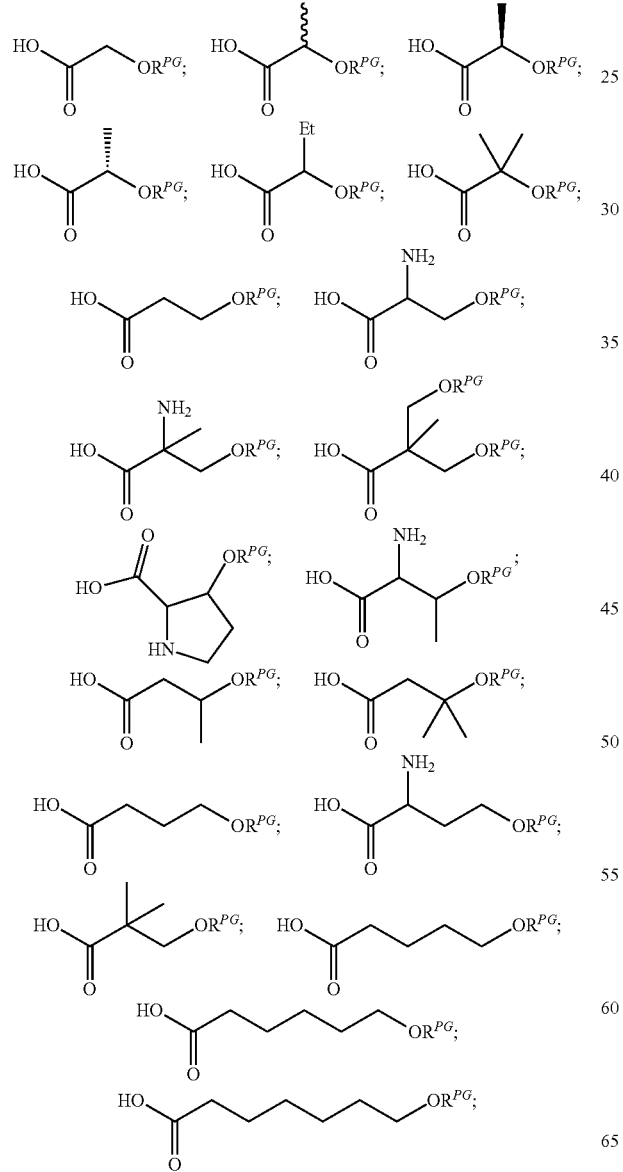

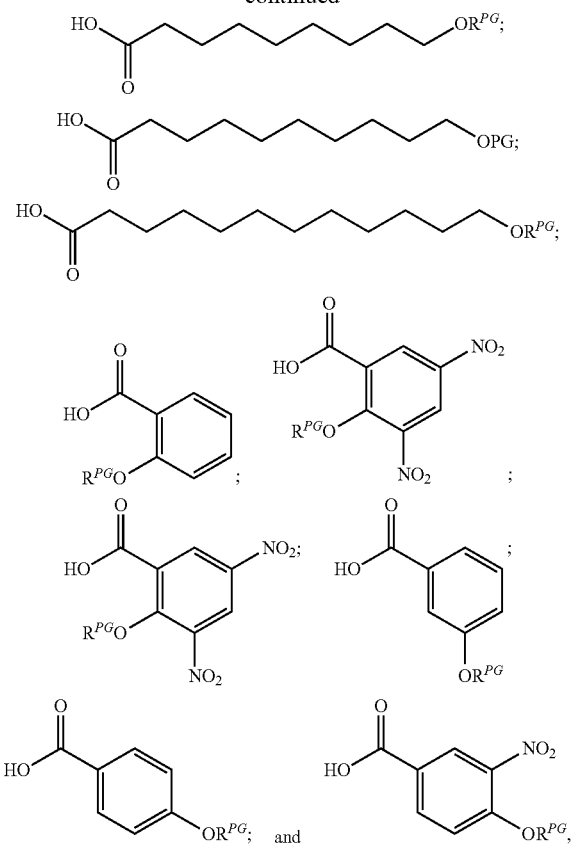

where each $R^{PG}$ is independently a hydroxyl protecting group.

4. The polymerization system of claim 1 or 2, wherein the metal complex has the formula $L_p$-M-$(L_I)_n$, where $L_p$ is a permanent ligand set, M is a metal atom, $L_I$ is a ligand that is a polymerization initiator, and n is an integer between 0 and 2, inclusive, representing the number of initiating ligands present; and
wherein M is selected from the group consisting of Cr, Mn, V, Fe, Co, Mo, W, Ru, Al, and Ni.

5. The polymerization system of claim 4, wherein the $L_p$-M moiety of the metal complex has a formula selected from the group consisting of:

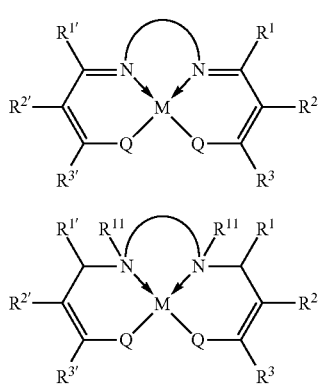

-continued

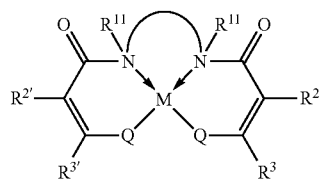
3

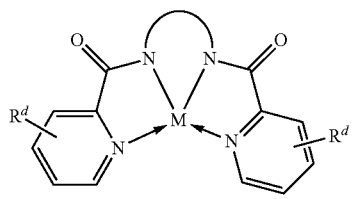
4

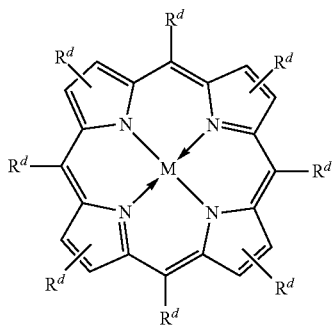
5

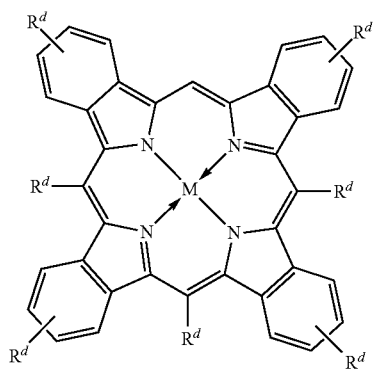
6

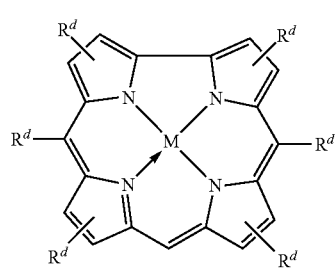
7

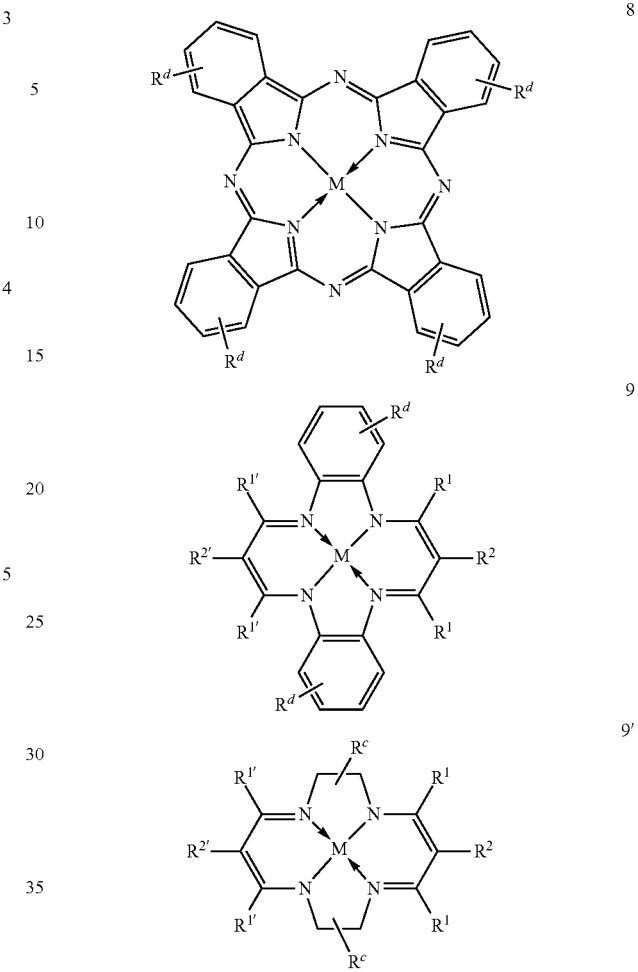

8

9

9' wherein,
Q, at each occurrence is independently O or S;
$R^1$ and $R^{1'}$ are independently selected from the group consisting of: —H, optionally substituted $C_1$ to $C_{12}$ aliphatic; optionally substituted 3- to 14-membered carbocycle; optionally substituted 3- to 14-membered heterocycle; and $R^{21}$;
$R^2$ and $R^{2'}$ are independently selected from the group consisting of: —H; optionally substituted $C_1$ to $C_{12}$ aliphatic; optionally substituted 3- to 14-membered carbocycle; optionally substituted 3- to 14-membered heterocycle; $R^{14}$; $R^{20}$; and $R^{21}$;
$R^3$ and $R^{3'}$ are independently selected from the group consisting of: —H; optionally substituted $C_1$ to $C_{12}$ aliphatic; optionally substituted 3- to 14-membered carbocycle; optionally substituted 3- to 14-membered heterocycle, and $R^{21}$;
$R^c$ at each occurrence is independently selected from the group consisting of: —H; optionally substituted $C_1$ to $C_{12}$ aliphatic; an optionally substituted 3- to 14-membered carbocycle; an optionally substituted 3- to 14 membered heterocycle; $R^{20}$; and $R^{21}$, where two or more $R^c$ groups may be taken together with intervening atoms to form one or more optionally substituted rings and, when two $R^c$ groups are attached to the same carbon atom, they may be taken together along with the carbon atom to which they are attached to form a moiety selected from the group consisting of: an optionally substituted 3- to 8-membered spirocyclic ring, a carbonyl, an oxime, a hydrazone, and an imine;

$R^d$ at each occurrence is independently selected from the group consisting of: optionally substituted $C_1$ to $C_{12}$ aliphatic; optionally substituted 3- to 14-membered carbocycle; optionally substituted 3- to 14-membered heterocycle; $R^{20}$; and $R^{21}$, where two or more $R^d$ groups may be taken together with intervening atoms to form one or more optionally substituted rings; and ⌒ represents an optionally substituted moiety covalently linking two nitrogen atoms, where any of [$R^{2'}$ and $R^{3'}$], [$R^2$ and $R^3$], [$R^1$ and $R^2$], and [$R^{1'}$ and $R^{2'}$] may optionally be taken together with intervening atoms to form one or more rings which may in turn be substituted with one or more groups selected from $R^{14}$; $R^{20}$; and $R^{21}$; and where $R^{14}$ at each occurrence is independently selected from the group consisting of: a —⋍⋍—$(Z)_p$ group; halogen; optionally substituted $C_1$ to $C_{12}$ aliphatic; optionally substituted 3- to 14-membered carbocycle; optionally substituted 3- to 14-membered heterocycle; —$OR^{10}$; —$OC(O)R^{13}$; —$OC(O)OR^{13}$; —$OC(O)NR^{11}R^{12}$; —$CN$; —$CNO$; —$C(R^{13})_zH_{(3-z)}$; —$C(O)R^{13}$; —$C(O)OR^{13}$; —$C(O)NR^{11}R^{12}$; —$NR^{11}R^{12}$; —$NR^{11}C(O)R^{13}$; —$NR^{11}C(O)^{13}$; —$NR^{11}SO_2R^{13}$; —$N^+R^{11}R^{12}R^{13}X^-$; —$P^+(R^{11})_3X^-$; —$P(R^{11})_3=N^+=P(R^{11})_3X^-$; —$As^+R^{11}R^{12}R^{13}X^-$; —$NCO$; —$N_3$; —$NO_2$; —$S(O)_xR^{13}$; and —$SO_2NR^{11}R^{12}$;

$R^{20}$ at each occurrence is independently selected from the group consisting of: a —⋍⋍—$(Z)_p$ group; halogen; —$OR^{10}$; —$OC(O)R^{13}$; —$OC(O)OR^{13}$; —$N^+(R^{11})_3X^-$; —$P^+(R^{11})_3X^-$; —$P(R^{11})_3=N^+=P(R^{11})_3X^-$; —$As^+R^{11}R^{12}R^{13}X^-$; —$OC(O)NR^{11}R^{12}$; —$CN$; —$CNO$; —$C(O)R^{13}$; —$C(O)OR^{13}$; —$C(O)NR^{11}R^{12}$; —$C(R^{13})_zH_{(3-z)}$; —$NR^{11}R^{12}$; —$NR^{11}C(O)R^{13}$; —$NR^{11}C(O)OR^{13}$; —$NCO$; —$NR^{11}SO_2R^{13}$; —$S(O)_xR^{13}$; —$S(O)_2NR^{11}R^{12}$; —$NO_2$; —$N_3$; and —$Si(R^{13})_{(3-z)}[(CH_2)_kR^{14}]_z$;

$R^{21}$ at each occurrence is independently selected from the group consisting of: a —⋍⋍—$(Z)_p$ group; —$(CH_2)_kR^{20}$; —$(CH_2)_k$—$Z$—$(CH_2)_kR^{20}$; —$C(R^{17})_zH_{(3-z)}$; —$(CH_2)_kC(R^{17})_zH_{(3-z)}$; —$(CH_2)_m$—$Z$—$(CH_2)_mC(R^{17})_zH_{(3-z)}$; —$(CH_2)_k$—$Z$—$R^{16}$;

$X^-$ is any anion;

Z is a divalent linker selected from the group consisting of —$(CH=CH)_a$—; —$(CH\equiv CH)_a$—; —$C(O)$—; —$C(=NOR^{11})$—; —$C(=NNR^{11}R^{12})$—; —$O$—; —$OC(O)$—; —$C(O)O$—; —$OC(O)O$—; —$N(R^{11})$—; —$N(C(O)R^{13})$—; —$C(O)NR^{13}$—; —$N(C(O)R^{13})O$—; —$NR^{13}C(O)R^{13}N$—; —$S(O)_x$—; a polyether; and a polyamine;

$R^{10}$ at each occurrence is independently selected from the group consisting of: —H; optionally substituted $C_{1-12}$ aliphatic; an optionally substituted 3- to 14-membered carbocycle; an optionally substituted 3- to 14-membered heterocycle —$S(O)_2R^{13}$; —$Si(R^{15})_3$; —$C(O)R^{13}$; and a hydroxyl protecting group;

$R^{11}$ and $R^{12}$ at each occurrence are independently selected from the group consisting of: —H; optionally substituted $C_1$ to $C_{12}$ aliphatic; an optionally substituted 3- to 14-membered carbocycle; an optionally substituted 3- to 14-membered heterocycle; where two or more $R^{11}$ or $R^{12}$ groups can optionally be taken together with intervening atoms to form an optionally substituted 3- to 10-membered ring;

$R^{13}$ at each occurrence is independently selected from the group consisting of: —H; optionally substituted $C_1$ to $C_{12}$ aliphatic; an optionally substituted 3- to 14-membered carbocycle; and optionally substituted 3- to 14-membered heterocycle, where two or more $R^{13}$ groups on the same molecule may optionally be taken together to form ring;

$R^{15}$ at each occurrence is independently selected from the group consisting of: optionally substituted $C_{1-12}$ aliphatic, an optionally substituted 3- to 14-membered carbocycle; and an optionally substituted 3- to 14-membered heterocycle;

$R^{16}$ at each occurrence is independently selected from the group consisting of: optionally substituted $C_1$-$C_{12}$ aliphatic, an optionally substituted 3- to 14-membered carbocycle; an optionally substituted 3- to 14-membered heterocycle; and —$C(R^{17})_zH_{(3-z)}$;

$R^{17}$ at each occurrence is independently selected from the group consisting of: —H; optionally substituted $C_1$ to $C_{12}$ aliphatic; an optionally substituted 3- to 14-membered carbocycle; and optionally substituted 3- to 14-membered heterocycle;

each —⋍⋍—$(Z)_p$ group comprises a covalent linker "—⋍⋍—" containing one or more atoms selected from the group consisting of C, O, N, S, and Si; "Z" is an activating functional group having co-catalytic activity in epoxide $CO_2$ copolymerization, and p is an integer from 1 to 4 indicating the number of individual activating functional groups Z present on a given —⋍⋍—$(Z)_p$ group;

a is 1, 2, 3, or 4;

k is independently at each occurrence an integer from 1 to 8, inclusive;

m is 0 or an integer from 1 to 8, inclusive;

x is 0, 1, or 2; and z is 1, 2, or 3.

6. The polymerization system of claim 4, wherein $L_p$-M-$(L_I)_n$ has a formula selected from the group consisting of:

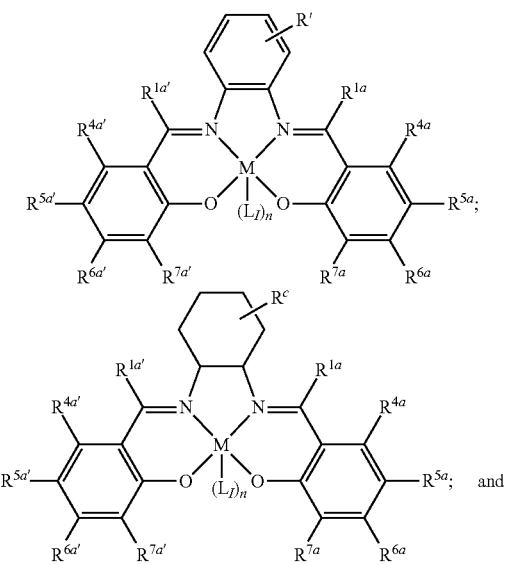

-continued

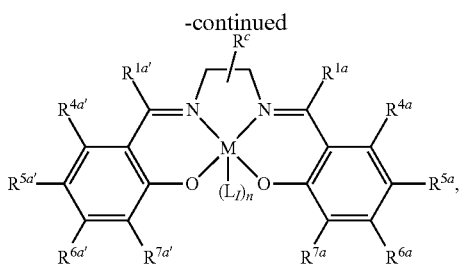

wherein:
- $R^{4a}$, $R^{4a'}$, $R^{5a}$, $R^{5a'}$, $R^{6a}$, $R^{6a'}$, $R^{7a}$, and $R^{7a'}$ are each independently hydrogen, a —⌇⌇(Z)$_p$ group, halogen, —NO$_2$, —CN, —SR$^{13}$, —S(O)R$^{13}$, —S(O)$_2$R$^{13}$, —NR$^{11}$C(O)R$^{13}$, —OC(O)R$^{13}$, —CO$_2$R$^{13}$, —NCO, —N$_3$, —OR$^{10}$, —OC(O)NR$^{11}$R$^{12}$, —Si(R$^{13}$)$_3$, —NR$^{11}$R$^{12}$, —NR$^{11}$C(O)R$^{13}$, and —NR$^{11}$C(O)OR$^{13}$; or an optionally substituted radical selected from the group consisting of C$_{1-20}$ aliphatic; C$_{1-20}$ heteroaliphatic; 6- to 10-membered aryl; 5- to 10-membered heteroaryl; and 3- to 7-membered heterocyclic, where [R$^{1a}$ and R$^{4a}$], [R$^{1a'}$ and R$^{4a'}$] and any two adjacent R$^{4a}$, R$^{4a'}$, R$^{5a}$, R$^{5a'}$, R$^{6a}$, R$^{6a'}$, R$^{7a}$, and R$^{7a'}$ groups can be taken together with intervening atoms to form one or more optionally substituted rings optionally containing one or more heteroatoms;
- R$^{1a}$ and R$^{1a'}$ are hydrogen when not taken together with R$^{4a}$ and R$^{4a'}$;
- R$^c$ at each occurrence is independently selected from the group consisting of: —H; optionally substituted C$_1$ to C$_{12}$ aliphatic; an optionally substituted 3- to 14-membered carbocycle; an optionally substituted 3- to 14 membered heterocycle; R$^{20}$; and R$^{21}$, where two or more R$^c$ groups may be taken together with intervening atoms to form one or more optionally substituted rings and, when two R$^c$ groups are attached to the same carbon atom, they may be taken together along with the carbon atom to which they are attached to form a moiety selected from the group consisting of: an optionally substituted 3- to 8-membered spirocyclic ring, a carbonyl, an oxime, a hydrazone, and an imine;
- R$^{10}$ at each occurrence is independently selected from the group consisting of: —H; optionally substituted C$_{1-12}$ aliphatic; an optionally substituted 3- to 14-membered carbocycle; an optionally substituted 3- to 14-membered heterocycle S(O)$_2$R$^{13}$; —Si(R$^{15}$)$_3$; —C(O)R$^{13}$; and a hydroxyl protecting group;
- R$^{11}$ and R$^{12}$ at each occurrence are independently selected from the group consisting of: —H; optionally substituted C$_1$ to C$_{12}$ aliphatic; an optionally substituted 3- to 14-membered carbocycle; an optionally substituted 3- to 14-membered heterocycle; where two or more R$^{11}$ or R$^{12}$ groups can optionally be taken together with intervening atoms to form an optionally substituted 3- to 10-membered ring;
- R$^{13}$ at each occurrence is independently selected from the group consisting of: —H; optionally substituted C$_1$ to C$_{12}$ aliphatic; an optionally substituted 3- to 14-membered carbocycle; and optionally substituted 3- to 14-membered heterocycle, where two or more R$^{13}$ groups on the same molecule may optionally be taken together to form ring;
- R$^{14}$ at each occurrence is independently selected from the group consisting of: a —⌇⌇(Z)$_p$ group; halogen; optionally substituted C$_1$ to C$_{12}$ aliphatic; optionally substituted 3- to 14-membered carbocycle; optionally substituted 3- to 14-membered heterocycle; —OR$^{10}$; —OC(O)R$^{13}$; —OC(O)OR$^{13}$; —OC(O) NR$^{11}$R$^{12}$; —CN; —CNO; —C(R$^{13}$)$_z$H$_{(3-z)}$; —C(O)R$^{13}$; —C(O) OR$^{13}$; —C(O) NR$^{11}$R$^{12}$; NR$^{11}$R$^{12}$; —NR$^{11}$C(O)R$^{13}$; NR$^{11}$C(O)OR$^{13}$; —NR$^{11}$SO$_2$R$^{13}$; —N$^+$R$^{11}$R$^{12}$R$^{13}$X$^-$; —P$^+$(R$^{11}$)$_3$X$^-$; —P(R$^{11}$)$_3$=N$^+$=P(R$^{11}$)$_3$X$^-$; —As$^+$ R$^{11}$R$^{12}$R$^{13}$X$^-$; —NCO; —N$_3$; —NO$_2$; —S(O)$_x$R$^{13}$; and —SO$_2$NR$^{11}$R$^{12}$;
- R$^{15}$ at each occurrence is independently selected from the group consisting of: optionally substituted C$_{1-12}$ aliphatic, an optionally substituted 3- to 14-membered carbocycle; and an optionally substituted 3- to 14-membered heterocycle;
- R$^{16}$ at each occurrence is independently selected from the group consisting of: optionally substituted C$_1$-C$_{12}$ aliphatic, an optionally substituted 3- to 14-membered carbocycle; an optionally substituted 3- to 14-membered heterocycle; and —C(R$^{17}$)$_z$H$_{(3-z)}$;
- R$^{17}$ at each occurrence is independently selected from the group consisting of: —H; optionally substituted C$_1$ to C$_{12}$ aliphatic; an optionally substituted 3- to 14-membered carbocycle; and optionally substituted 3-to 14-membered heterocycle;
- R$^{20}$ at each occurrence is independently selected from the group consisting of: a —⌇⌇(Z)$_p$ group; halogen; —OR$^{10}$; —OC(O)R$^{13}$; —OC(O)OR$^{13}$; —N$^+$(R$^{11}$)$_3$X$^-$; —P$^+$(R$^{11}$)$_3$X$^-$; —P(R$^{11}$)$_3$=N$^+$=P(R$^{11}$)$_3$X$^-$; —As$^+$ R$^{11}$R$^{12}$R$^{13}$X$^-$; —OC(O)NR$^{11}$R$^{12}$; —CN; —CNO; —C(O)R$^{13}$; —C(O)OR$^{13}$; —C(O)NR$^{11}$R$^{12}$; —C(R$^{13}$)$_z$H$_{(3-z)}$; —NR$^{11}$R$^{12}$; —NR$^{11}$C(O)R$^{13}$; —NR$^{11}$C(O)OR$^{13}$; —NCO; —NR$^{11}$SO$_2$R$^{13}$; —S(O)$_x$R$^{13}$; —S(O)$_2$NR$^{11}$R$^{12}$; —NO$_2$; —N$_3$; and —Si (R$^{13}$)$_{(3-z)}$[(CH$_2$)$_k$R$^{14}$]$_z$;
- R$^{21}$ at each occurrence is independently selected from the group consisting of: a —⌇⌇(Z)$_p$ group; —(CH$_2$)$_k$R$^{20}$; —(CH$_2$)$_k$—Z—(CH$_2$)$_k$R$^{20}$; —C(R$^{17}$)$_z$H$_{(3-z)}$; —(CH$_2$)$_k$C(R$^{17}$)$_z$H$_{(3-z)}$; —(CH$_2$)$_m$—Z—(CH$_2$)$_m$ C(R$^{17}$)$_z$H$_{(3-z)}$; —(CH$_2$)$_k$—Z—R$^{16}$;
- X$^-$ is any anion;
- Z is a divalent linker selected from the group consisting of —(CH=CH)$_a$—; —(CH≡CH)$_a$—; —C(O)—; —C(=NOR$^{11}$)—; —C(=NNR$^{11}$R$^{12}$)—; —O—; —OC(O)—; —C(O)O—; —OC(O)O—; —N(R$^{11}$)—; —N(C(O)R$^{13}$)—; —C(O)NR$^{13}$—; —N(C(O)R$^{13}$)O—; —NR$^{13}$C(O)R$^{13}$N—; —S(O)$_x$—; a polyether; and a polyamine;
- each —⌇⌇(Z)$_p$ group comprises a covalent linker " —⌇⌇ " containing one or more atoms selected from the group consisting of C, O, N, S, and Si; "Z" is an activating functional group having co-catalytic activity in epoxide CO$_2$ copolymerization, and p is an integer from 1 to 4 indicating the number of individual activating functional groups Z present on a given —⌇⌇(Z)$_p$ group;
- a is 1, 2, 3, or 4;
- k is independently at each occurrence an integer from 1 to 8 inclusive;
- m is 0 or an integer from 1 to 8 inclusive;
- x is 0, 1, or 2;
- z is 1, 2, or 3;
- R' is R$^d$ or a —⌇⌇(Z)$_p$ group, where two or more adjacent R' groups can be taken together to form an optionally substituted saturated, partially unsaturated, or aromatic 3- to 12-membered ring containing 0 to 4 heteroatoms; and $R^d$ is selected from the group consisting of: optionally substituted $C_1$ to $C_{12}$ aliphatic; optionally substituted 3- to 14-membered carbocycle; optionally substituted 3- to 14-membered heterocycle; $R^{20}$; and $R^{21}$.

7. The polymerization system of claim 6, wherein -M- is cobalt.

8. The polymerization system of claim 1, wherein the chain transfer agent is present in a molar ratio of at least 100:1 relative to the metal complex,
or
wherein the chain transfer agent is present in a molar ratio of at least 1000:1 relative to the metal complex,
or
wherein the chain transfer agent is present in a molar ratio of between about 10:1 and about 10000:1 relative to the metal complex,
or
wherein the chain transfer agent is present in a molar ratio of between about 50:1 and about 5000:1 relative to the metal complex,
or
wherein the chain transfer agent is present in a molar ratio of between about 50:1 and about 1000:1 relative to the metal complex,
or
wherein the chain transfer agent is present in a molar ratio of between about 20:1 and about 500:1 relative to the metal complex,
or
wherein the chain transfer agent is present in a molar ratio of between about 100:1 and about 250:1 relative to the metal complex.

9. The polymerization system of claim 1, wherein the chain transfer agent comprises a benzylic alcohol functionality.

10. A polycarbonate polyol composition comprising an epoxide $CO_2$ copolymer characterized in that the copolymer has:
an Mn between about 400 and about 20,000,
greater than 90% carbonate linkages,
at least 90% of the end groups are hydroxyl groups;
wherein substantially all polycarbonate chains having hydroxyl end groups have no embedded chain transfer agent.

11. A polyurethane composition formed by reaction of one or more isocyanates with one or more polycarbonate polyols of claim 10.

12. An article of manufacture comprising the polycarbonate polyol composition of claim 10.

13. The polycarbonate polyol composition of claim 10, comprising greater than 92% carbonate linkages.

14. The polycarbonate polyol composition of claim 13, comprising greater than 98% carbonate linkages.

15. The polycarbonate polyol composition of claim 14, comprising greater than 99% carbonate linkages.

16. The polycarbonate polyol composition of claim 10, having an Mn between 500 and 15,000 g/mol.

17. The polycarbonate polyol composition of claim 10, having an Mn between 800 and 5,000 g/mol.

18. The polycarbonate polyol composition of claim 10, having an Mn between 1,000 and 3,000 g/mol.

19. The polycarbonate polyol composition of claim 10, wherein the polycarbonate polyol is of the formula:

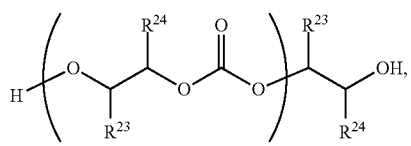

where each of $R^{23}$ and $R^{24}$ is independently selected from the group consisting of —H and methyl.

20. The polycarbonate polyol of claim 10, wherein at least 98% of the end groups are hydroxyl groups.

21. The polycarbonate polyol of claim 10, wherein at least 99% of the end groups are hydroxyl groups.

22. The polymerization system of claim 6, wherein $L_p$-M-$(L_I)_n$ has a formula selected from the group consisting of:

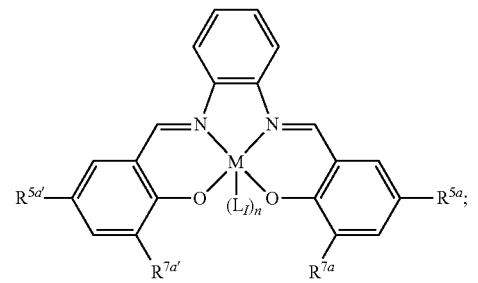

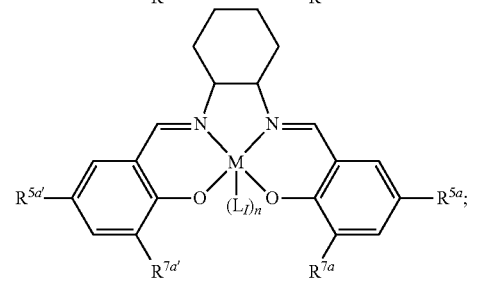

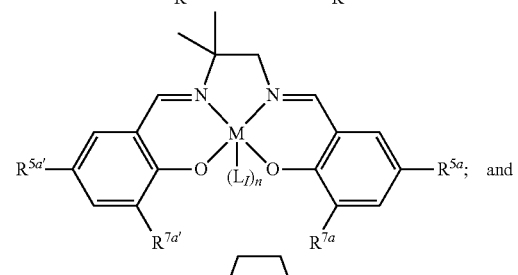

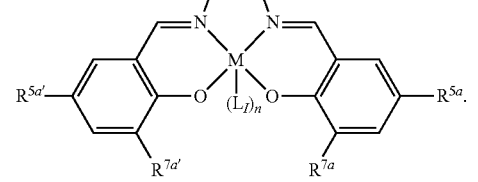

23. The polymerization system of claim 22, wherein -M- is cobalt.

24. The polymerization system of claim 2, wherein the hydroxy acid is an alpha-hydroxy acid.

25. The polymerization system of claim 2, wherein the hydroxy acid is selected from the group consisting of: glycolic acid, DL-lactic acid, D-lactic acid, L-lactic, citric acid and mandelic acid.

26. The polymerization system of claim 2, wherein the hydroxy acid is a beta-hydroxy acid.

27. The polymerization system of claim 2, wherein the hydroxy acid is selected from the group consisting of: 3-hydroxypropionic acid, DL-3-hydroxybutryic acid, D-3 hydroxybutryic acid, L-3-hydroxybutyric acid, DL-3-hydroxy valeric acid, D-3-hydroxy valeric acid, L-3-hydroxy valeric acid, salicylic acid, and derivatives of salicylic acid.

28. The polymerization system of claim 2, wherein the hydroxy acid is a α-ω hydroxy acid.

29. The polymerization system of claim 2, wherein the hydroxy acid is selected from the group consisting of: of optionally substituted $C_{3-20}$ aliphatic α-ω hydroxy acids and polyester oligomeric esters.

\* \* \* \* \*